United States Patent
Groppe

(10) Patent No.: US 7,206,665 B2
(45) Date of Patent: Apr. 17, 2007

(54) PRECISION FEED END-EFFECTOR COMPOSITE FABRIC TAPE-LAYING APPARATUS AND METHOD

(75) Inventor: David Groppe, Arnold, CA (US)

(73) Assignee: Composite Systems, Inc., Arnold, CA (US)

( * ) Notice: Subject to any disclaimer, the term of this patent is extended or adjusted under 35 U.S.C. 154(b) by 133 days.

(21) Appl. No.: 10/661,383

(22) Filed: Sep. 12, 2003

(65) Prior Publication Data

US 2005/0209735 A1    Sep. 22, 2005

Related U.S. Application Data

(60) Provisional application No. 60/410,066, filed on Sep. 12, 2002.

(51) Int. Cl.
*G06F 19/00* (2006.01)
(52) U.S. Cl. ............... 700/245; 700/246; 156/359; 156/361; 156/574
(58) Field of Classification Search ................ 700/245; 156/359, 361, 574
See application file for complete search history.

(56) References Cited

U.S. PATENT DOCUMENTS

| | | | | |
|---|---|---|---|---|
| 4,531,992 A | * | 7/1985 | Eaton | 156/152 |
| 4,591,402 A | * | 5/1986 | Evans et al. | 156/350 |
| 4,799,981 A | * | 1/1989 | Stone et al. | 156/64 |
| 5,352,306 A | * | 10/1994 | Grimshaw et al. | 156/64 |
| 6,105,649 A | * | 8/2000 | Levingston et al. | 156/425 |

* cited by examiner

*Primary Examiner*—Thomas Black
*Assistant Examiner*—McDieunel Marc
(74) *Attorney, Agent, or Firm*—Abelman, frayne & Schwab

(57) ABSTRACT

A fabric and tape laying machine operable with: (a) a robot including programmable control device, (b) a supply roll containing a continuous strip of composite tape or fabric, and (c) a mold of predetermined surface shape relative to x, y and z coordinates, including a chassis mountable to and movable by the robot, a contact roller module mounted on the chassis and spaced apart and downstream from the supply roll and adapted to receive tape from the supply roll, the contact roller module being moved along the programmed path by the chassis, a tape cutting unit carried by the chassis and situated between the supply roll and the contact roller module, and a suspension system for dynamically energizing the contact roller module to have its rollers apply a predetermined level of force downward on the tape during the lay-up process.

50 Claims, 54 Drawing Sheets

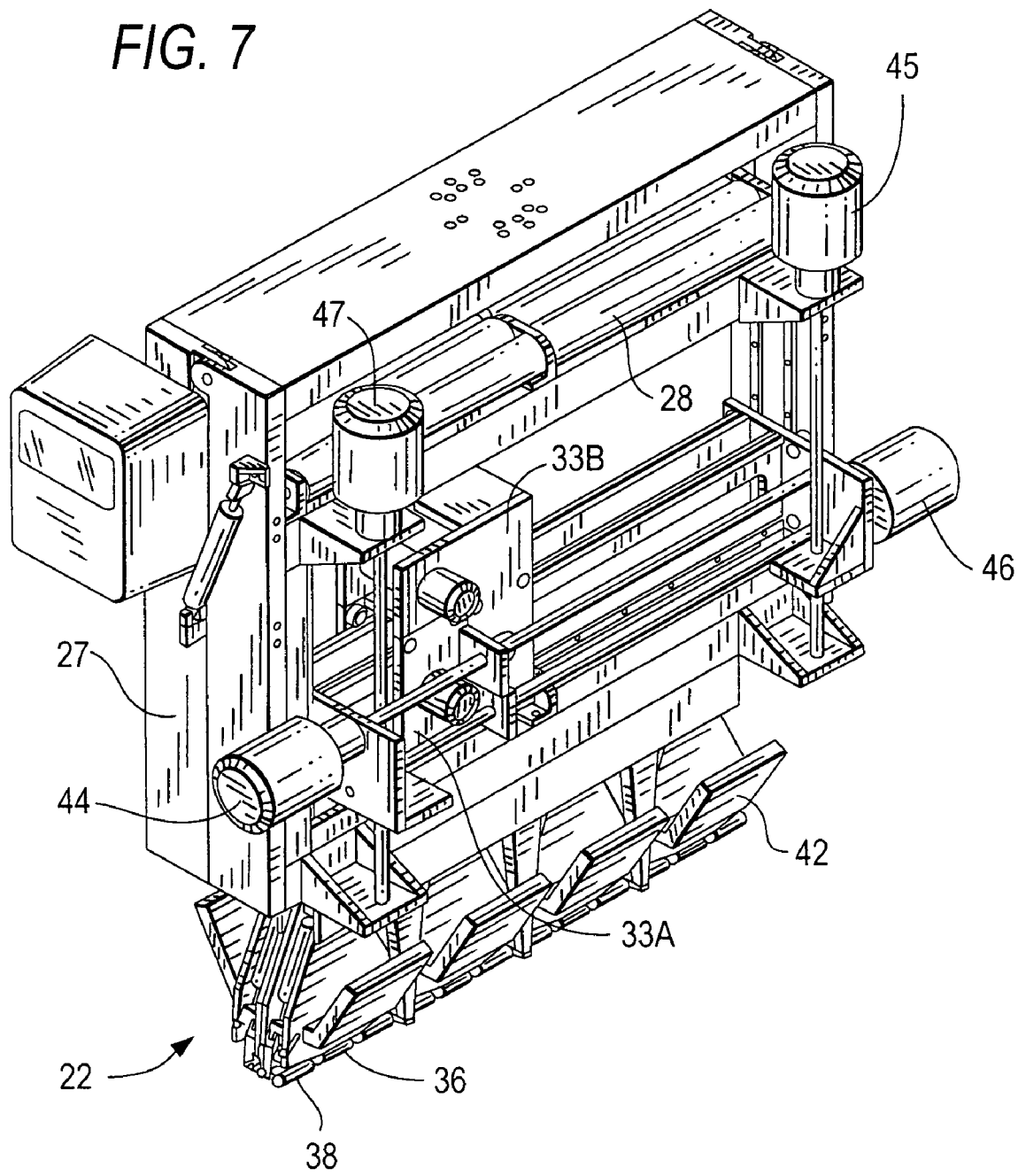

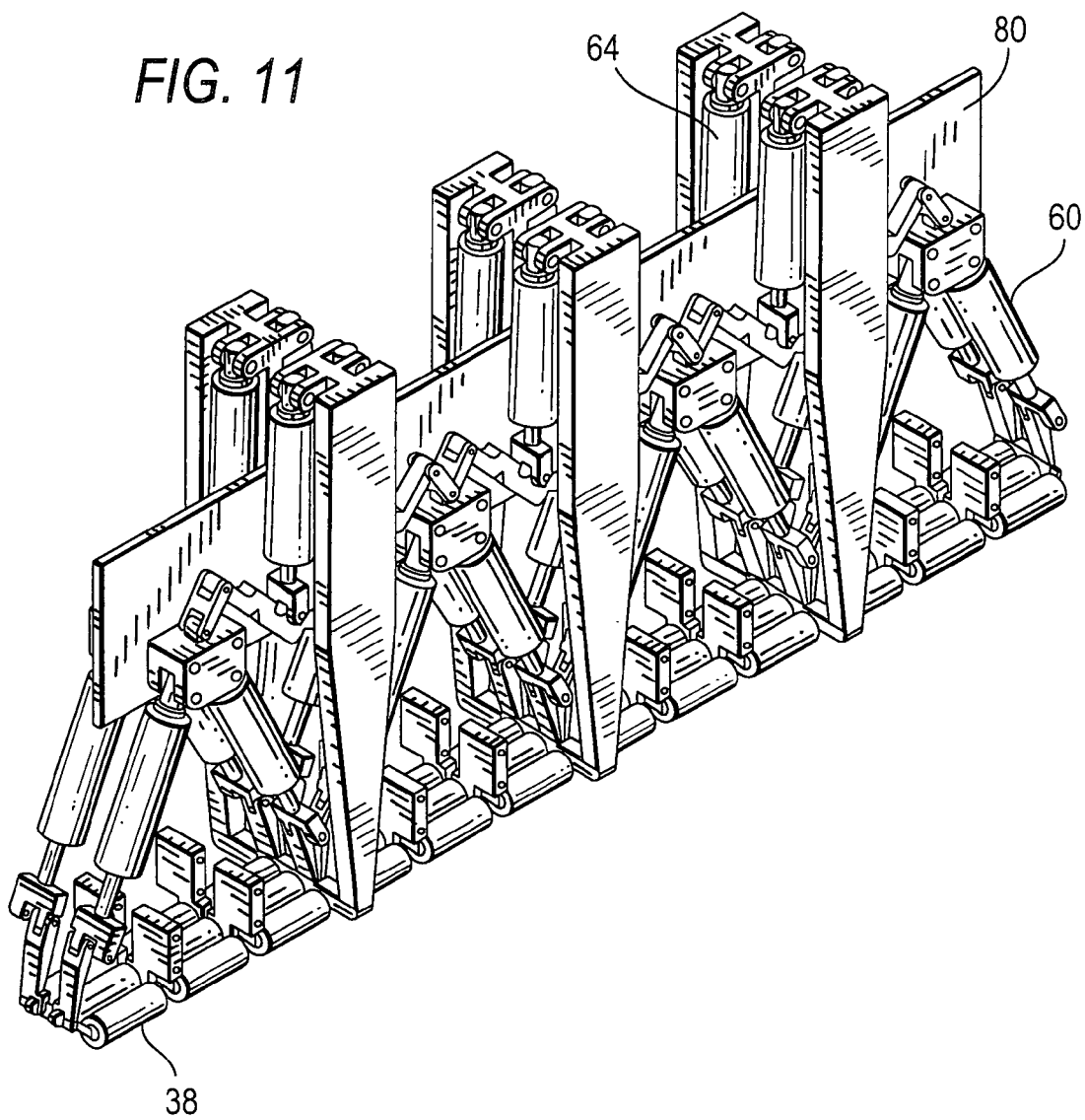

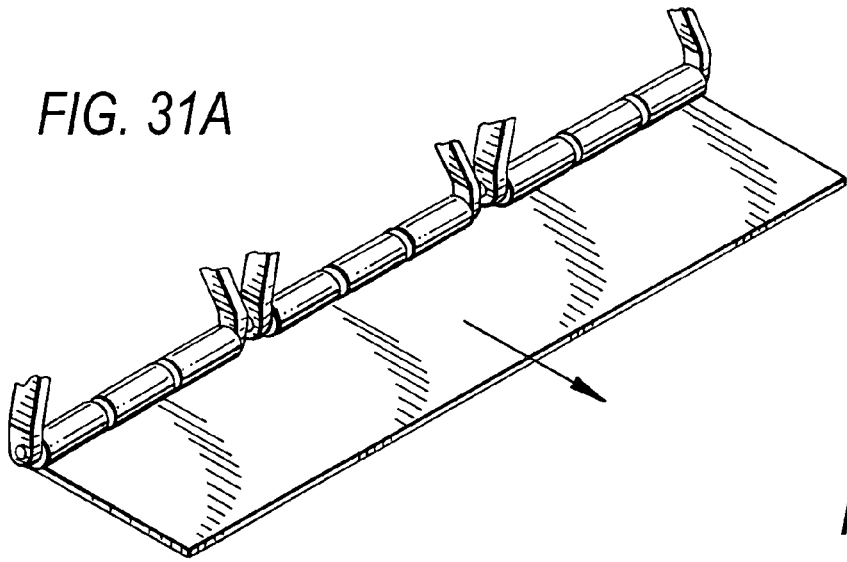
FIG. 31A
FIG. 31B
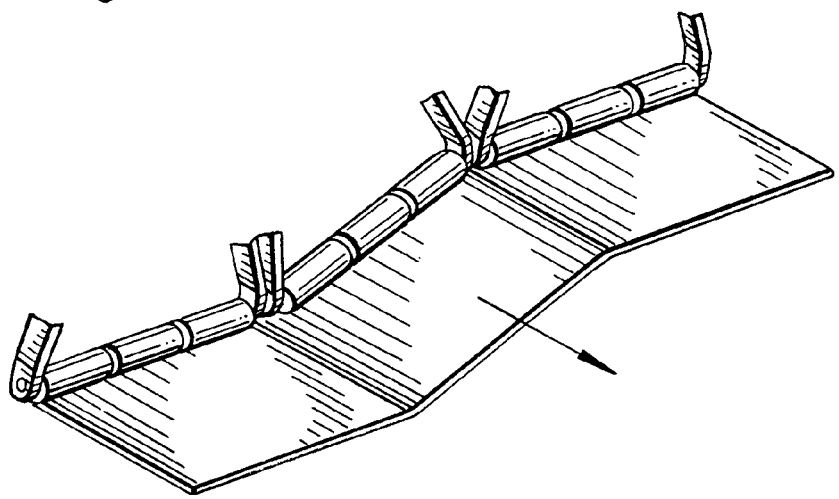
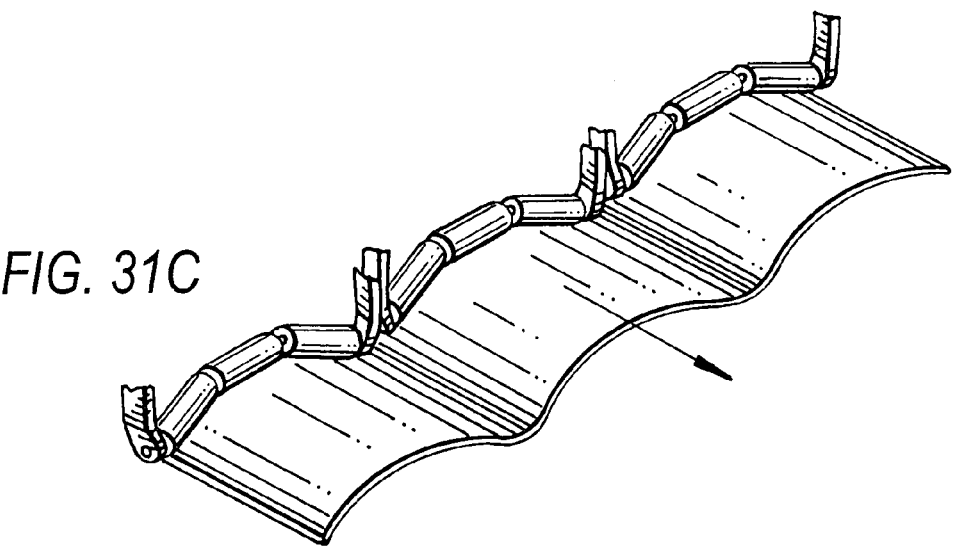
FIG. 31C

PRECISION FEED END-EFFECTOR COMPOSITE FABRIC TAPE-LAYING APPARATUS AND METHOD

This application claims priority of the Sep. 12, 2002 file date of applicant's provisional application, Ser. No. 60/410,066.

FIELD OF THE INVENTION

The present invention relates to apparatus and methods for composite fabric tape lay-up, including tape edge profiling and tape placement onto molds, plugs and mandrels and use of robots in combination with such apparatus.

BACKGROUND OF THE INVENTION

Composite fabrics, dry or pre-preg (pre-impregnated resin systems), including fiberglass, carbon fiber, graphite, ceramics, Kevlar, Aramid and other hybrids of uni-directional or bi-directional makeup have been used in the construction of a variety of products, including aircraft components, marine applications, automotive and various industrial and appliance applications to reduce weight while improving structural properties and aesthetic flexibility. These products lend themselves to products in size and shape typically not less than one square foot in surface area and that may be flat, faceted, concave, convex or a combination thereof.

Typically in applications where these products are used, the lay-up process is performed by hand. Exceptions include chopper gun technology, tape-laying and fiber placement machines. To achieve the desired structural properties with the use of chopper gun technology the application of more product in a given area is the most common method; however, disadvantages of this method include increased weight of the final product and limited ability of the result to be an engineered product. Further, robots have been employed to expedite and provide for a more-uniform and repeatable application. In either method of application this process tends to be very messy.

Tape laying machines have proven to be very accurate and reliable; however, because of the size and extreme costs associated with them, only a limited number of companies can provide product via this method. Plugs, molds and mandrels employed within the 'work cell' or envelope of the system must be very precisely built and placed. Set-up can be very costly and time consuming due, in part, to the method by which the systems are programmed.

These systems are also limited, in that the plug, mold or mandrel must typically be placed 'in position' or that the tape is always placed with gravity assist. Exceptions to this may be where the 'tack and drape' of the product being used lends itself otherwise.

A limiting factor with these machines is that the tape dispensing rolls have been limited in size, allowing for only 1.00" to 12.00" of material to be laid in a single pass, and subject to the amount of engineered overlap per seam. Because of this limitation, additional weight is added to the product being constructed. This, in turn adds to the time required for the lay-up itself and becomes an issue with respects to the out time allotted for a given resin system.

These machines do not lend themselves to the lay-up of dry fabrics such as those used in the construction of boat or ship hulls and deck components. Autoclaves large enough to house such products are impractical and therefore limit the amount of pre-preg material that can be used, even by hand, unless mobile IR (infrared) modules are placed about the product for curing purposes. These products are generally large and multi-faceted and/or concave, convex or combination surfaced and do not lend themselves to the work envelopes of commercially available tape-laying machines of today. As a result, the majority of such lay-up work is performed by hand and vacuum bagging is performed locally.

In many instances lay-up schedules established by design and engineering requirements for large parts are performed by hand with the mechanics working in concert with overhead lasers to position fabric edges in a given direction. To facilitate this process, fabric profiling and cutting machines have flourished in concert with the lay-up regime. These X-Y gantry systems have come of age providing various cutting systems including slitting, flying knives, waterjet, laser and ultrasonic tools to perform the required cuts and profiles for a given lay-up.

Again, the issue of out time for a given matrix and resin system requires diligence by the mechanic whose individual reach may limit his or her ability to place the fabric in the correct position without getting up and onto the plug or mold. Scaffolding, mobile platforms or man-lifts would then be utilized to facilitate the lay-up regime.

Typically, once the fabric for a specific lay-up has been cut or profiled, it must be returned to cold storage, typically 40 degrees Fahrenheit or cooler, until it can be laid up. This is due, in part, to the amount of time that has been used to roll out, cut or profile and label by schedule, and the additional issue that the plug or mold may be in use and not available to perform the lay-up. Even with automated versions of the cutting and profiling machines, the rate at which the human roll is performed limits the 'thru-put' of the entire process. This process is further complicated when different types of fabrics are selected by design for a given lay-up schedule.

As a result of this current lay-up process, regardless of the component being constructed, thru-put is greatly reduced because of multiple handling of the material, especially where ISO standards are practiced. These limitations therefore tend to drive up the part costs per square foot of lay-up exponentially due to component size.

With fiber placement machines specific fiber matrices and resin systems are typically placed in many applications employing mandrels, whether vertically or horizontally positioned. Cylindrical and conical shaped products lend themselves well to this method. Fiber placement machines have also been employed in the process of making up flexible products, such as sails used in marine applications that are typically complex in shape and surface geometry. In these applications mobile IR panels perform the cure process upon completion of the fiber placement. Again, such machines are limited in the amount of material that can be laid up in a given pass or path, coupled with the typically slow placement speeds.

These machines require a great deal of attention and monitoring as there are issues relating to broken fibers, resin viscosity and impregnation, not to mention the programming flexibility limitations imposed by currently used motion control software systems.

Upon examination of the aforementioned composite application, lay-up and/or placement systems currently being utilized by the various industries discussed, four areas of concern continue to plague the practical implementation and use of advanced composite construction systems, namely, human labor, out-time limitations of the material itself, flexibility of the process or system for lay-up and the enormous costs associated with the equipment currently available.

SUMMARY OF THE INVENTION

The new invention abbreviated herein as 'Precision Feed End-Effector' or 'PFE', has been designed to overcome many of the issues defined above. It has been designed with both modularity and flexibility in mind. The PFE device combines various proven technologies into one simple configuration. This simple approach allows for simplicity in its components and service requirements.

The PFE device was designed specifically to be used by commercially available robots that can manipulate working loads 50 KGs or greater. With the advent of quick release couplings and active and passive force sensing technology units, the provision for the flexible placement of both dry and pre-preg composites can be realized.

The PFE device is constructed from basic assembly modules allowing for the expansion of the basic module unit, capable of laying six inches of material to be chained together in six inch increments up to but not limited to sixty inch rolls of commercially available fabrics. The basic module unit provides the tool the ability to conform to a given plug, mold or mandrel surface in real-time as the robot performs a given path and program offset. This invention can be used with smaller units such as shorter rollers or a single roller.

The PFE's basic module unit performs this surface shape change via use of a realtime gas, pneumatic or mechanical spring pressure regulated force feedback system that operates in the 40–80 psi range, depending upon the density of the fabric make-up and resin system. The functionality of the basic module unit is similar to that of the application of paint on a flat surface using a paint roller.

In one preferred embodiment there are three two inch long, ⅝ inch diameter rollers per basic module unit. The rollers are made up of two parts, the core being a dense solid composite material and the exterior consumable sleeve being soft in density to provide for the absorbing of plug, mold or mandrel surface deviation that the flexibility of the basic module unit does not provide for. The basic module unit is comprised of one set of three rollers, with an adjacent 'guide' panel that provides for the fabric to be channeled down between the set of rollers and the guide panel to lay-up onto the mold. These non-powered rollers are linked via a flexible shaft that is supported at both ends of each roller by hinging roller link arms that pivot in the cross-axis top and bottom. From a top view the rolls maintain a straight-line regardless of how many basic module units are linked together. However, from the front view each roller can pivot in its relationship to the one next to it by as much as twelve degrees up or down. A minimum radius of twelve inches can be achieved in either concave or complex surface geometry. Additionally, a spline curve may be achieved by having the out-board rollers pivot in opposite directions with the twelve inch radius being maintained in both directions. Also shown and described herein is a second embodiment of the basic module comprising two adjacent sets of three rollers as identical halves. The tape is then dispensed around one set onto the mold.

In one configuration, the pivoting is performed via the pneumatic system incorporating two double-acting cylinders at opposing ends of the basic module unit. These cylinders are connected to a shared pivot point located at the top center position of the basic module unit. These cylinders independently apply or bleed air, based upon the mold surface the unit passes over and a programmed positive and negative pressure value limit. As the mold surface below changes in relation to a given programmed path and offset the robot performs, air pressure is added or bled off to compensate. The basic module unit is attached to a structural chassis that provides for several process functions to be performed in concert with the actual lay-up regime.

The current design incorporates two tiers of suspension regardless of how many individual six inch (nominal) modules are incorporated into a specific overall tool width (i.e. 6, 12, 18 inch, etc). Each module includes a set of gas springs that are sized based upon the process the PFE will be asked to perform, which is to lay up the tape at the appropriate pressure. In the first tier of individual modules the distance that the outboard rollers will travel in either the concave, convex or opposite directions respectively, will be constrained via the gas springs' stroke (to be determined) and force desired (to be determined). When assembled, the module will maintain a level line via mechanical constraints that limit the swing travel for each roller to the center of the maximum and minimum radius that the module will have to see during the lay-up regime.

When combined, multiple modules are attached to the second tier suspension system that accommodates the travel (in the same fashion as the first tier), only it is constrained in a vertical slide movement of which each joint at each lower module connection provides the pivot point. Each suspension slide mechanism is comprised of a sliding stanchion that moves vertically in relationship to the combined movement required, as the robot moves the tool (PFE) over a given path geometry at a fixed offset dimension that is based upon the maximum and minimum radius' that the tool (PFE) will see during the lay-up.

Other designs will accomplish this without the use of gas-springs where the radius' seen by the tool will be shallow. Otherwise, the gas spring design will be employed to accommodate the large radius movements that may be seen by the tool. Still other designs will use a sponge type of spring in place of the gas or pneumatic spring to reduce overall size, or will use mechanical or pneumatic spring systems.

When connecting multiple basic module units together for increased fabric area placement, a second tier pneumatic force compensating link system is added to a second level uniform structural chassis and operates in the same manner as the individual basic module unit.

The structural chassis provides the method of connection and communication with the robot and is attached via commercially available quick change systems that incorporate both perpendicular and radial active force sensing capabilities that actively instruct the robot to make changes in its position about a three-dimensional point in space based upon the forces seen by the system as it moves over the surface of the mold along a given path.

This chassis also contains an 'in-line' fabric profiling system that cuts and profiles the fabric as it is dispensed from the supply roll mounted on the chassis upstream of the profiling system. An internal set of powered drive rolls of similar construction to those in contact with the surface of the mold, drive and supply tension both upstream and downstream of the fabric cutting area so that the fabric is always taut, either in a vertical or horizontal plane.

The cutting system employs an encoder that measures the amount of material required for a given lay-up pass. The steps taken by the system to locate the end of the material and establish the offset dimension are simple. Once the material is loaded into the PFE and the leader is placed below the cutting line (the line established by the path the cutting wheel makes) and the system is closed for use, a cross cut is made establishing the new offset dimension. At that point the distance from the encoder to the 'cut line' is known and is now added to the final dimension of the first part laid up. After that, the system now knows how much material is ahead of the encoder position.

When slitting (cutting vertically with the direction of material feed) the cutting head assumes the vertical position and is positioned accordingly, based upon the centerline of the material width being used. The centerline is the same line used by the robot for path planning and the same line applied to the model of the mold when assigned off-line by the system. The cutting system creates the 'Y' axis (cross axis) to the 'X' axis (material feed direction). An alternate design may incorporate an ultrasonic cutting head that will provide cuts in any angle. This will also lend itself to the cutting of free forms, including circles.

Because the supply roll will change in weight and size as material is drawn from it, a supply roll surface friction drive of the same diameter as those used throughout the system, applies a programmed pressure against the supply roll, and is linked to the drive rolls used within the cutting area. This simplifies the control requirements and standardizes the system components employed. The cutting system performs cutting against the direction of fabric flow and can perform cuts in either linear or spline configuration in the 0 degrees (horizontal left to right) to the 90 degrees (vertical) counter clockwise quadrant.

To address issues of out time for a given fabric and resin system, the roll is encapsulated within its own refrigeration module integrated into the chassis that supports and drives the fabric. In-line IR panels can be incorporated to rapidly bring the resin system to the desired temperature just prior to its profiling/cutting and lay-up.

The PFE device can perform a wet lay-up process using supplied dry fabric material. Individual heated pumped resin vat systems are attached to the chassis both above and below the last set of lay-up rollers at the surface of the mold, and identically functioning roller/squeegee tools, with functionality and positioning the same as the base module unit, perform the resin impregnation process typically performed by hand. Excess resin is vacuumed and recycled at the surface as the volume of resin increases during the squeegee process.

To provide the most flexible production process, individual PFE devices may be stored in a docking station about the robot cell work envelope allowing for change in size or type of fabric being placed in a given lay-up. PFE devices can be loaded with the desired fabric and/or resin system at the docking stations and therefore provide the lay-up system with uninterrupted operation.

The PFE devices are controlled via their own onboard PLC controller. When the robot arm engages the device, communication and programming parameters are then transferred to the unit. If a supply roll runs out before a given path has been completed, the robot will be given instructions to return to that location upon exchange or refill of the supply roll. The resin system will function in a similar manner.

Options to the device may include vision and camera systems to document the lay-up and real time, NDT (non-destructive testing), three dimensional stitching and UV (ultraviolet) curing and documentation to expedite the inspection process prior to the placement of the parts within an autoclave or performing vacuum bagging.

Because the PFE device has been designed for use by commercial robots, expansion of the work envelope in all three axes is made simple. By integrating floor track systems, wall mount monorail systems and gantries, the robot may be shuttled, wall-mounted or inverted via an external transport system. Commercial robot controllers are capable of communicating to as many as twenty-four axes or more in either coordinated or simultaneous motion control. This, therefore, addresses the last issue, that of the cost of implementation. Turnkey system costs can typically be paid for in as little as 18–24 months, depending upon the configuration selected, including the robot and all required 'off the-shelf' software, while providing greatly enhanced thru-put with unmatched repeatability.

Programming of the system or cell may be performed either at the cell via a hand held teach pendant or off-line using software models of the part to laid up and the calibrated kinematic model of the robot and any peripheral positioning devices.

This composite fabric tape lay-up invention includes a new complete Precision Feed End-Effector (PFE) alone and in combination with a robot, and also the component sub-assemblies of the suspension and tape-dispensing system, the in-line fabric profiling or tape cutting system, and the refrigeration and heating systems. This invention includes various combinations of these subassemblies and various embodiments of same.

This invention incorporates or cooperates with certain known parts or subassemblies such as a commercially available robot, a supply roll of composite tape having pre-selected composition, characteristics and dimensions, and a mold, plug or mandrel onto which the tape is laid-up. For convenience hereinafter the term "mold" will be used to represent mold, plug or mandrel.

In the tape lay-up process the PFE delivers the tape along a path that is a straight line across the surface of the mold. The X, Y, Z spatial location of the path and the direction and speed along the path are predetermined in the controller. Thereafter the PFE conforms to the Z-component contours to the left and right of the path (line) by the contact and feedback of the suspension system, while maintaining relative perpendicularity to the mold surface.

More particularly, force-sensing feedback is achieved at the faceplate of the robot along the sixth axis, where it will average the combined forces from the lower suspension system. The dispensing rollers will now be totally compliant with the mold surface at every point of travel. The force feedback located at the sixth axis of the faceplate of the robot combined with force feedback information in the lower suspension system will provide the desired force for each given lay-up. Force sensing is done electrically or pneumatically or by a combination of both.

Thus, the PFE tape dispensing device comprises one or more PFE basic module units, each having a set of three articulated lay-up rollers, each module thus is capable of laying six inches of tape width. When "daisy-chained" together such basic module units can lay tape of up to a sixty-inch width or greater. The length, diameter and number of these rollers can be varied as required.

In the basic PFE module the center roller is set at a fixed distance relative to the robot arm, and the two side rollers are either coaxial with the center roller or articulated or angulated to define with the center roller a line of contact that is convex, concave curve, sinusoidal or some combination of these forms. In this module the three rollers are in an end-to-end configuration with the center roller rotatably mounted at a fixed elevation relative to the robot arm and the side rollers pivotal relative to the central roller so that all three rollers remain in the same plane which is generally parallel to the plane of the tape descending onto these rollers. For convenience of description herein, we will assume the PFE is below the robot arm and the mold is below the PFE; however, PFE orientation may also be horizontal, upward or angled.

The invention herein has been described above with respect to various of its components and operations. A more global or generalized description now follows.

This invention is a totally new apparatus and method for composite fabric and tape lay-up that will be summarized below, first as to general concepts, and thereafter as to components and details. For convenience herein, the term tape is intended to mean tape or composite fabric, and tape lay-up means tape or composite fabric lay-up.

The invention begins with the object to form with layers of tape a predetermined shape such as an airplane wing or fuselage or a boat hull, windmill blade, or other configuration. The topography of the desired shape is initially defined by a physical mold, mandrel or plug or by a computer generated simulation of the desired shape which is subsequently formed into a physical mold. A plan is established to lay-up strips of tape of predetermined width onto the mold, with successive passes the tape strips being laid up either with overlapping edges or adjacent butt joints. The centerline of each strip will be laid along a predetermined path which is established from points defined by x, y, z coordinates and further defined by pitch, yaw and roll values. Thus, a program is established to traverse the mold surface by successive parallel passes of a contact roller module which lays a strip of tape in each pass. As described below, there may be one, two or more aligned contact roller modules for each pass. Also, the contact roller module(s) may be fixed in position with the mold being rotated to achieve the pass. The passes achieve lay-up of strips of tape in parallel paths onto the mold regardless of the changing contours of the mold surface. Each strip of tape is laid-up to lie with its center line aligned with a line of said program of parallel lines on said surface.

The contact roller module may have a single contact roller or a set of two or three rollers, or two or more modules may be aligned and linked together. For understanding this invention, this first example will assume a single module with a center contact roller and two adjacent side or outboard rollers. These rollers are axially linked, all are freely rotatable, and the outboard rollers may be articulated or angled with respect to the center roller.

The center roller is positioned by the robot to be contacting the mold with the center line of the roller aligned with the programmed line to be traversed on the mold, and it is positioned to contact the mold and thus to be at a predetermined offset distance from the robot. This center roller is maintained in contact with the mold by a suspension system that applies a predetermined force to press the tape down against the mold during the tape lay-up process. The robot is programmed to direct the module and its center roller to traverse the straight line (each straight line pass) and at all times to remain in said predetermined pressure contact, regardless of elevational changes of the surface or changes in incline of the surface. At all times the robot orients the module to be perpendicular to the mold surface being contacted.

Thus, at each moment there is a specific first area of mold surface being contacted by the central roller. Adjacent said first area are side areas which may be contoured downward, for example, relative to the first area. It is necessary for the outboard rollers to contact with pressure these side areas during the tape lay-up. The robot's computer program does not need to "know" the topography of these side areas, because the suspension system will constantly urge the outboard rollers downward into contact with said side areas. The tape being laid up has width essentially the same as the total width of the three rollers. A feedback aspect of the suspension system will register the force applied and adjust the downward force to the designated amount. The suspension and feedback system may average or at least evaluate the forces at the center and outboard rollers so that all three rollers apply force on the tape being laid-up at approximately the same desired force.

The suspension system may utilize gas, pneumatic, mechanical spring or other elements. This system allows the side rollers to be compliant with contours that extend upward (closer to the robot) or extend downward (farther from the robot) while still applying a downward force within a predetermined range.

As noted above, a series of contact roller modules may be linked together to have total width of five to 200 feet or more, and thus to lay-up tape of equivalent width. With multiple modules, the suspension system requires additional linkages and feedback elements; however, the overall system still uses the central roller to follow a designated path that is programmed into the control means and effectuated by the robot, and the suspension system that causes the outboard rollers and linked additional contact roller modules to be compliant with the mold surface and to apply the designated force during lay-up.

Additional aspects of this system include profiling or cutting one or both side edges of the tape to deliver each strip with the designed shape as dictated by the control means, and cutting each strip to have a desired length before it leaves the dispensing head.

During each lay-up phase a strip is driven by feed rollers from the feed roll to the profiling and cutting unit, and thence by lower feed rollers to the contact roller module(s). During the delivery of the cut strip to the contact rollers, it is desired to form the tape into a forward directed or bullnose curve just before it contacts the mold surface and starts under the contact roller. The lower part of the tape strip is thus formed to bulge in a curve or wave form directed forward in the direction of movement of the contact rollers. The result is most significant, in that the tape begins its descent in a vertical plane generally perpendicular to the mold surface being contacted, then the tape bulges forward, then curves downward and finally rearward and goes under the contact roller. The tape in being laid-up thus goes through a transition from vertically downward to horizontally rearward, which is a 90° turn, but it does so by first traversing a relatively large radius forward curve, so that it never takes a sharp turn and it is neither stretched nor crumpled as it makes the turn and becomes laid up under the contact roller(s).

This forward bullnose curve is established and maintained by an idler support roller situated within the bullnose for establishing, supporting and maintaining the bullnose shape. This support roller is itself supported by linkages of suspension and feedback means which direct the support roller as regards the shape of the bullnose curve and the force applied depending on many factors, including but not limited to the speed of lay-up, the weight, size and characteristics of the tape, and the mold contours encountered.

DESCRIPTION OF THE DRAWINGS

FIG. 7 is top and front perspective view of the PFE of FIGS. 4 and 6, FIG. 11 is a top and front perspective view of the placement suspension system seen in FIG. 9 with separation panels removed and deflection panels showing.

FIGS. 31A, 31B and 31C are fragmentary schematic views showing a three-module tape-laying head in straight-line, sinusoidal and wave shapes respectively.

DETAILED DESCRIPTION OF THE PREFERRED EMBODIMENT

Figure 30:
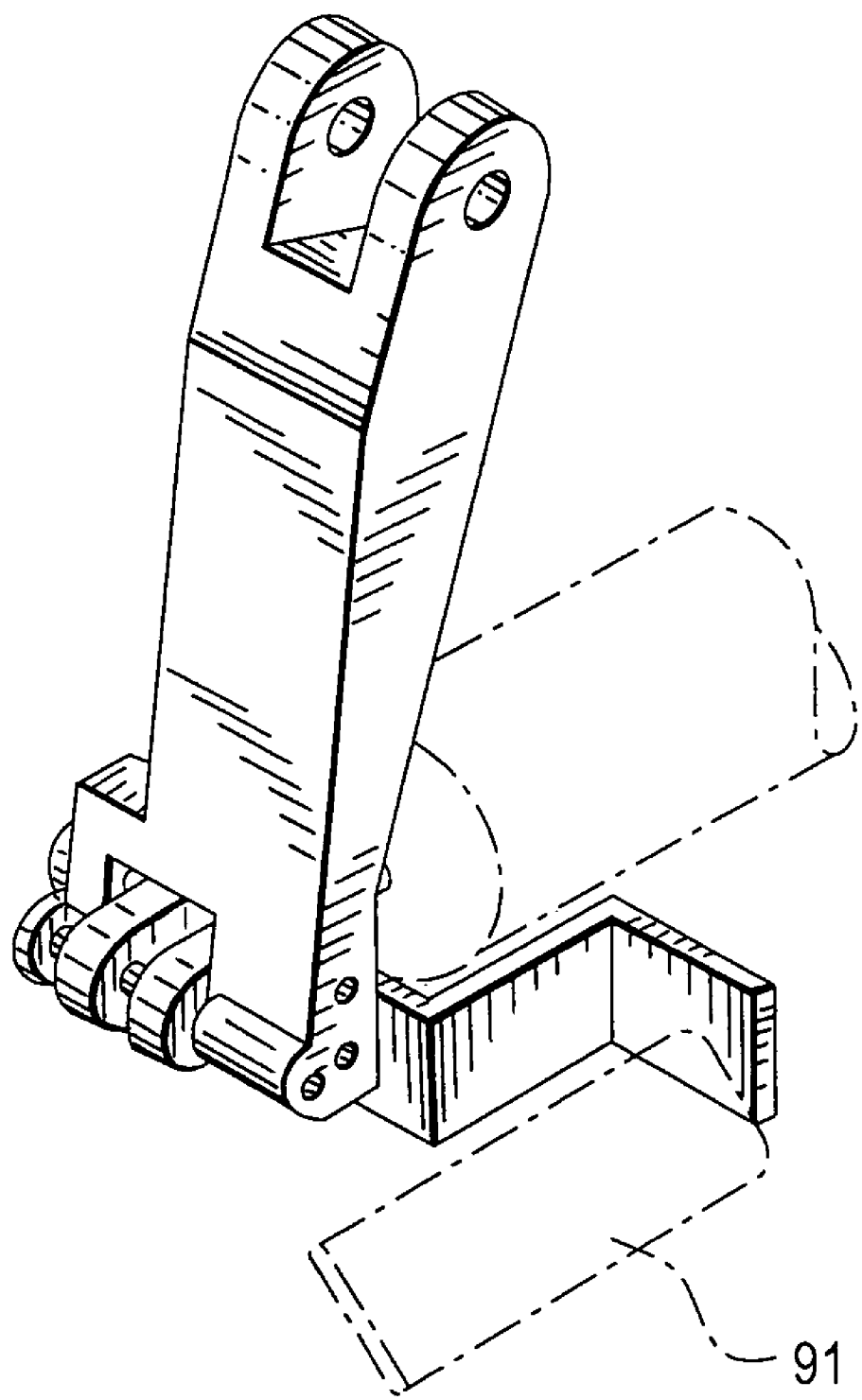
Figure 32:
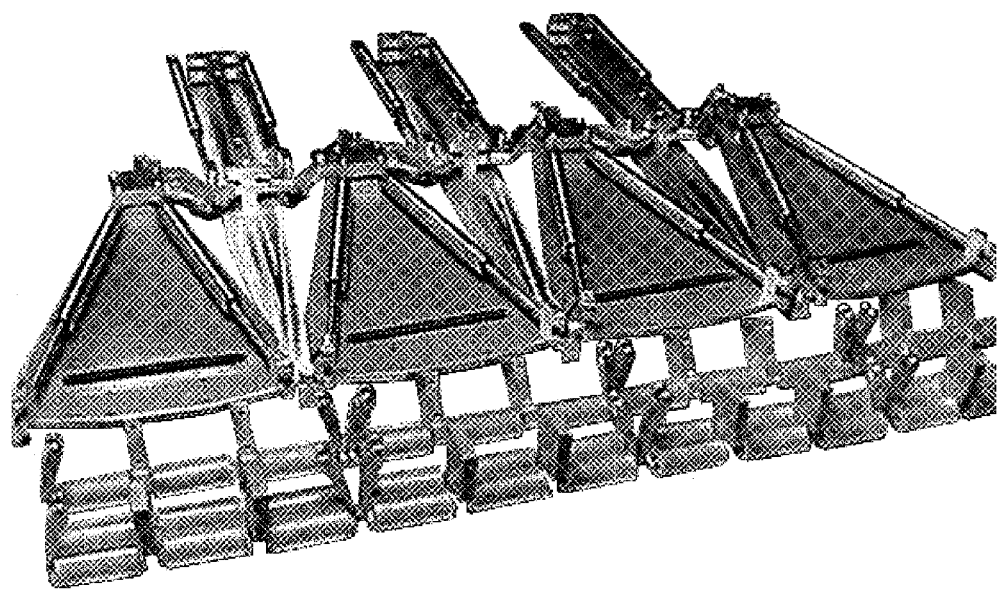
FIG. 32 is a photo showing front perspective view of four PFE module units partially assembled.
Figure 33:
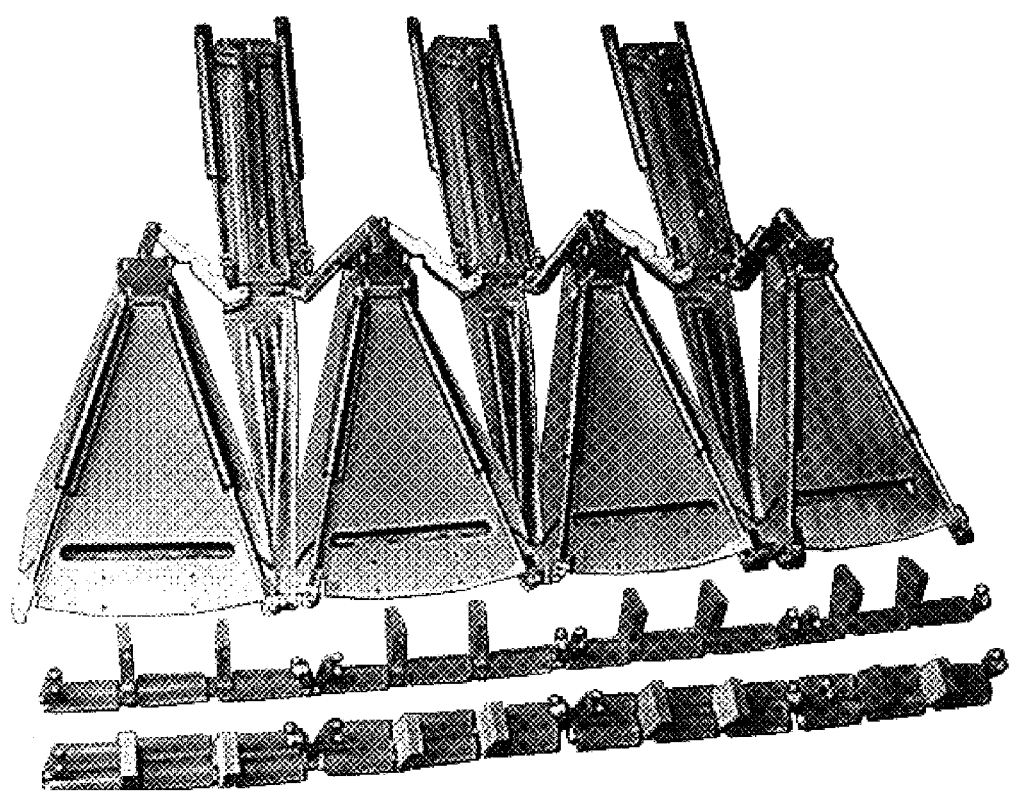
FIG. 33 is a photo showing top perspective view of FIG. 25.
Figure 34:
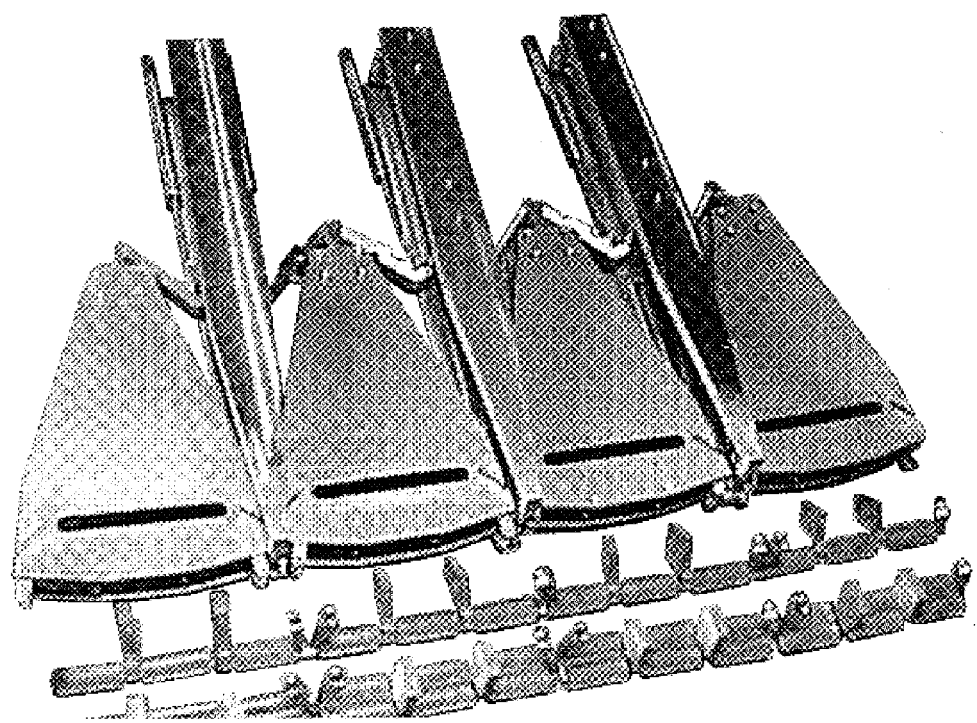
FIG. 34 is a photo similar to FIG. 33 showing the PFE in further assembled state.
Figure 35:
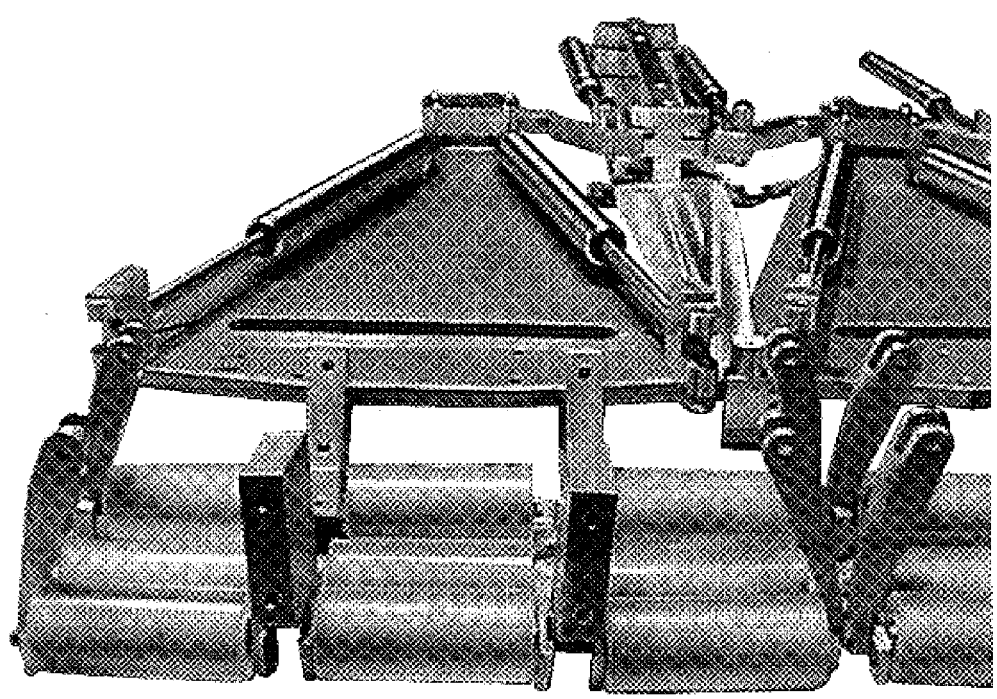
FIG. 35 is a photo showing an enlarged front perspective view of FIG. 32.
Figure 36:
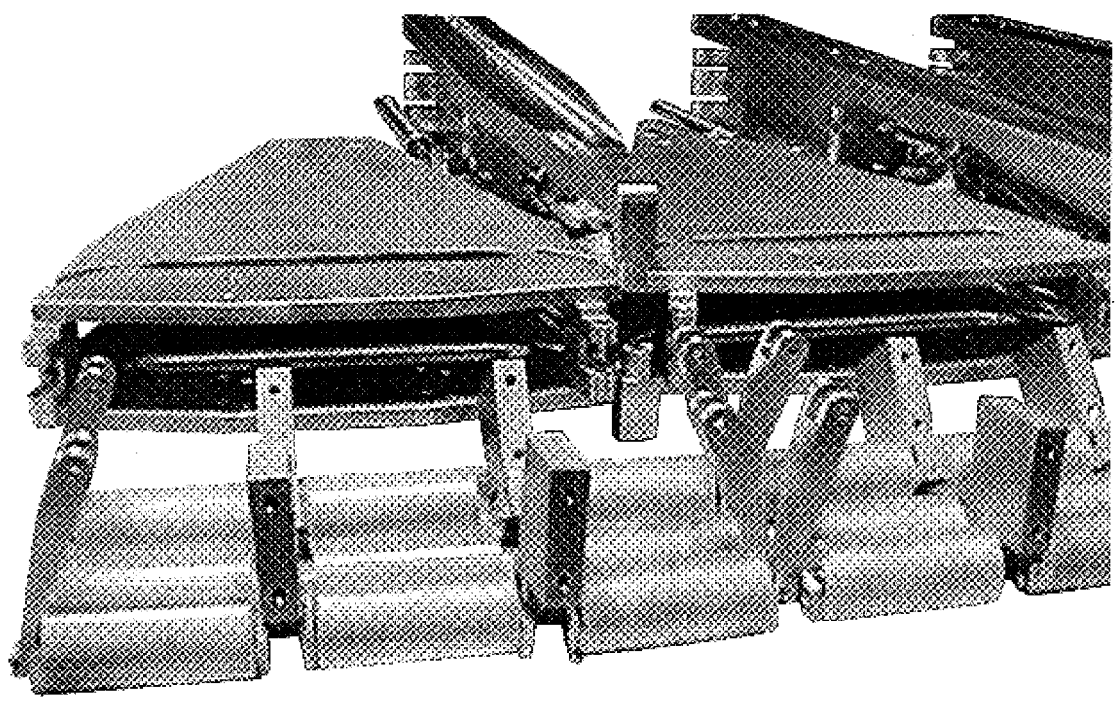
FIG. 36 is a photo showing an enlarged front elevation view of FIG. 35.
Figure 37:
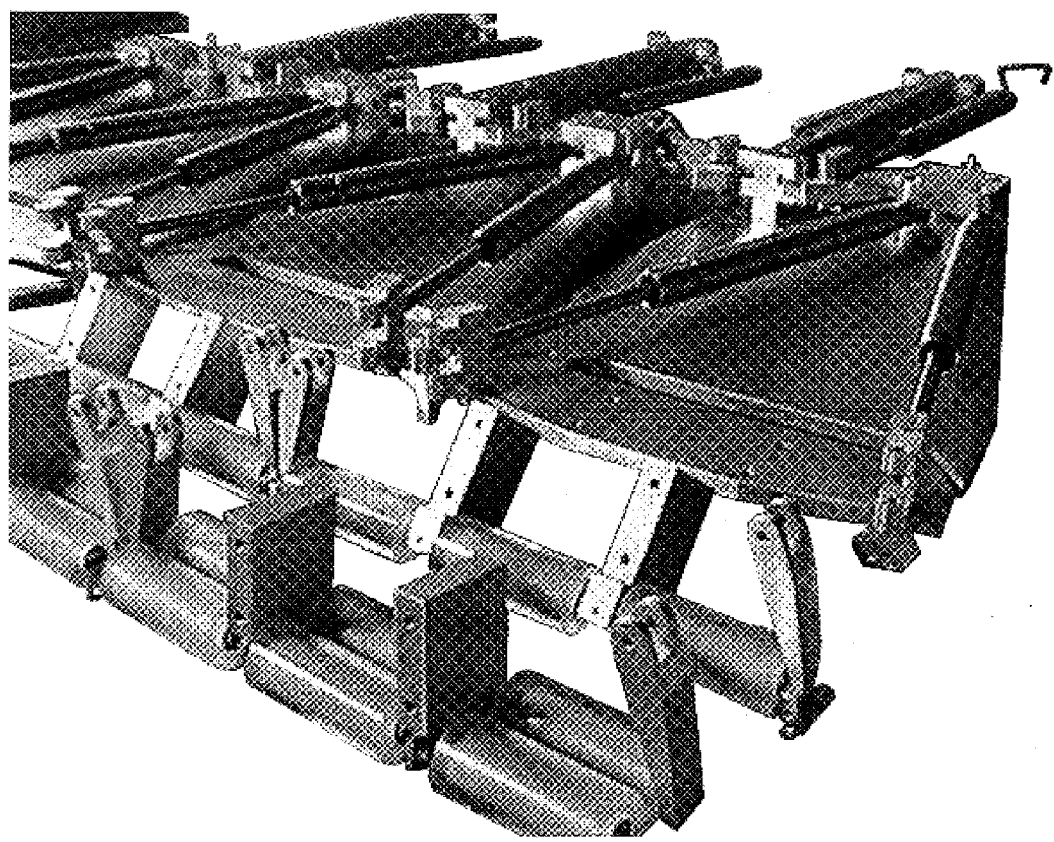
FIG. 37 is a photo showing an enlarged right side perspective view of FIG. 35.
Figure 38:
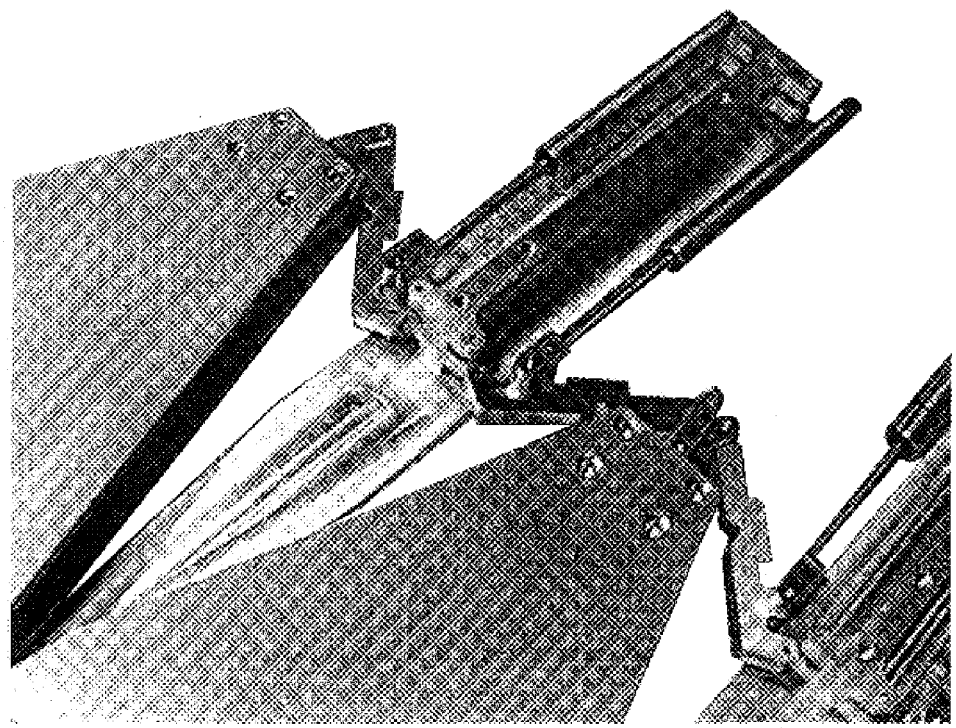
FIG. 38 is a photo showing an enlarged top perspective view of the upper link subassembly of FIG. 32.

This invention is illustrated herein in the form of a first embodiment, shown primarily in FIGS. 1–18, where the PFE tape-laying head has four basic modules or module units, each having three rollers, and a second embodiment where the PFE has three basic modules. While both of these embodiments are shown with two side-by-side sets of basic modules where the tape is fed between them, the preferred embodiments of this invention comprise a variation of said first and second embodiments where one of said two side-by-side sets of basic modules is replaced by a guide plate as seen in FIG. 30. Thus, it should be understood that the descriptions of the first and second embodiments are intended to include this third embodiment variation. For convenience, some of the components in the second embodiment which are essentially the same as components in the first embodiment will be given the same reference number. As will be explained later, in both the first and second embodiments the rollers are configured as two sets of rollers situated side-by-side, thus defining two planes generally parallel to each other.

Figure 1:
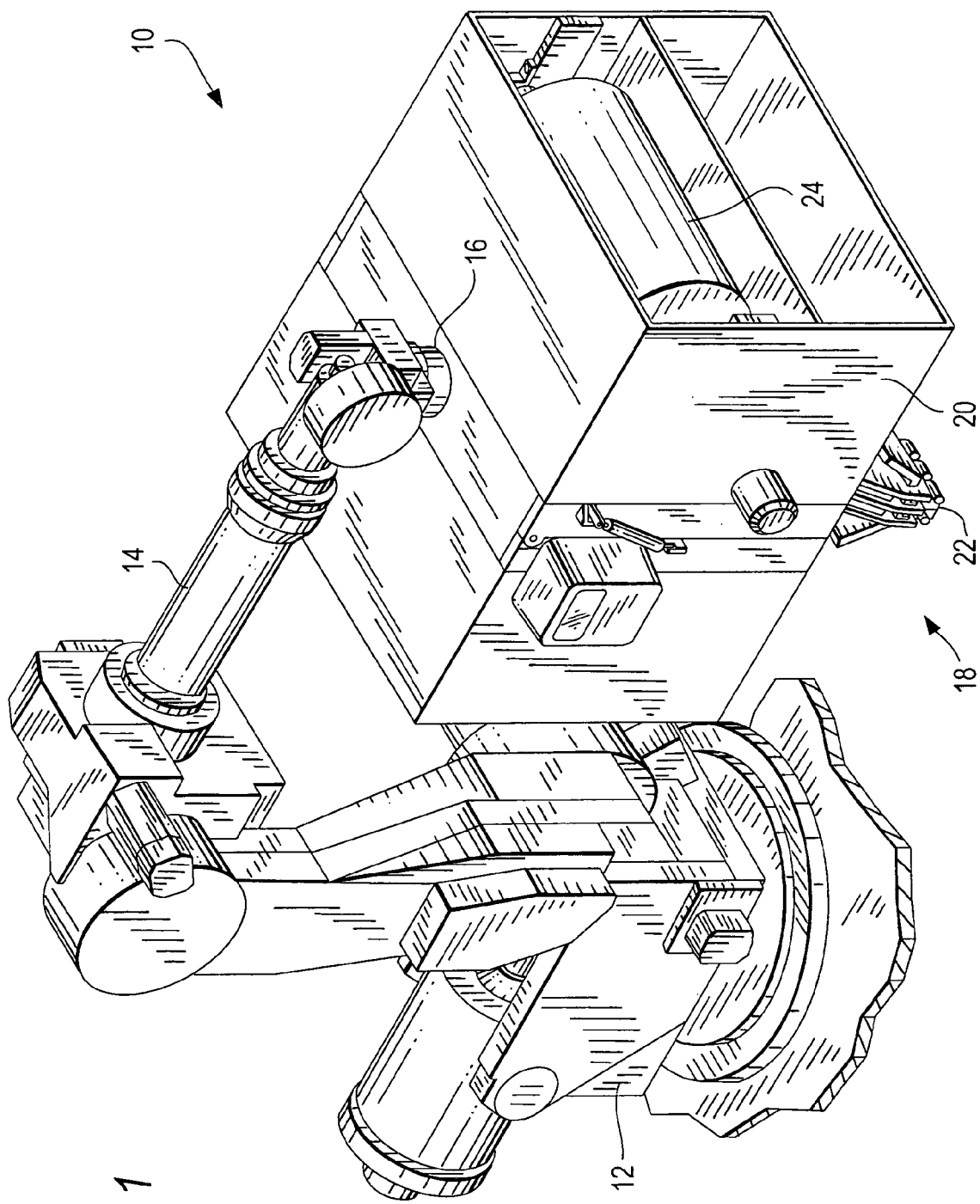
FIG. 1 is a top and front perspective view of the new PFE attached to a robot.

FIG. 1 shows the Precision Feed End-Effector, PFE, as a complete system 10 which includes robot 12 and the PFE assembly 18. The robot in these embodiments is available under the name Motoman Robot Controller coupled with an off-line programming Software package and providing up to twenty-four axes of control within the work envelope.

In FIG. 1 the PFE unit 18 is shown generally within a housing 20 with the suspension subsystem 22 shown at the bottom portion of the PFE and a supply roller 24 providing the continuous strip of composite fabric which may be dry or pre-impregnated for use with this system. Obviously different supply rolls of different composite tapes can be used as needed.

The PFE is connected to the robot arm 14 by a robot attachment plate 16, since the PFE can be replaced by other PFE's. A basic offset distance is established from said robot attachment plate to the surface of the lay-up rolls at the lower portion of the PFE subassembly, so that the placement of the tape by the lay-up rolls is precisely located.

Figure 1A:
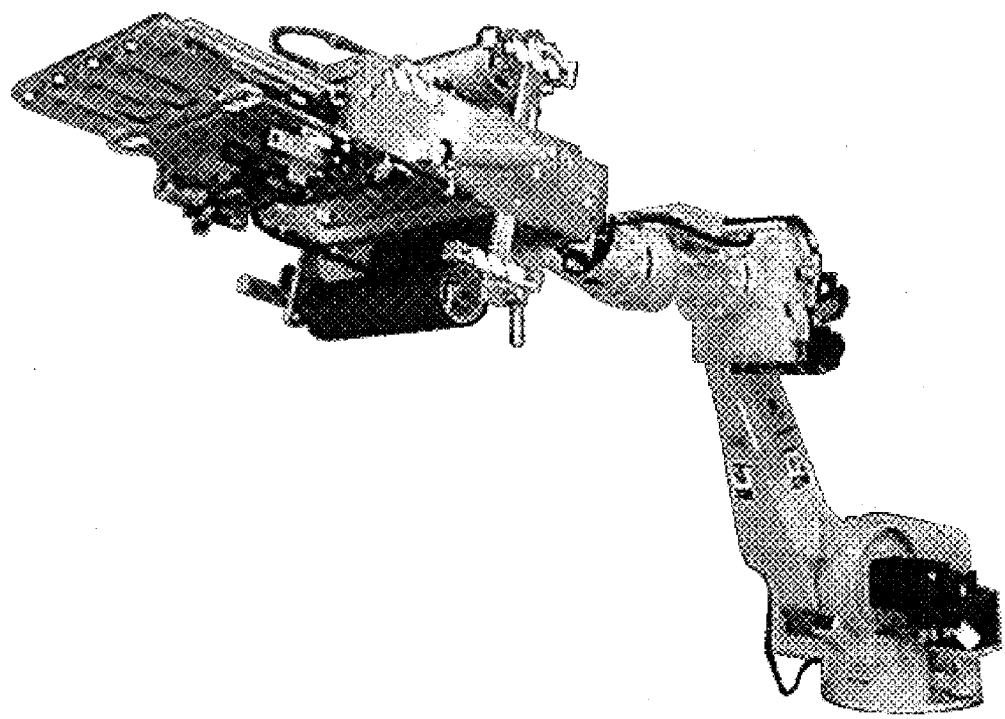
FIG. 1A is a front perspective view of the PFE of FIG. 1 shown in horizontal extension.

FIG. 1A shows the PFE device in horizontal orientation extending from the robot arm.

Figure 1B:
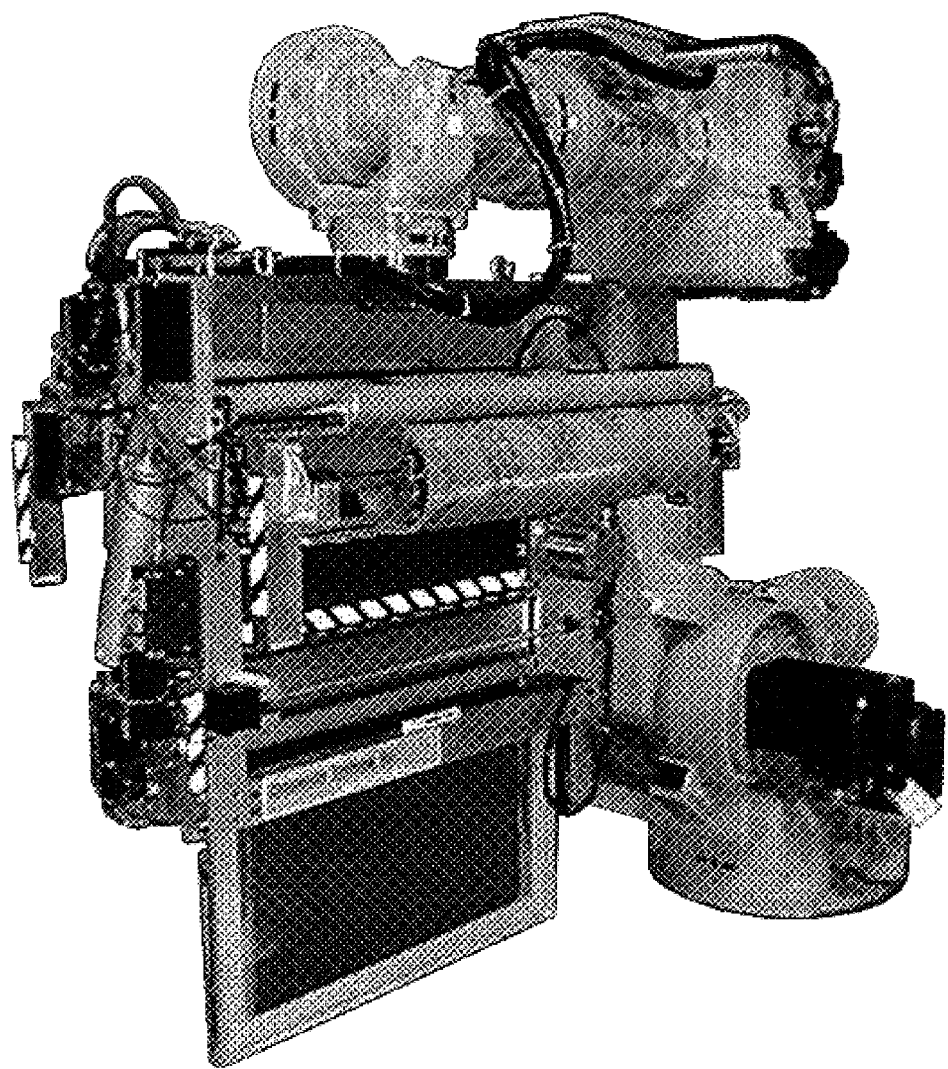
FIG. 1B is a front perspective view of the PFE of FIG. 1 shown in downward extension.

FIG. 1B shows the apparatus with the PFE in downward directed vertical orientation.

Figure 1C:
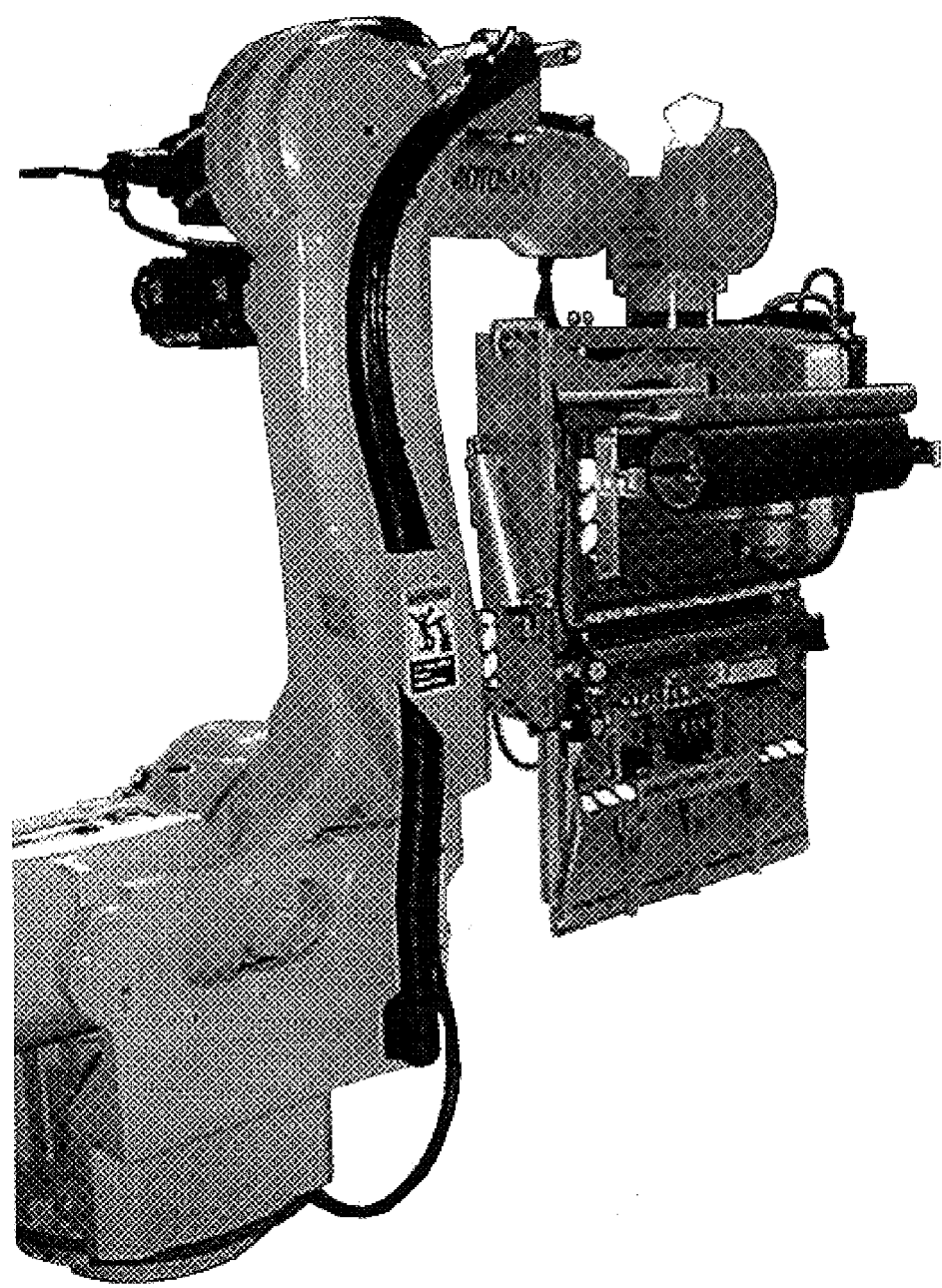
FIG. 1C is a right rear perspective view of the PFE of FIG. 1B.
Figure 1D:
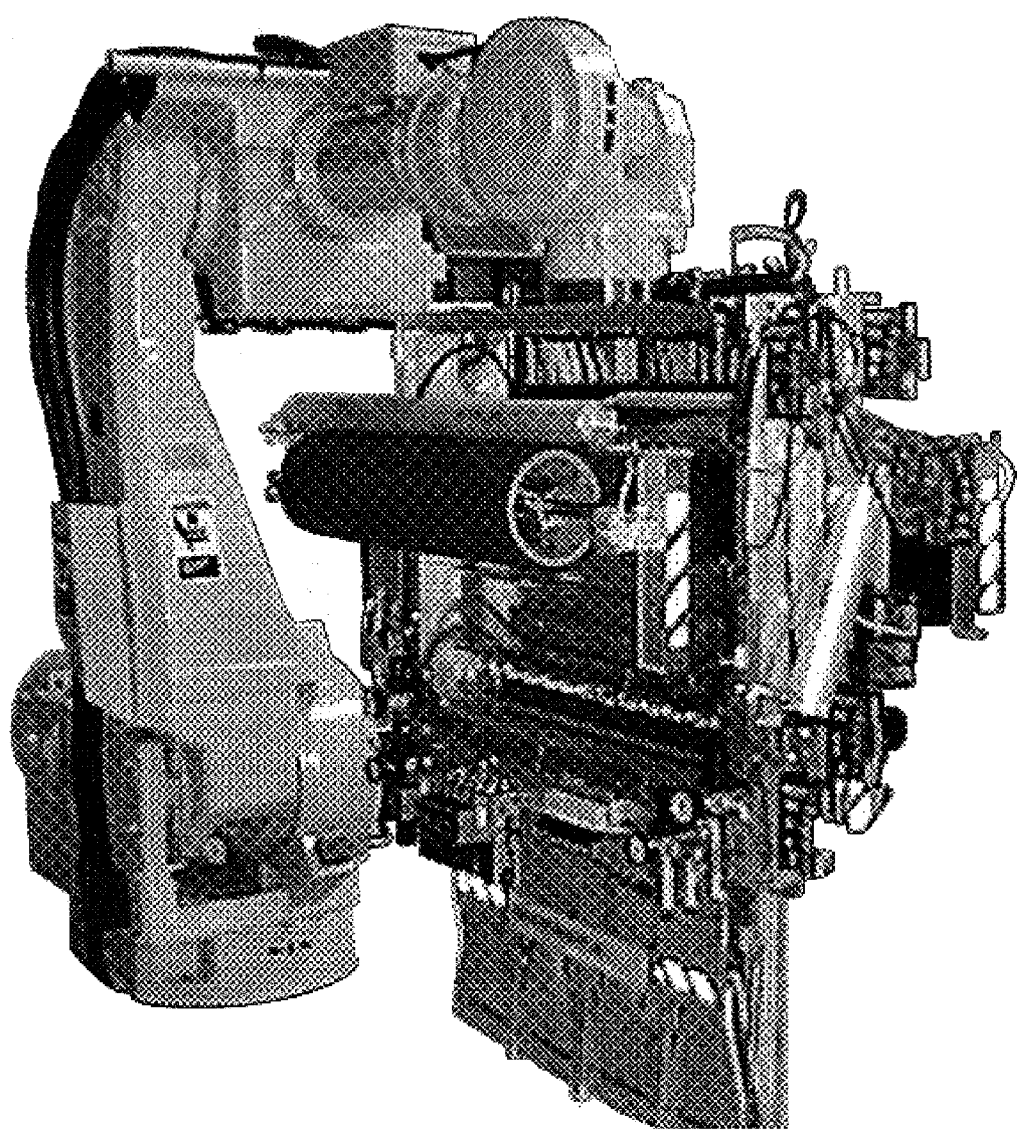
FIG. 1D is a left rear perspective view of the PFE of FIG. 1B.
Figure 1E:
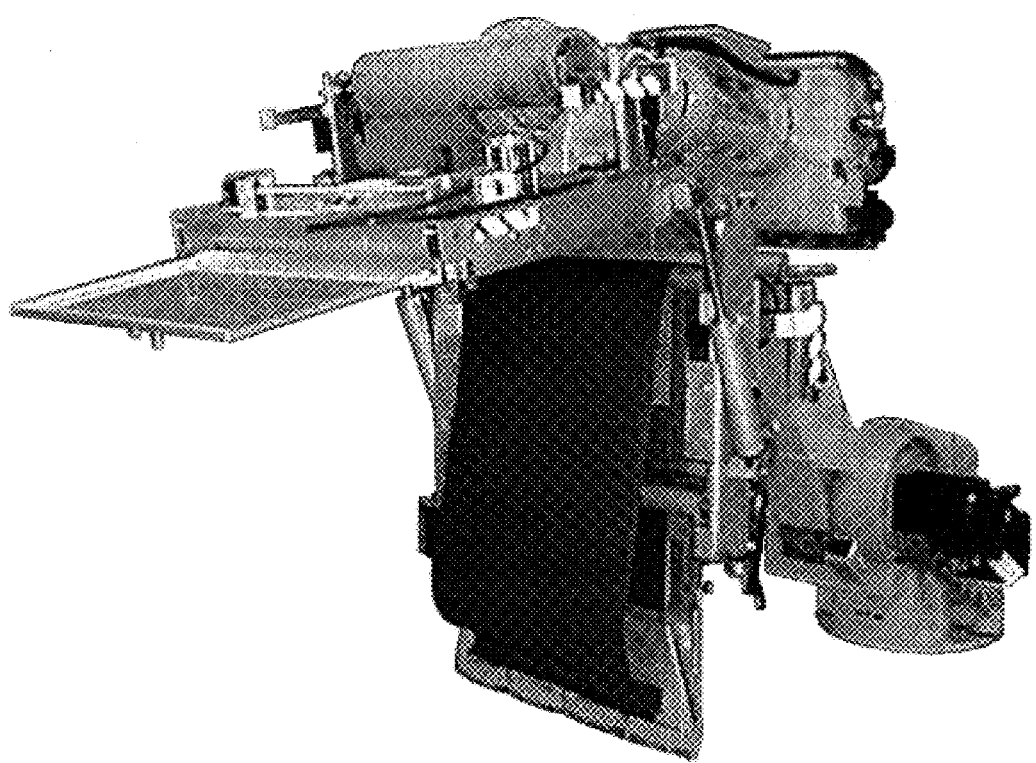
FIG. 1E is a rear perspective view of the PFE of FIG. 1B shown with the chassis in open condition.
Figure 1F:
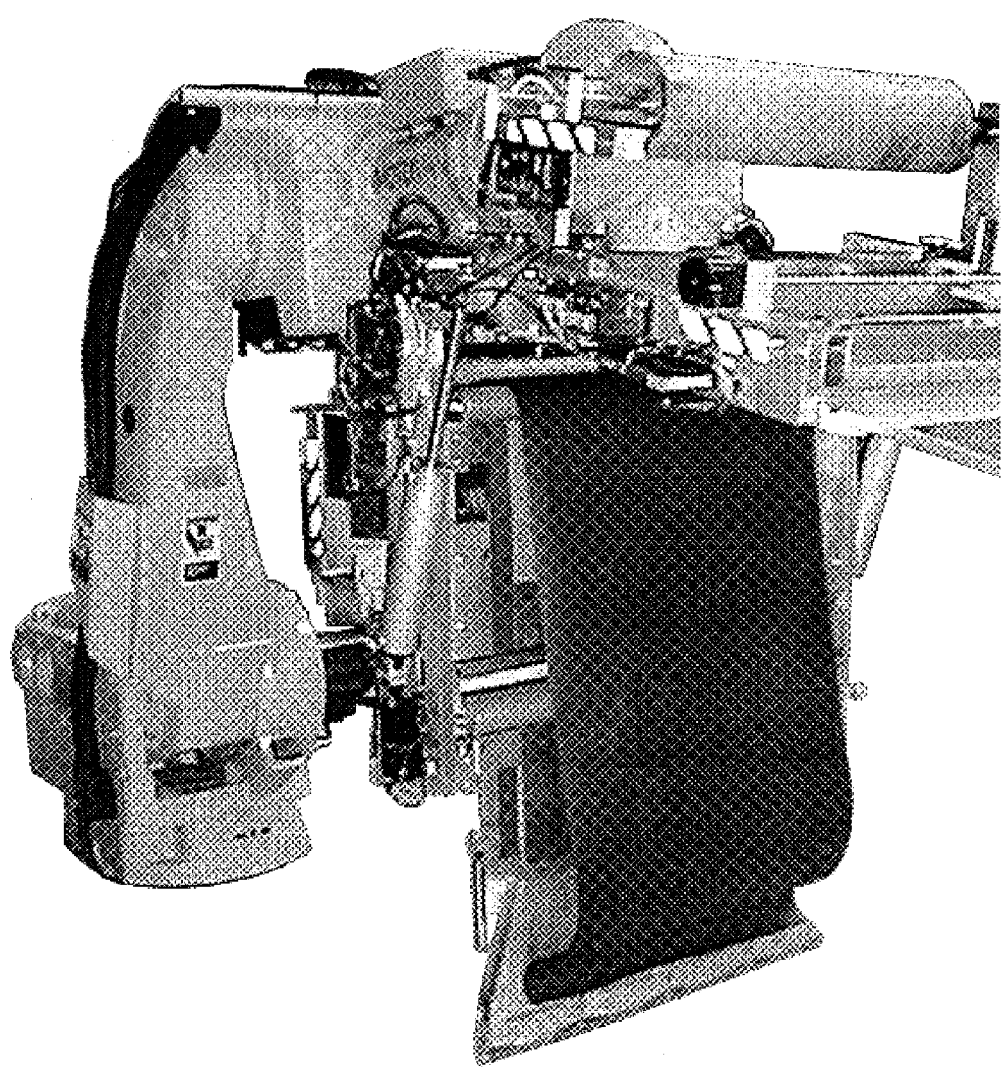
FIG. 1F is a left front perspective view.

FIGS. 1C and 1D illustrate further views of the PFE apparatus in downward extending orientation, and FIGS. 1E and 1F show the same device in downward orientation with a side panel of the housing pivoted up and away into a generally horizontal orientation to expose the tape within and to expose the workings of the PFE for adjustment or correction or change.

Figure 2:
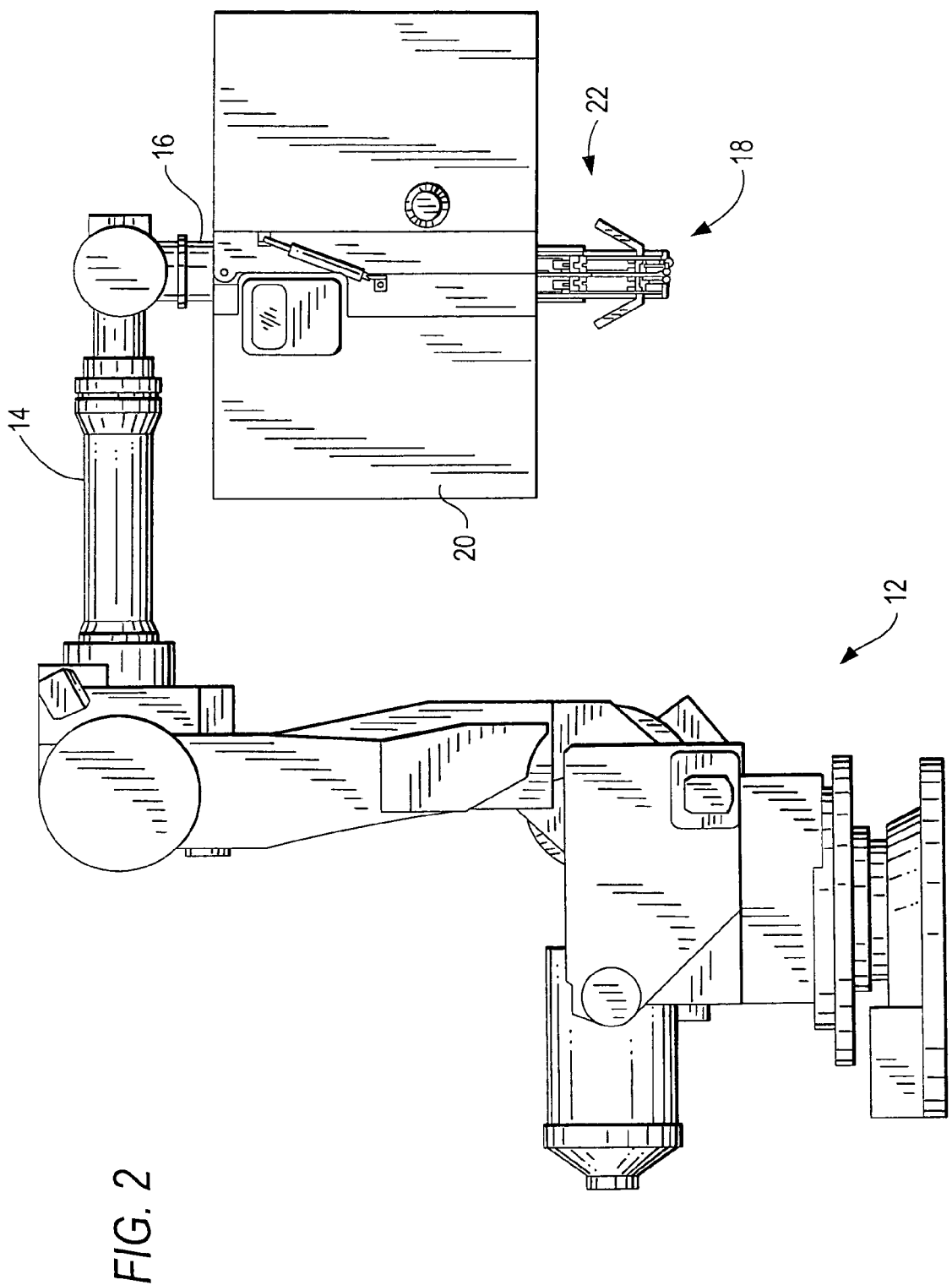
FIG. 2 is a left side elevation of FIG. 1.

FIG. 2 shows the same apparatus as in FIG. 1 but in a side elevation view.

Figure 3:
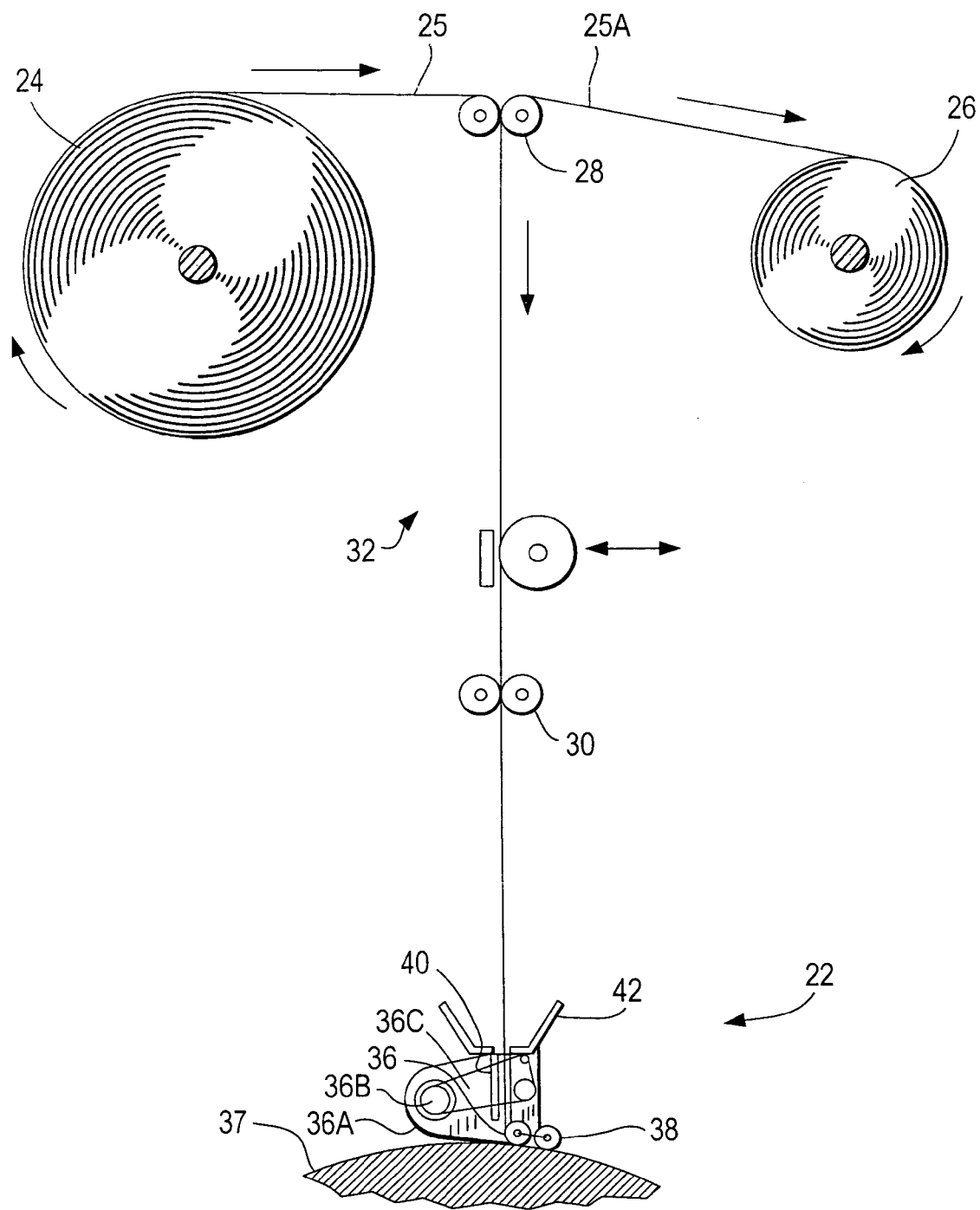
FIG. 3 is a schematic view showing the path of the tape through the PFE, with added illustrations of the bullnose formation of the tape fabric.
Figure 4:
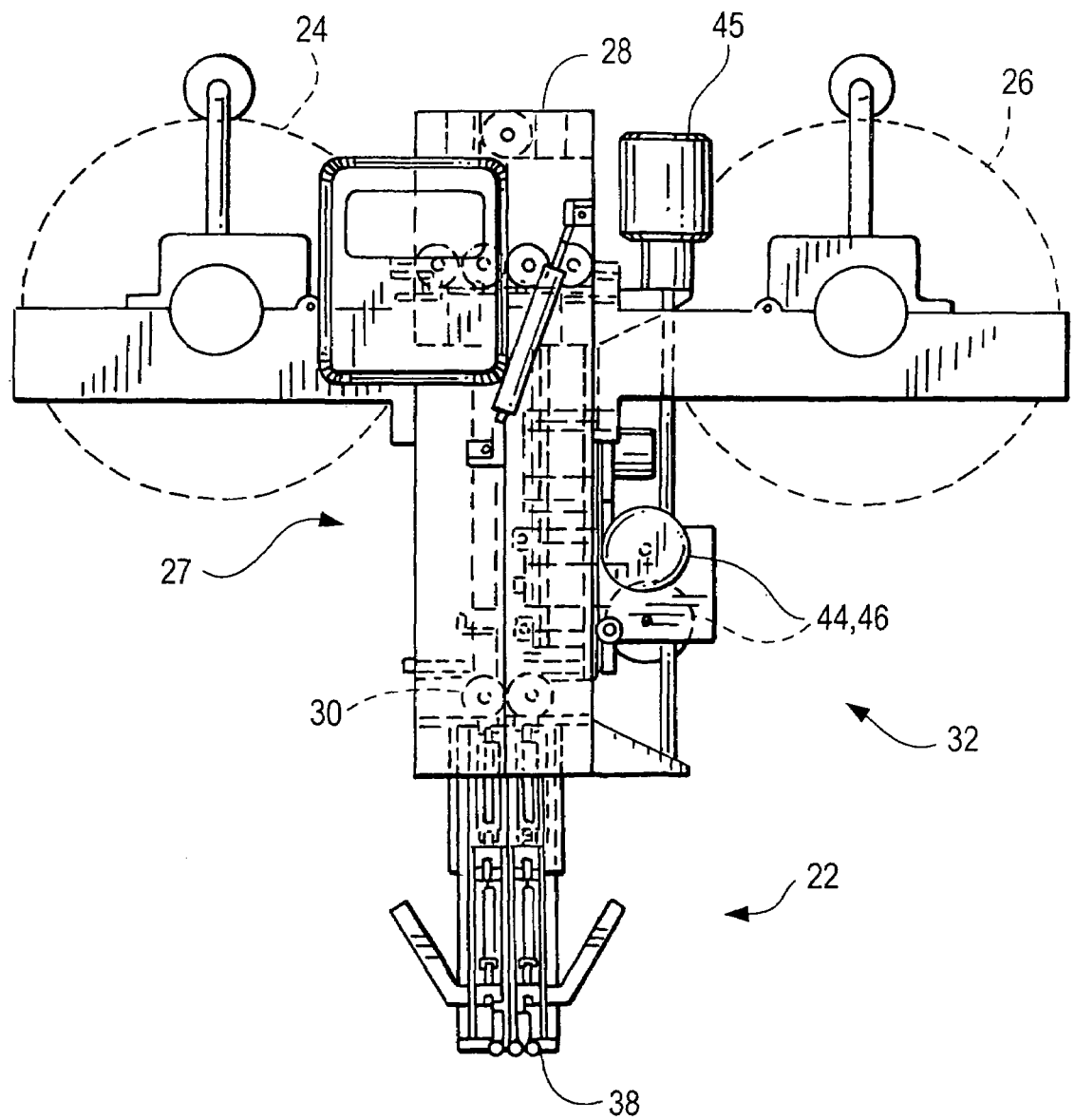
FIG. 4 is a left side elevation view partially in section of the PFE.
Figure 4A:
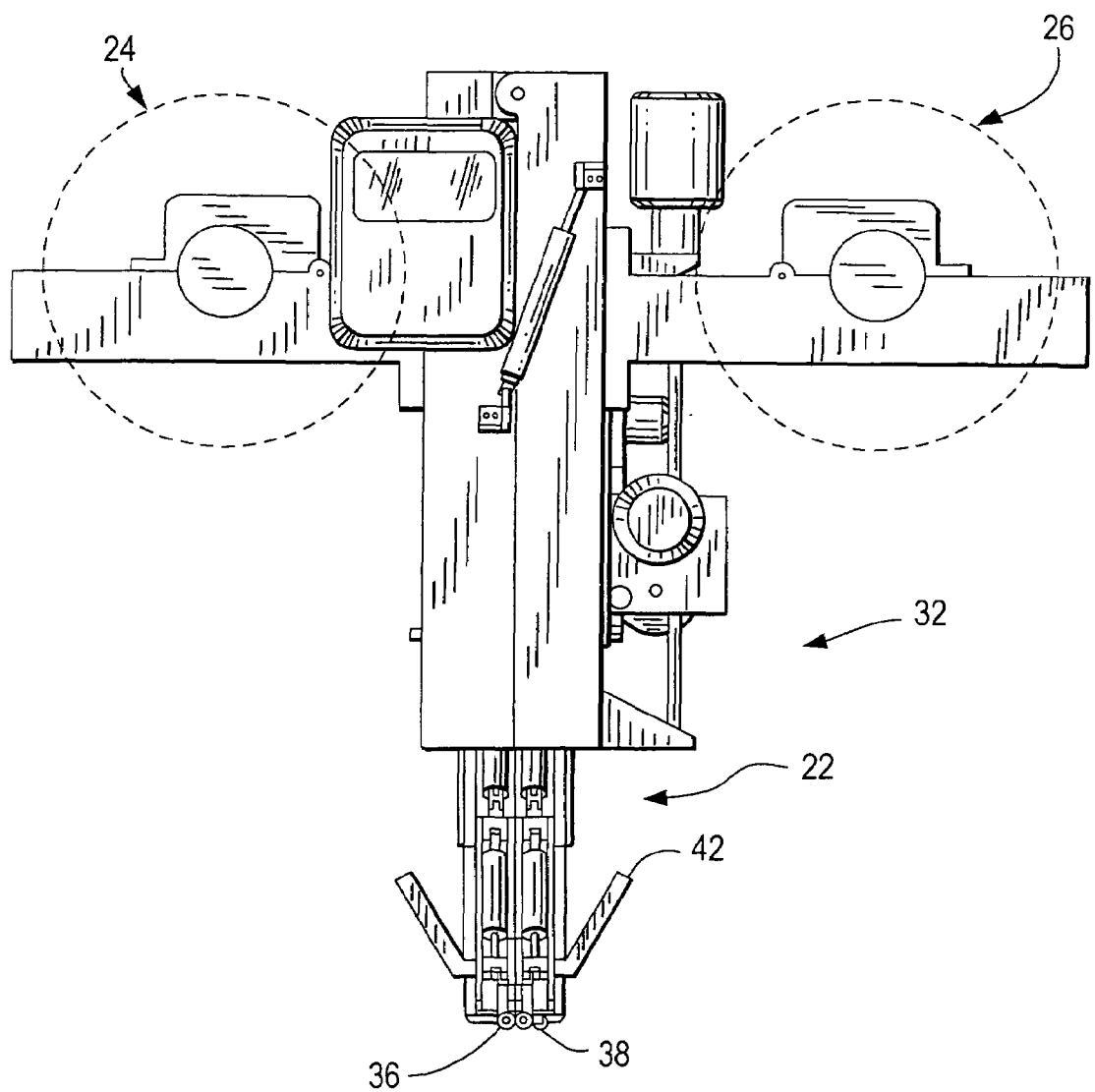
FIG. 4A is a simplified version of FIG. 4.

FIG. 3 is a simplified schematic view and FIGS. 4 and 4A in side elevation views show the path of the composite tape from the supply roll 24 to the upper feed rolls 28 and then down past the tape profiling or tape-cutting unit 32 as pulled by lower feed rolls 30 and then to the suspension and placement subsystem 22 where the tape is delivered by lay-up rollers 36 onto a mold 37. As further seen in this figure, the tape 25 as it passes over the first set of feed rollers 28 is separated from its back-up or support tape 25, the latter tape then travels to the take-up roll 26. The cutting unit or profiling unit which cuts the two side edges of the tape 25 is indicated by reference number 32, and this will be described in detail later.

FIG. 3 further shows the tape is formed into a bullnose curve 36A which bulges forward in the "X" direction of the path of the contact roller module with its contact roller 36 and follower roller 38. Within and supporting the bullnose curve is an idler roller 36B carried by swing arm 36C that establishes the position of roller 36B and the force it applies against the inside surface of the bullnose portion of the tape. Swing arm 36C is part of the dynamic suspension system which establishes and maintains the bullnose wave form during lay-up. Such bullnose formation allows the tape to traverse a wide radius curve before lay-up and thus to avoid a right angle turn. It also supports the tape from stretching or crumpling up due to mold surface contours being encountered during lay-up.

The follower roller 38 is positioned primarily to track and follow the zone or space between the adjacent ends of any two contact rollers. Thus, for a single contact roller module having a center pressure roller and two outboard rollers, there will be a small space between the adjacent ends of the center roller and each outboard roller. The tape in this "space" will not have been contacted and pressed by any of the center and outboard rollers; however, it will be contacted and pressed by the follower roller which thus assures full compliance of the tape with mold surface being covered. Follower rollers are carried by the suspension system and positioned to track and cover all spaces missed by the pressure rollers of the contact roller modules.

FIG. 4 in a more detailed view shows how the system begins with supply roll 24, then upper drive rolls 28, then the cutting unit 32 and then lower feed rolls 30. The tape between upper and lower feed rolls is maintained taut during the cutting process; however, the tape extending from the lower feed rolls 30 down to the lay-up rolls is moved through the system solely because it is pulled as the PFE is moved forward while the tape is laid-up onto the mold.

This FIG. 4 further shows lower horizontal cutting head drive elements 44 and 46 and upper cutting head drive 45. FIG. 4A is similar to FIG. 4 showing the supply roll 24, take-up roll 26 and the cutting unit 32. At the lower portion of this assembly is a hot air manifold 42 for heating pre-preg tape just before it reaches the lay-up rolls 36. Also shown is a trailer, follower or pressing roller 38 which presses the tape down against the mold in the areas between the adjacent lay-up rollers.

Figure 5:
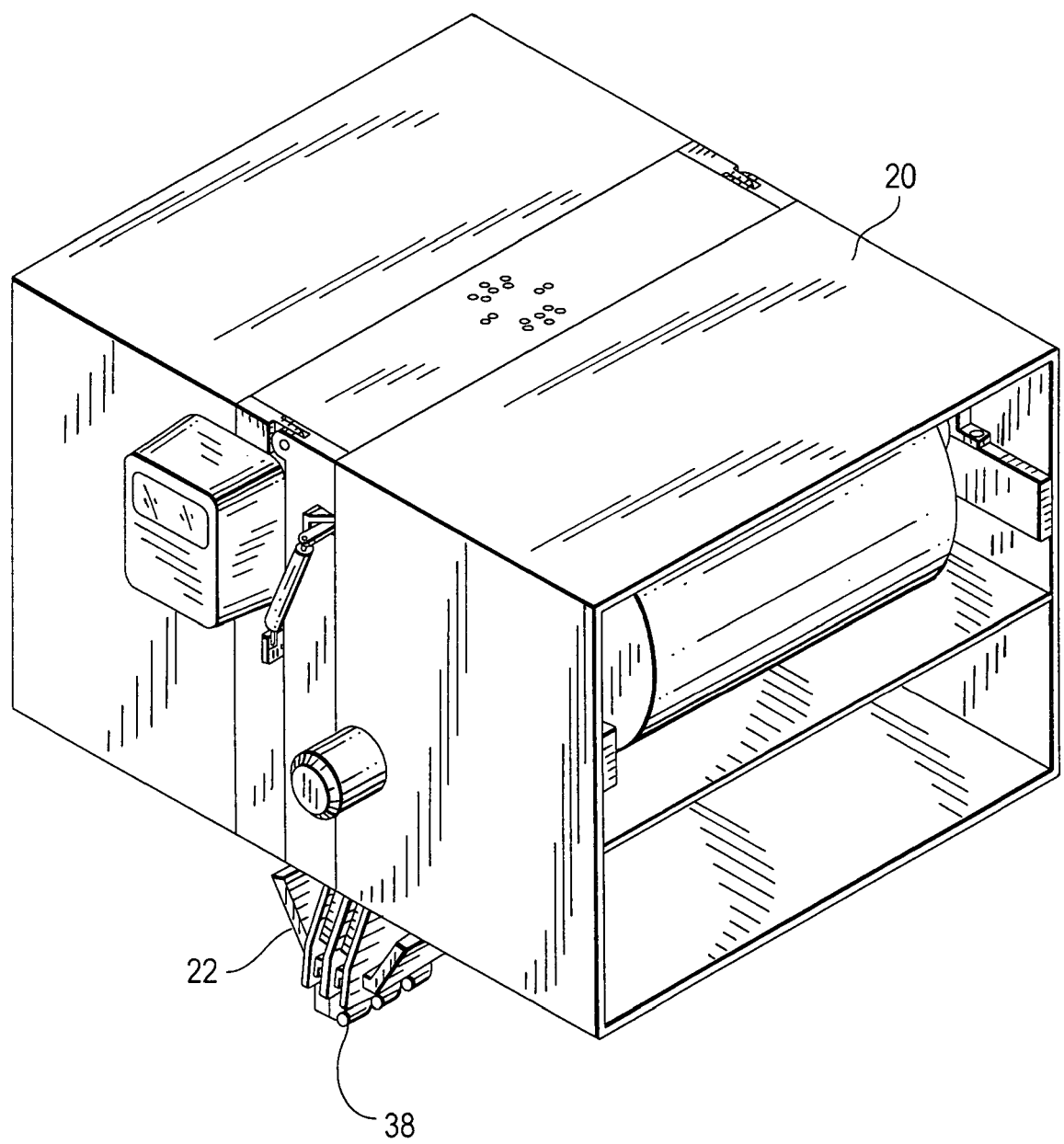
FIG. 5 is a top and front perspective view of the PFE within its housing.

FIG. 5 illustrates the upper portion of the PFE with a housing or shroud 20 which encloses the upper mechanism including the supply and take-up rolls and a refrigeration housing when needed for pre-preg tape.

Figure 6:
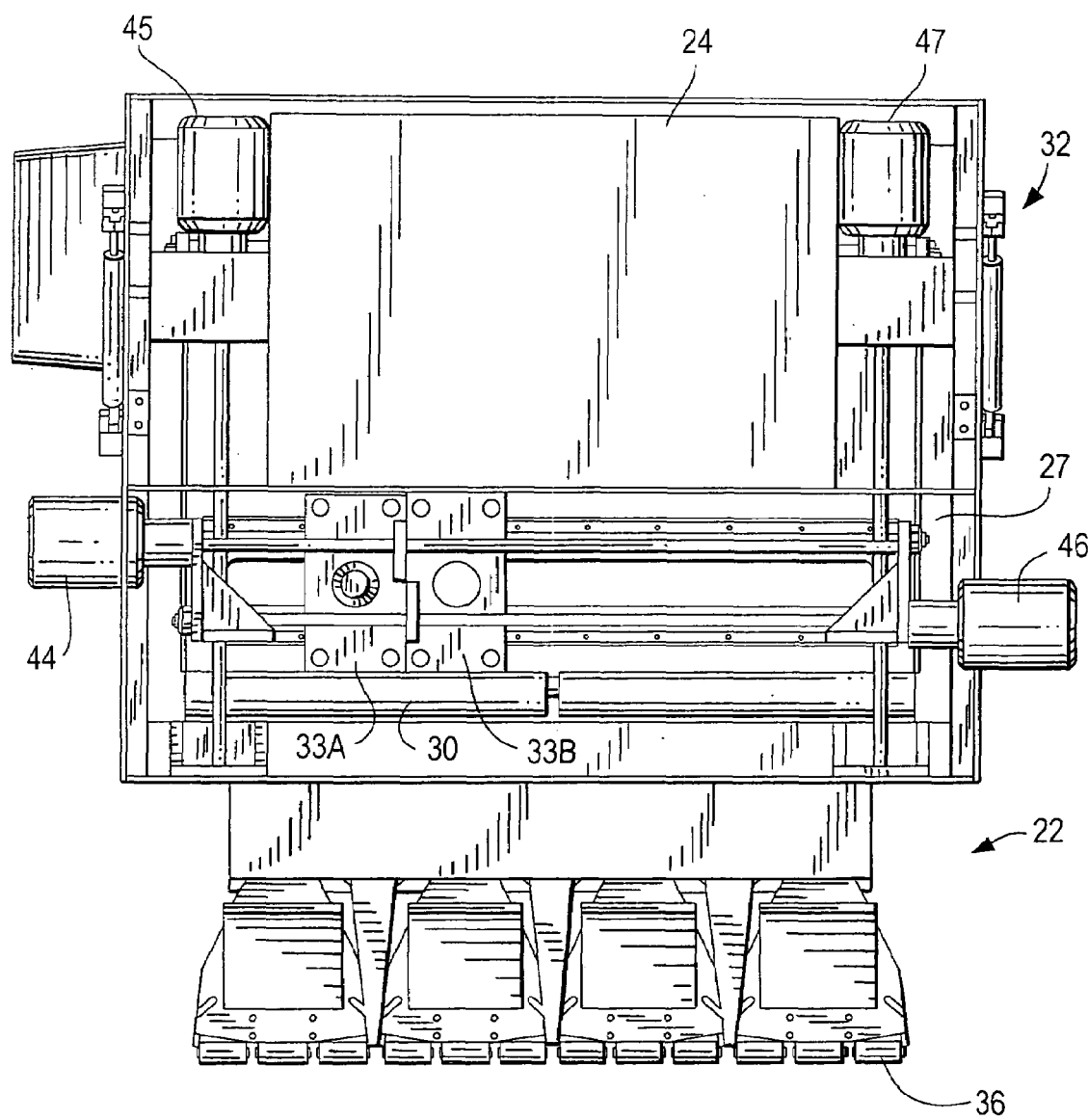
FIG. 6 is a front elevation view of the PFE of FIG. 4 including four PFE modules.

FIG. 6 begins to show more detail of the PFE, particularly the cutting subassembly 32 which has two horizontal drives driven by motors 44 and 46 and a vertical cutter drive 47 and 45. Also seen in this view are the lower feed rollers 30 and the lay-up rollers 36. The cutters are carried by slide members 33A and 33B and are programed to provide the selected profile along the opposite side edges of the tape as it passes through the cutter unit.

Figure 6A:
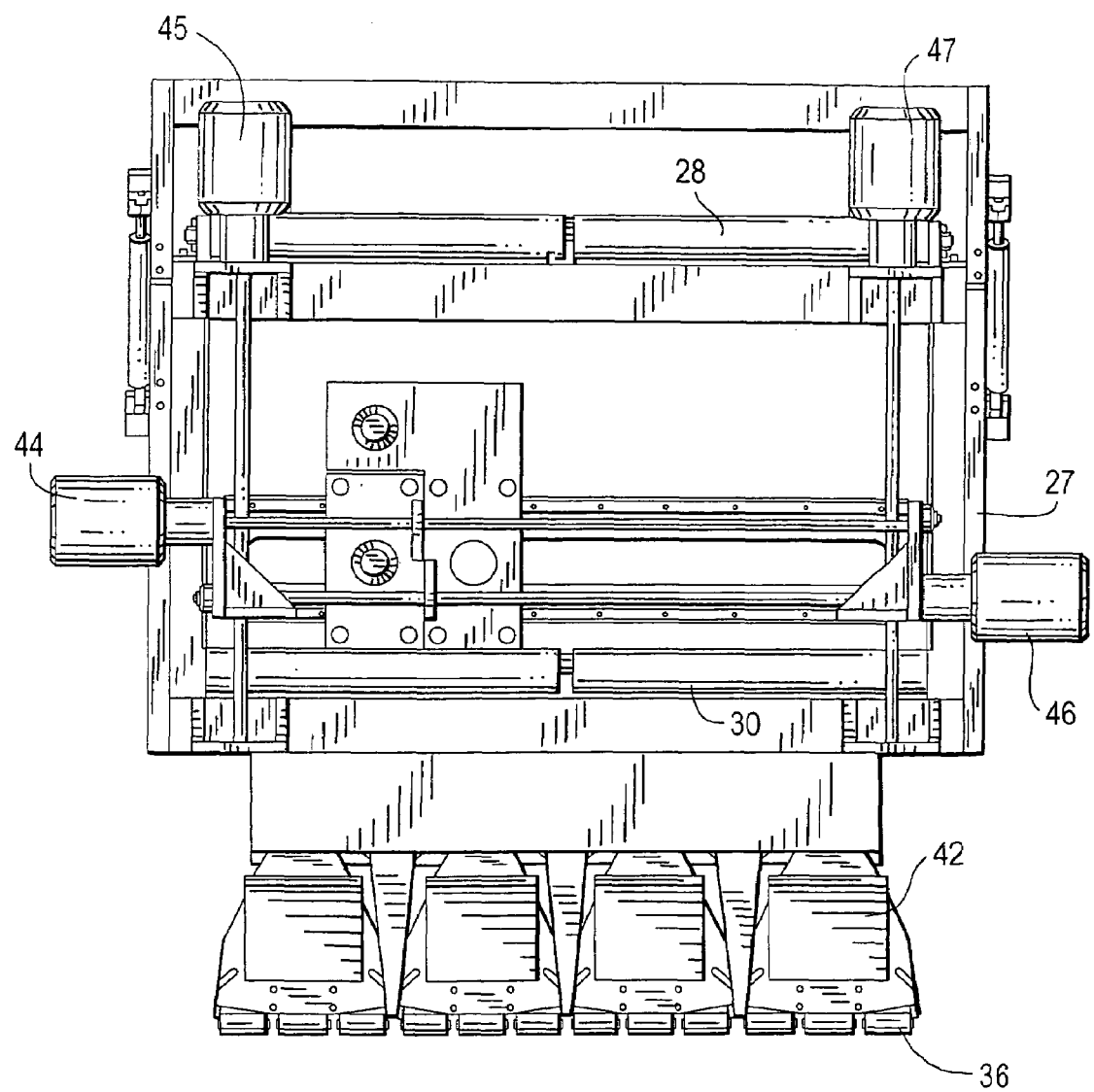
FIG. 6A is the same as FIG. 6, without the supply and take-up rolls.

FIG. 6A is similar to FIG. 6 but with the supply roll removed for clearer showing of the upper-drive rolls 28.

FIG. 7 shows cutter members 33A and 33B driven by cutter drives 44 and 46 respectively, the tape then passing downward to lay-up rolls 36 which are also shown adjacent to the hot-air manifolds 42. FIG. 7A is similar to FIG. 7 with the additional viewing of the supply roll 24 and the take-up roll 26. FIG. 7B is similar to prior FIGS. 7 and 7A and shows more clearly the upper drive rolls 28 and lower drive rolls 30.

Figure 7A:
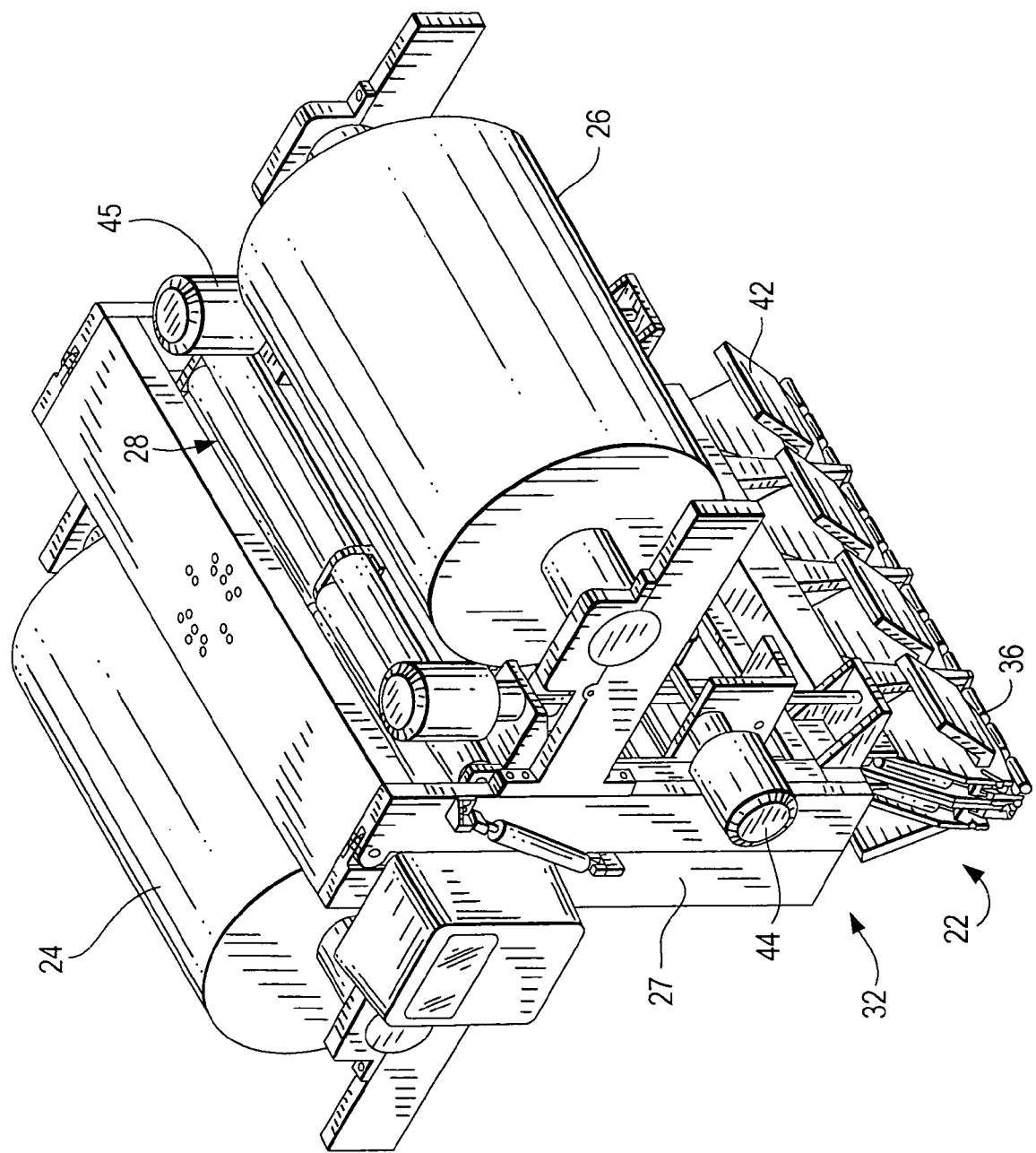
FIG. 7A is the same as FIG. 7, with the supply roll and take-up rolls shown and with the cutting system.
Figure 7B:
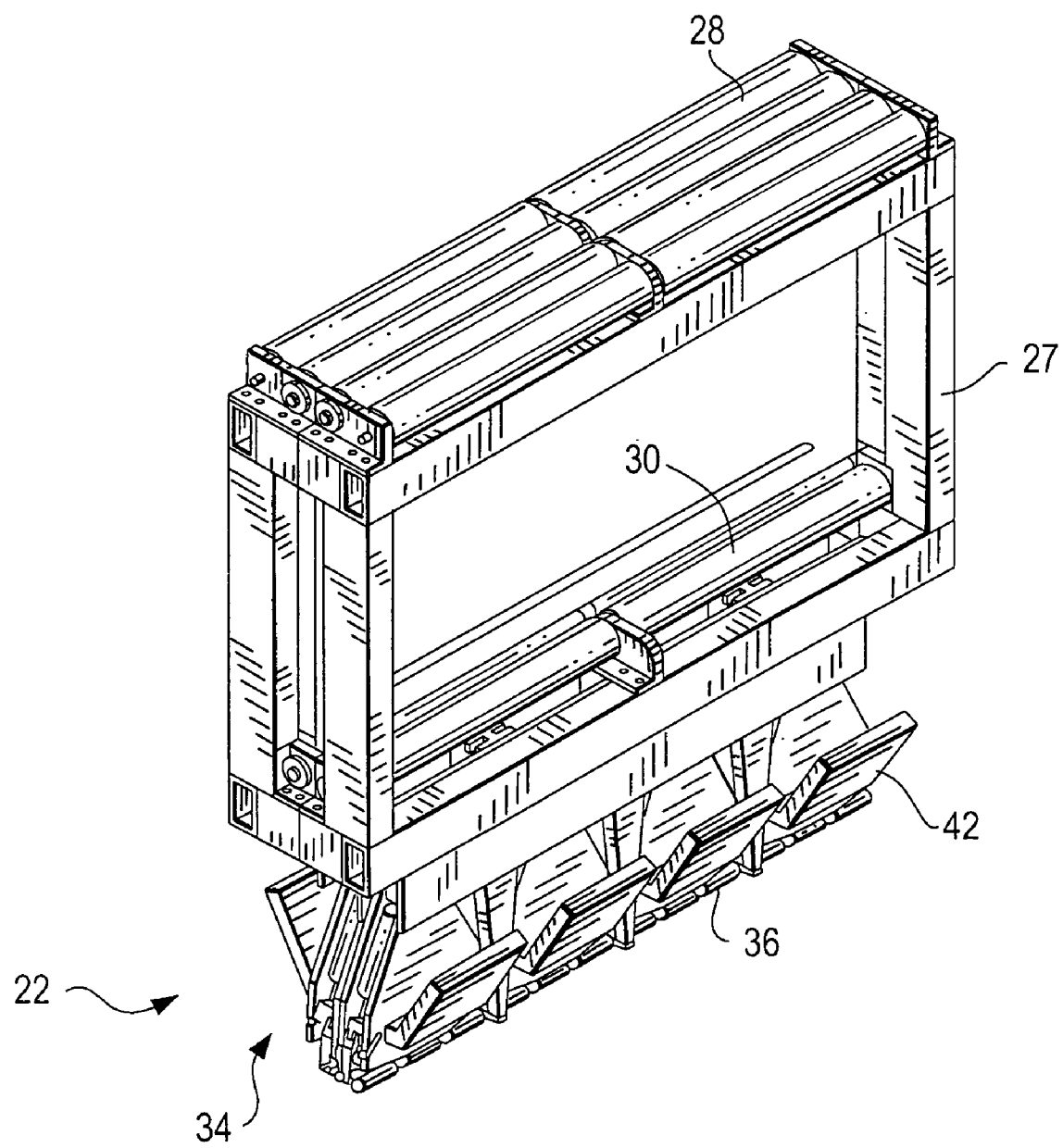
FIG. 7B is the same as FIG. 7 without the supply and take-up rolls and without the cutting system and cutting plane.
Figure 7C:
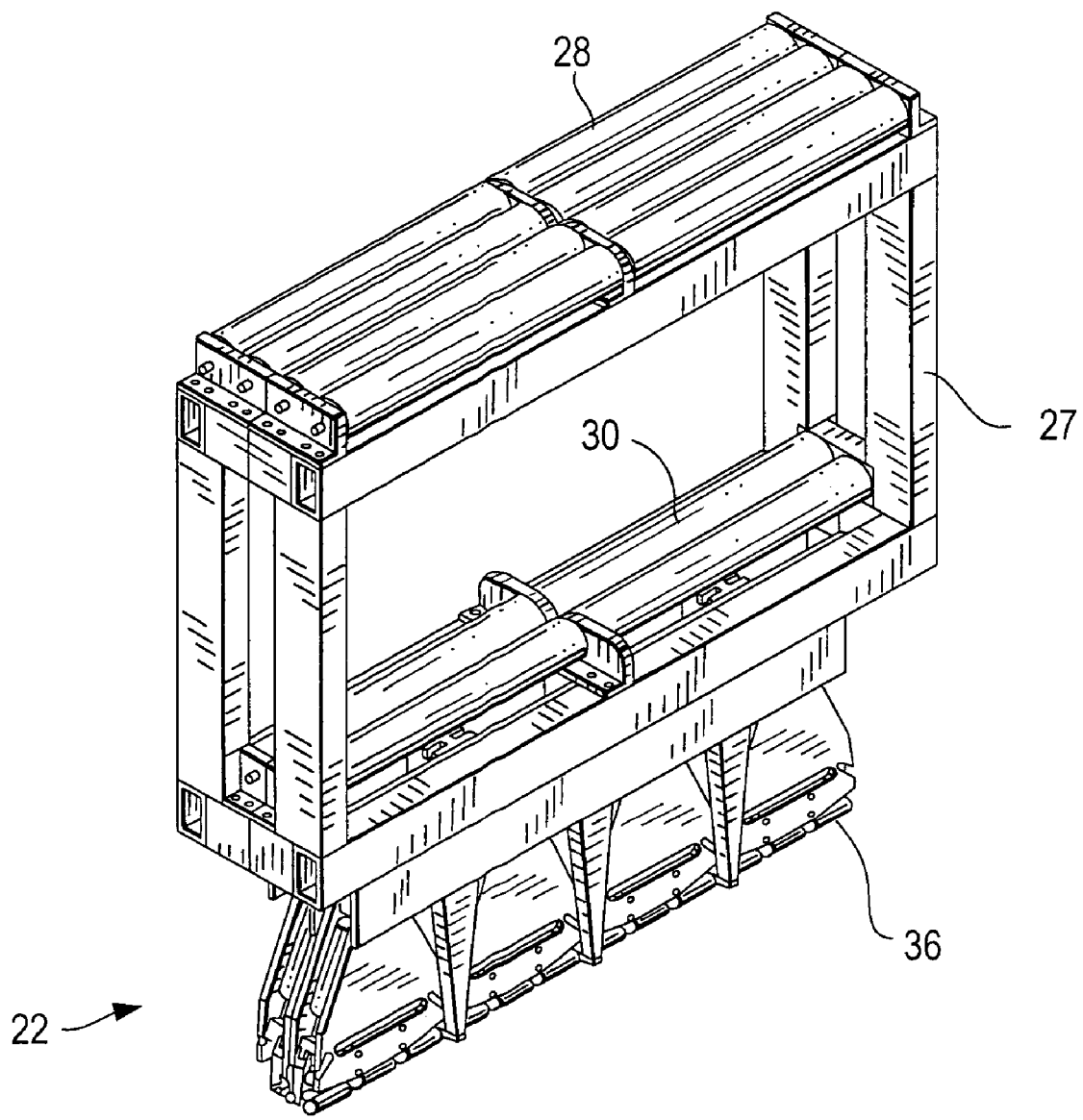
FIG. 7C is the same as FIG. 7B without hot air ducts.

FIG. 7C is similar to 7B, but with a more clear illustration of the chassis 27 which is formed of tubular beams joined together into the rectangular framework for supporting the upper and lower feed rolls, the cutting unit and the suspension placement subsystem 22.

Figure 7D:
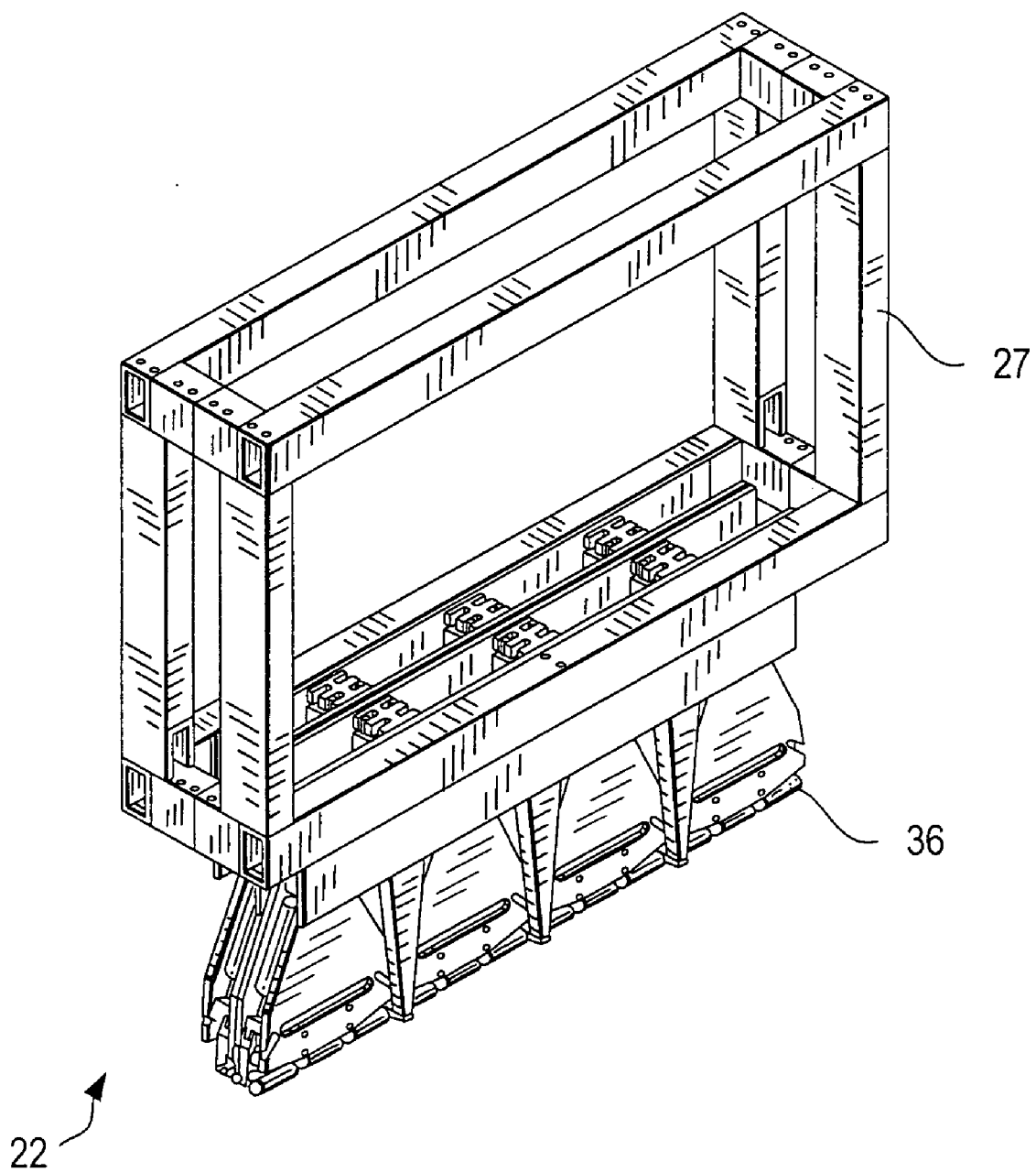
FIG. 7D is a top and front perspective view as a simplified version of FIG. 7B.
Figure 7E:
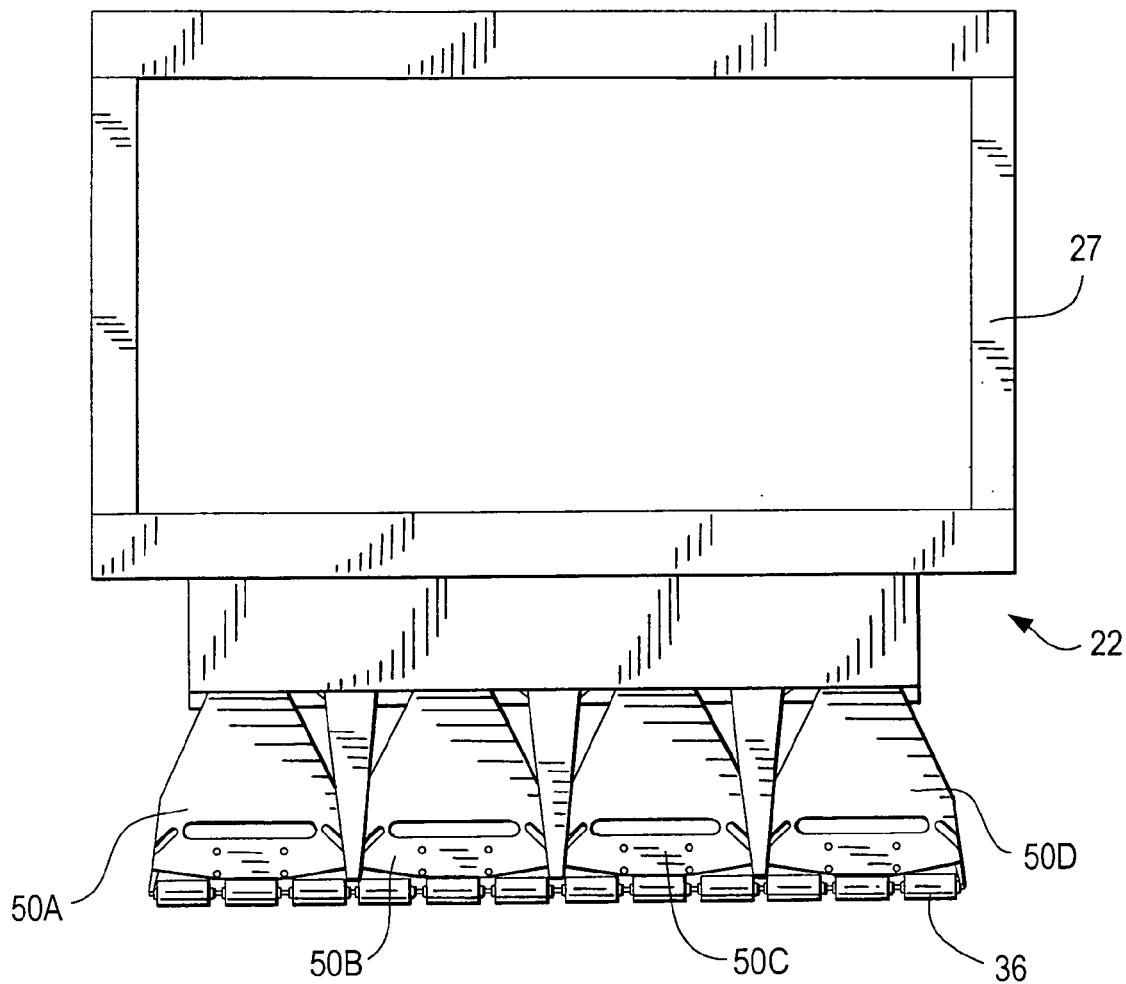
FIG. 7E is a front elevation view of FIG. 7D.
Figure 23:
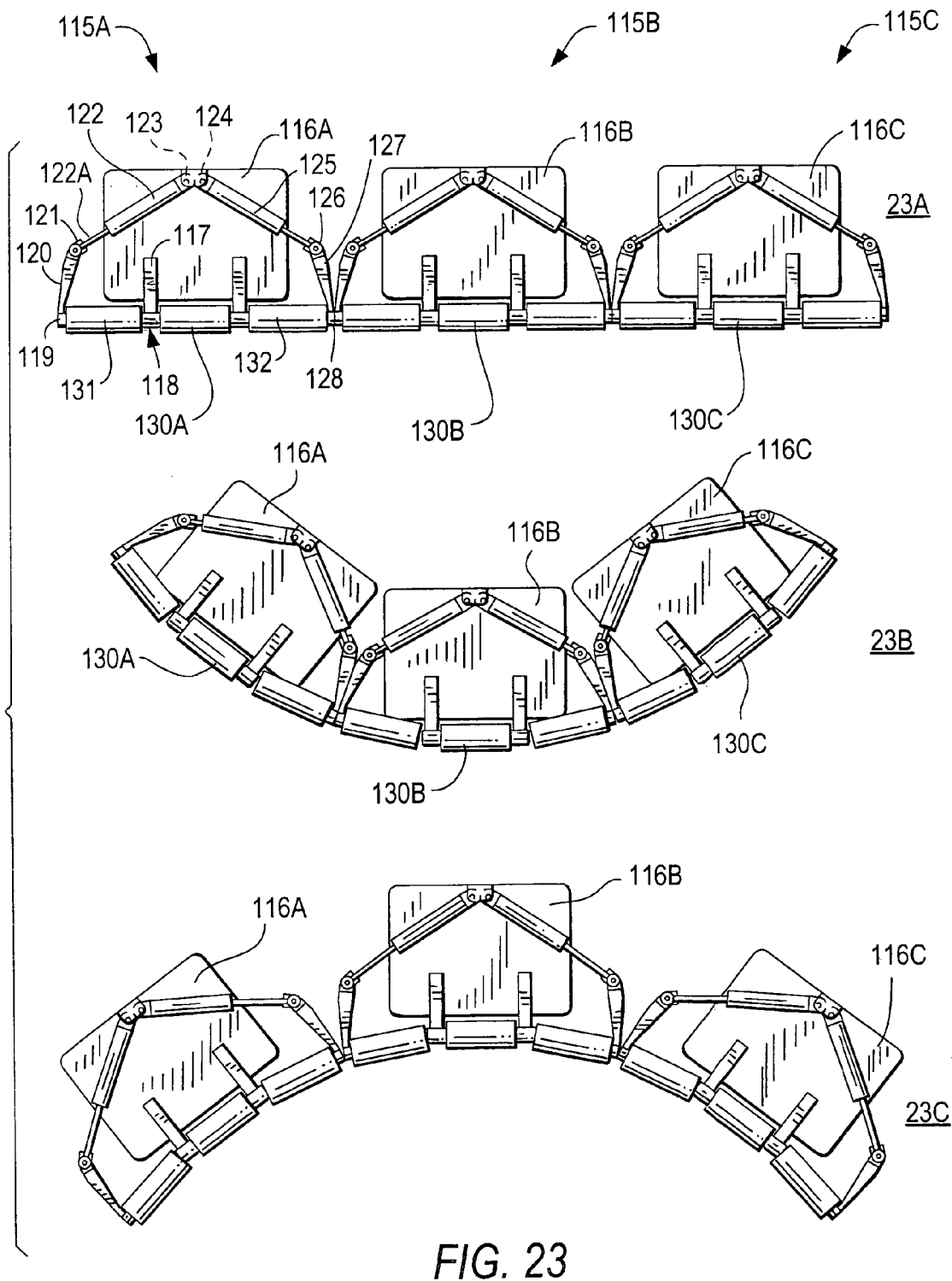
Figure 24:
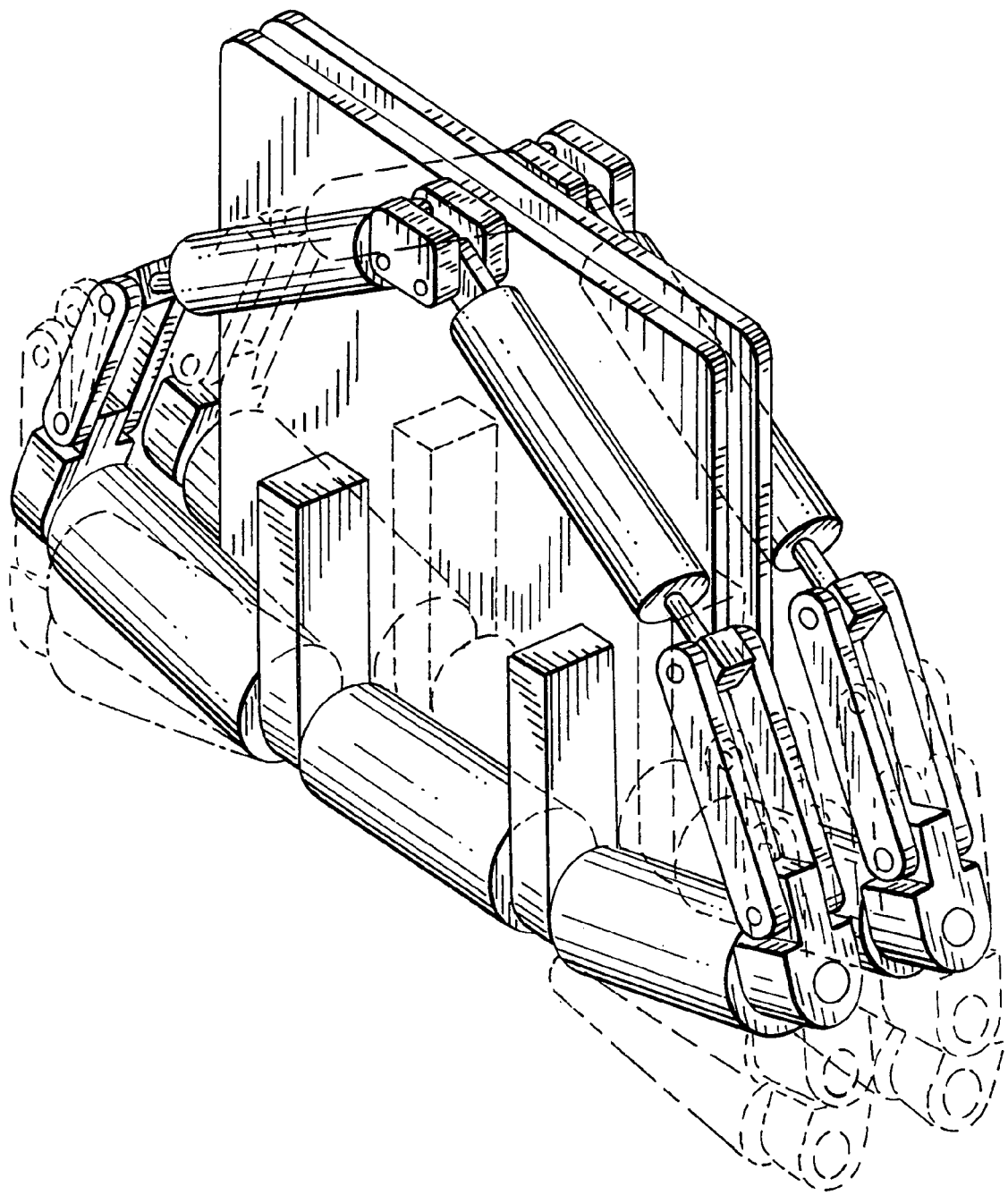
FIG. 24 is a top and front perspective view showing the lay-up roller configurations of FIG. 23.
Figure 26:
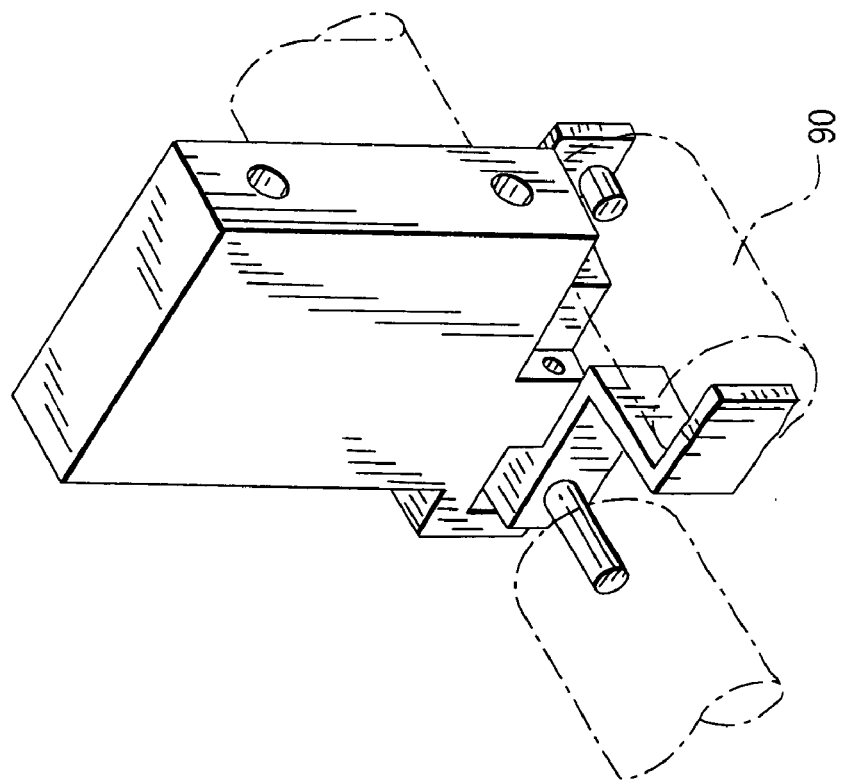
FIG. 26 is a fragmentary perspective view of a support link between a center roller and a side roller of a basic module and a follower roller.
Figure 25:
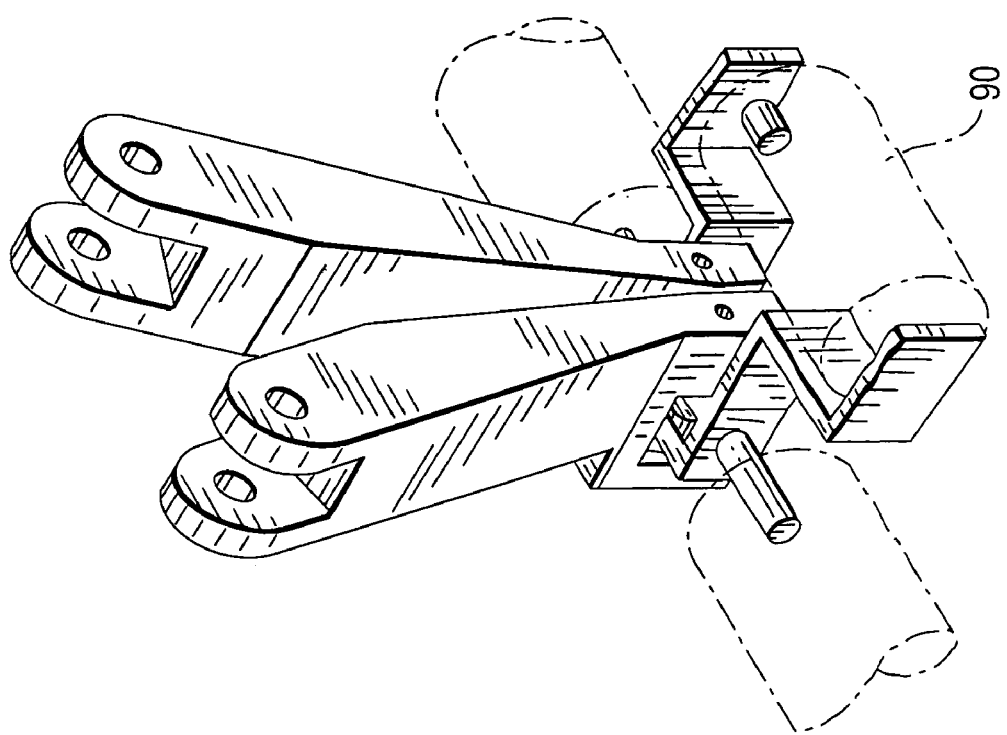
FIG. 25 is a fragmentary perspective view of a support link pair between the side rollers of two first tier modules and a follower roller.
Figure 27:
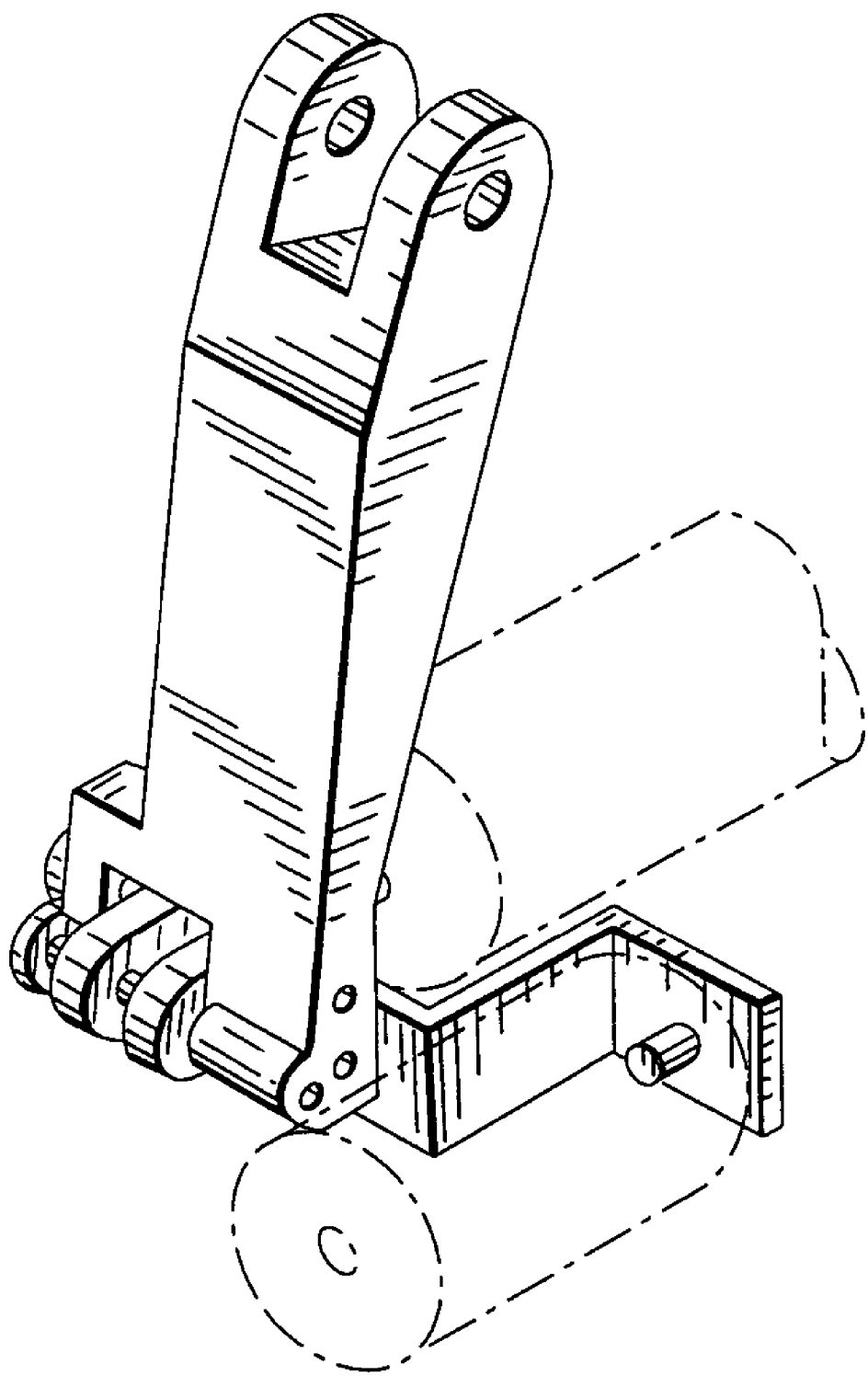
FIG. 27 is similar to FIG. 25 but shows an end link.
Figure 29:
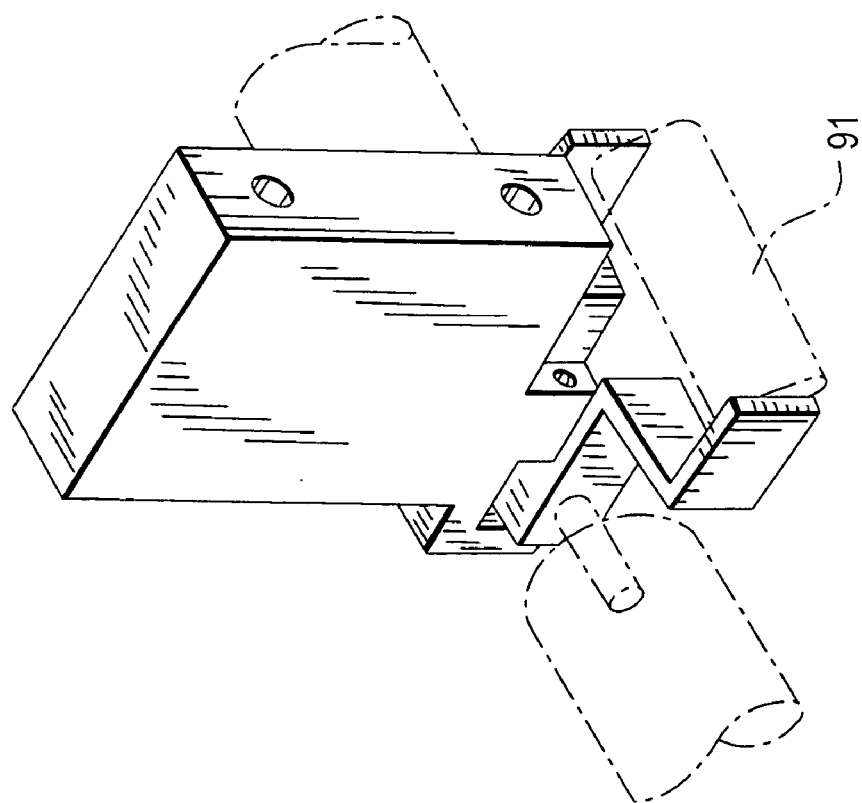
FIGS. 28, 29 and 30 are similar to FIGS. 25, 26 and 27 but show a follower blade instead of a follower roller
Figure 28:
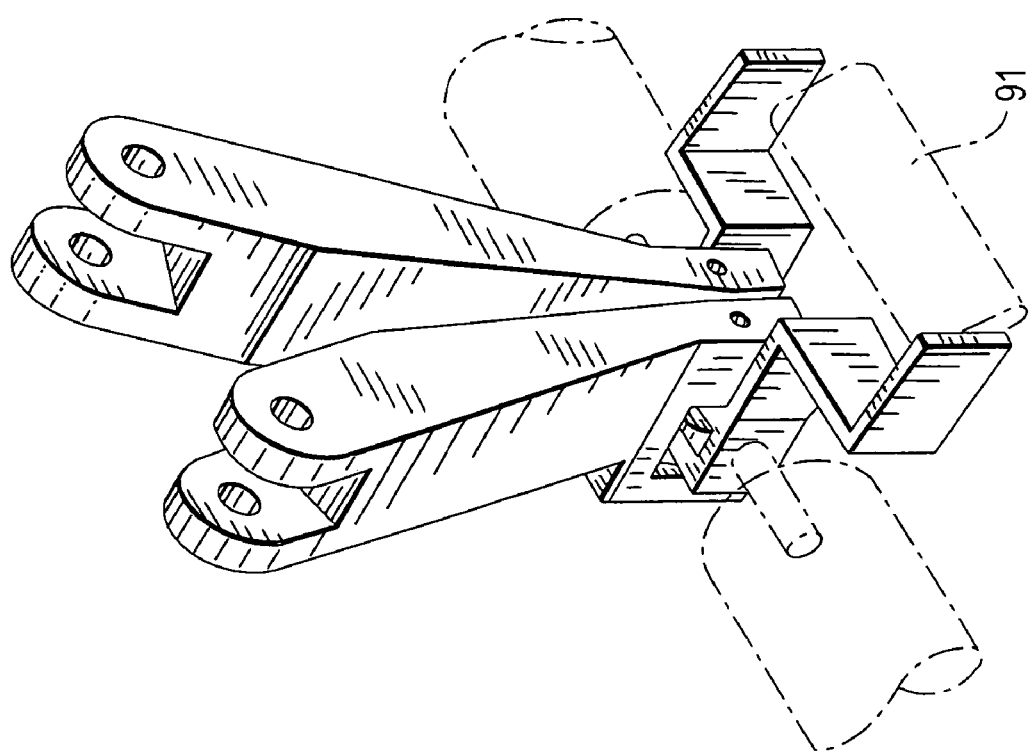

FIG. 7D is further clarification of 7C, and FIG. 7E illustrates more clearly details of the suspension subassembly 22 which has in this embodiment four modules represented by plates 50A, 50B, 50C, and 50D. Each module has three lay-up rollers 36, and each module has the rollers of that module adjustable positionally and each module is adjustable relative to the adjacent modules. The adjustment of one module relative to another is demonstrated in FIG. 23 which utilizes three instead of four modules. In FIG. 23 the modules can be articulated so that all the rollers line up in one continuous straight-line as seen in FIG. 23A or they can define a convex curvature as seen in 23B or a concave curvature as seen in 23C.

Figure 8:
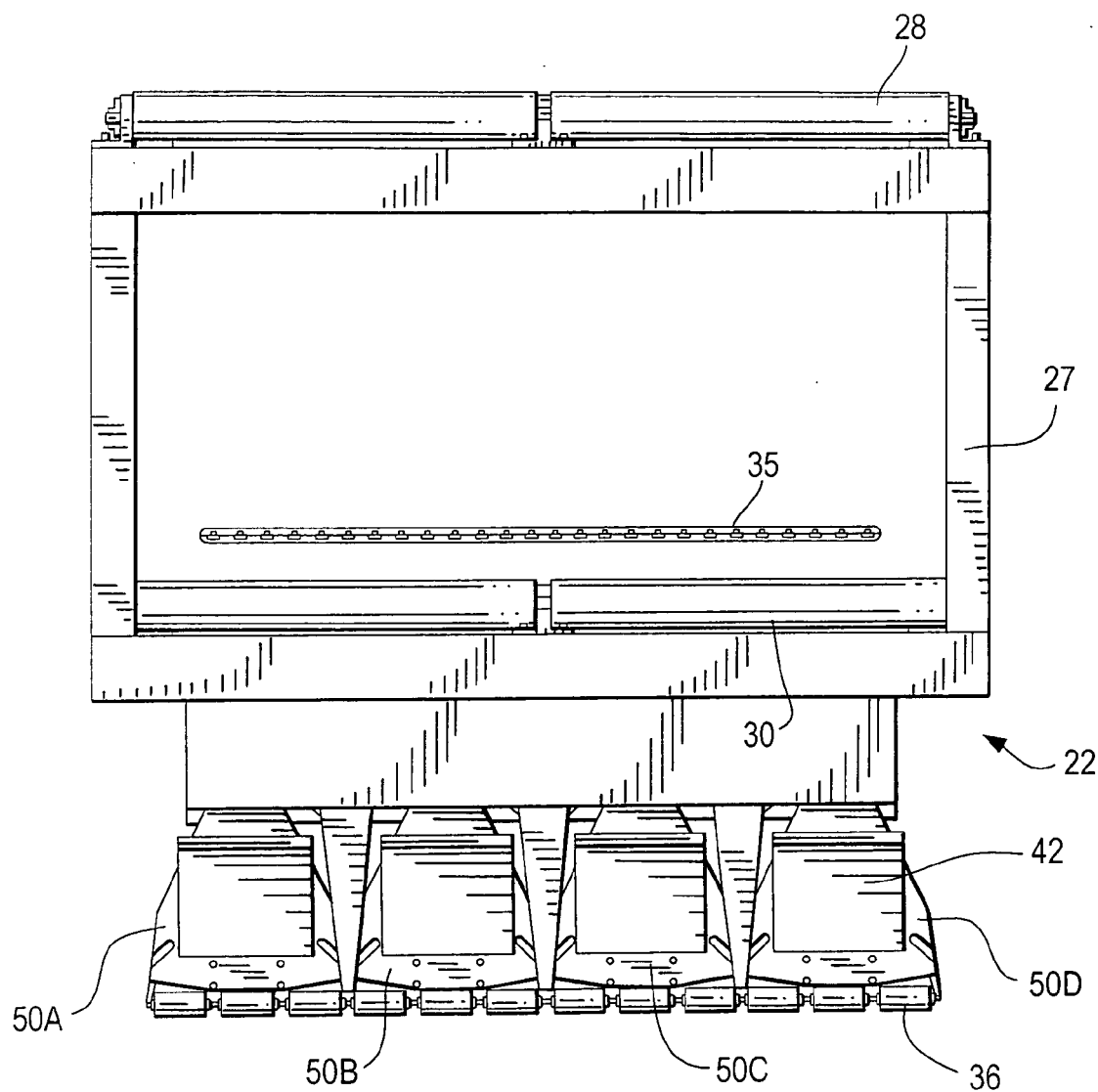
FIG. 8 is a front elevation view of FIG. 7B.

FIG. 8 shows parts of the PFE 22 including the cut plane 35 of the tape profiling unit 32 and how air ducts 42. FIG.

8A is similar to FIG. 8 except that it omits the showing of the cutting plane above the lower drive rollers in FIG. 8 and omits the hot air ducts.

Figure 9:
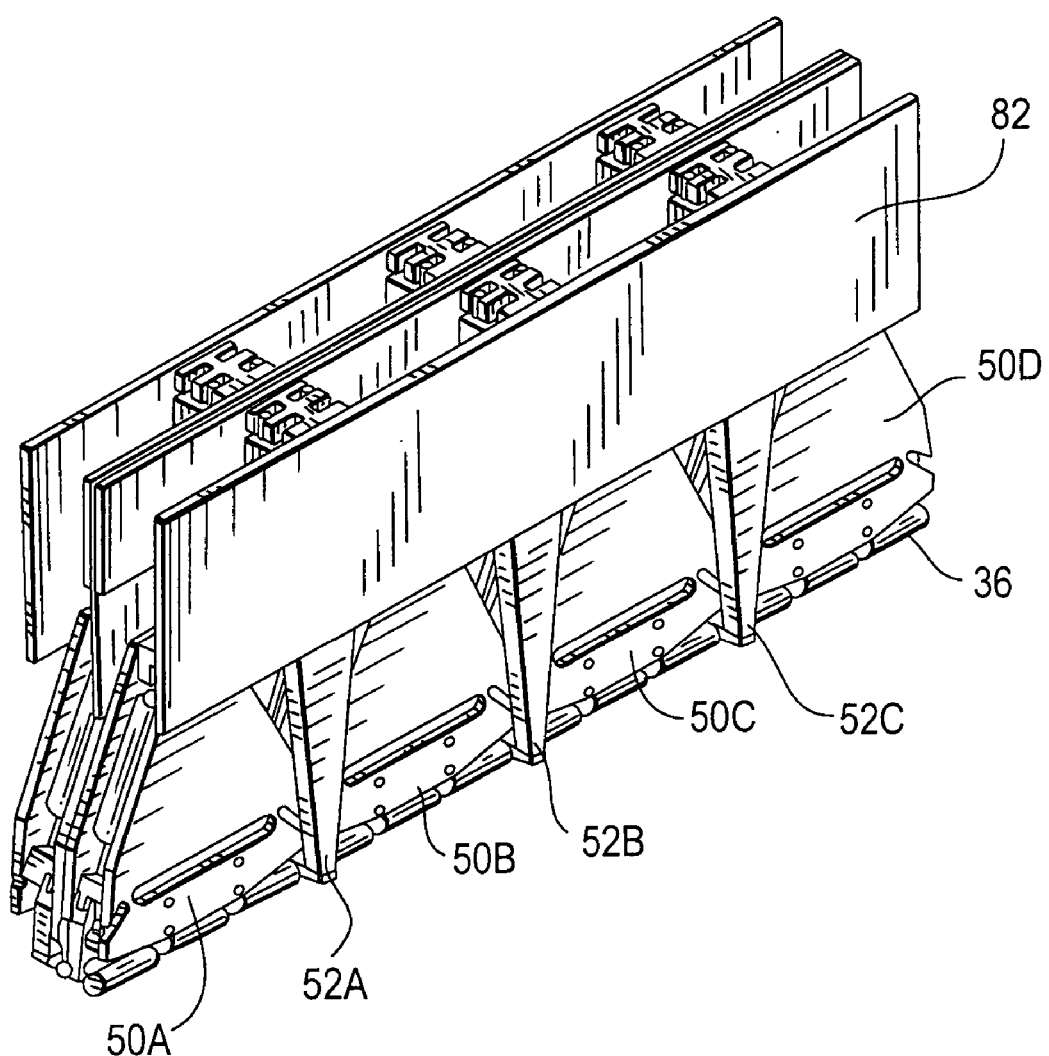
FIG. 9 is a top and front perspective view of FIG. 7C.
Figure 10:
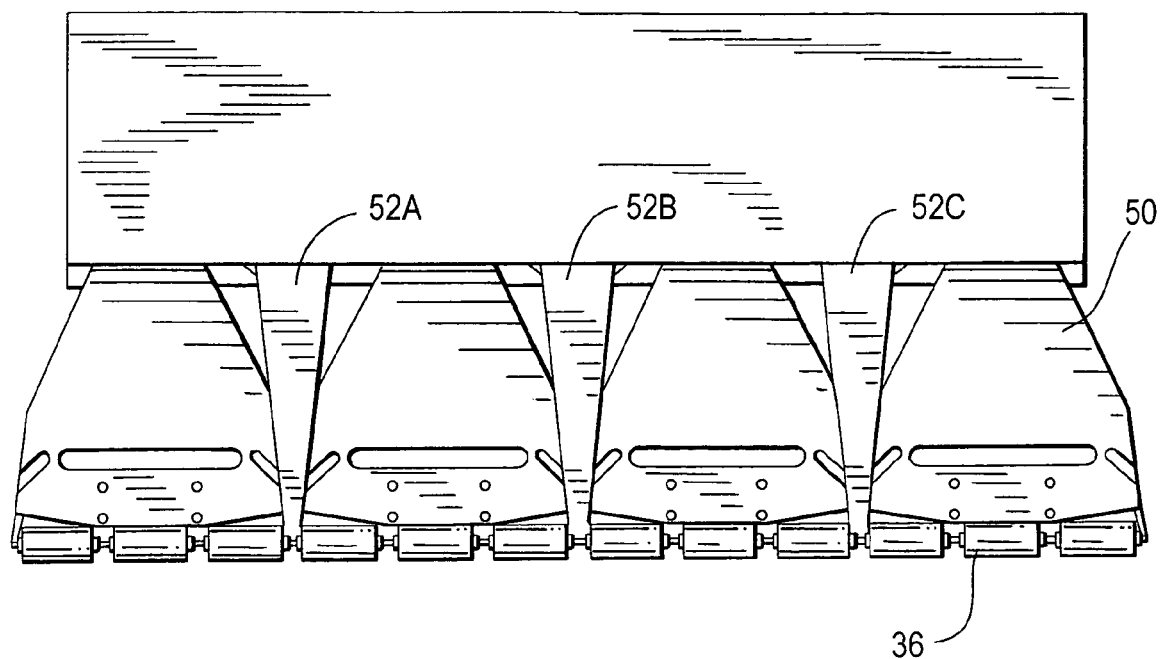
FIG. 10 is a front elevation view of FIG. 9.

FIGS. 9–17 illustrate details of the structure of the suspension and tape dispensing subsystem 22. As seen in FIG. 9 there are four modules represented by mounting plates 50A through 50D. Also seen in this figure is a second row of modules behind the first row. As noted earlier, in a preferred embodiment the second row of modules is eliminated, with the tape then descending around the single set of rollers. In the embodiment shown in FIG. 9 the tape would descend between the two sets of rollers and then be laid-up around only one.

Figure 12A:
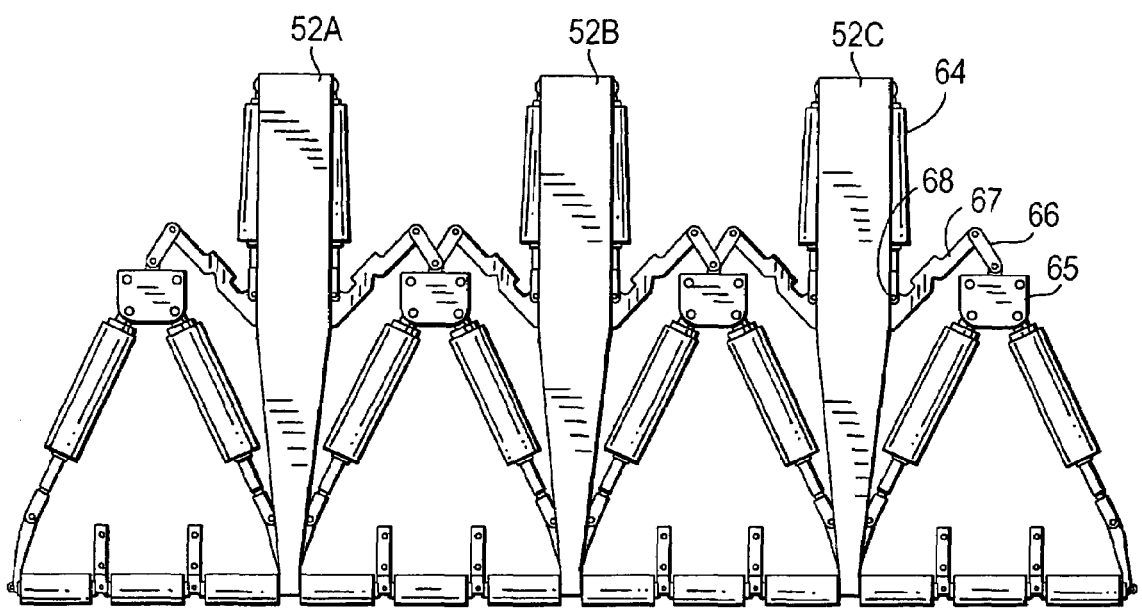
FIG. 12A is the same as FIG. 12 with the deflection panels removed.
Figure 12:
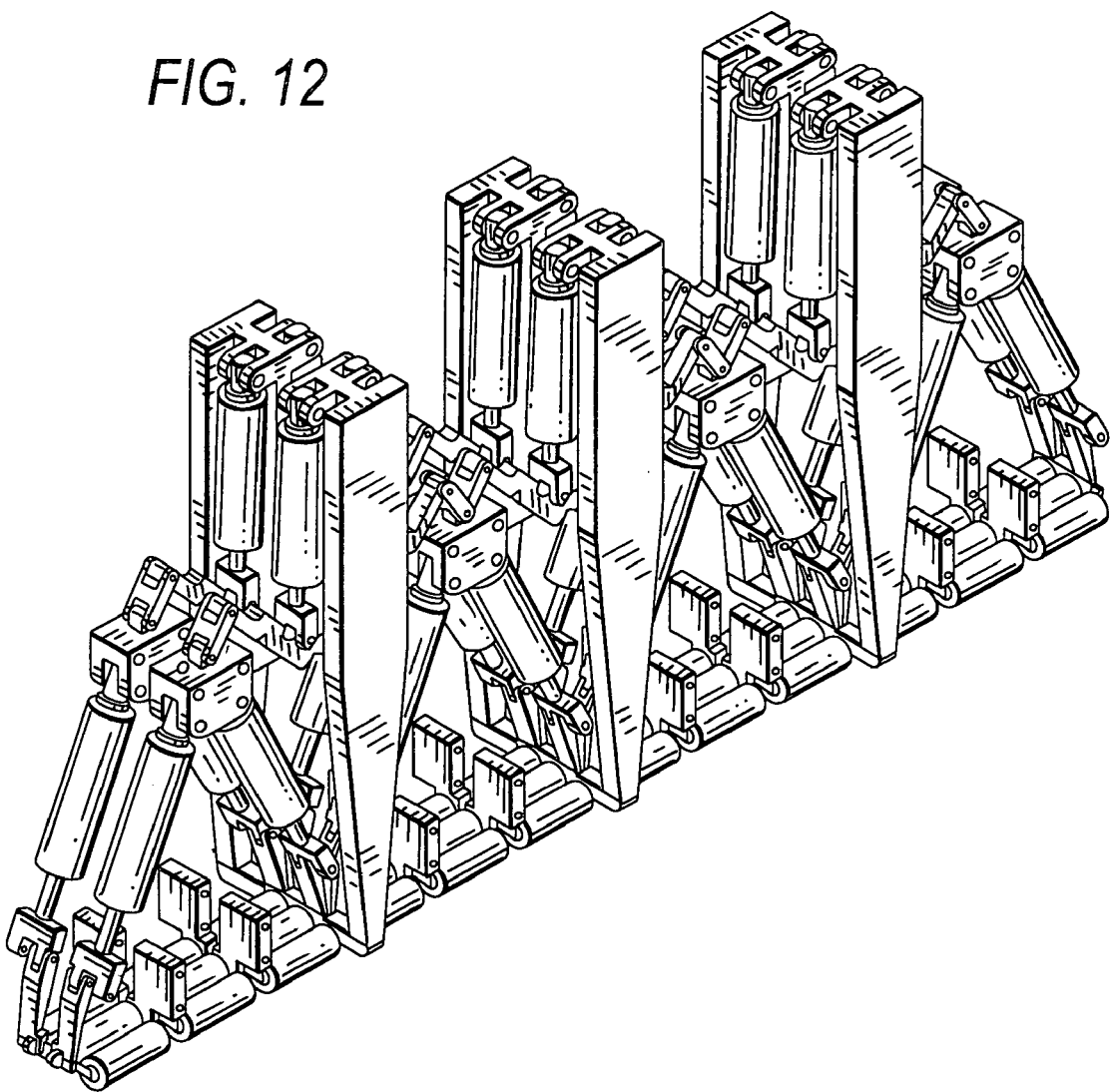
FIG. 12 is the same as FIG. 11 with the deflection panels removed.

FIG. 12 illustrates more clearly the construction of the suspension and placement subassembly.

Next will be described the PFE basic module, then an assembly of basic modules into the four-module embodiment of FIGS. 1–18 and the three-module embodiment of FIGS. 19–24, and then the pneumatic regulated force feedback system gas spring suspension system applied to all the individual modules and to the groups or subassemblies of modules. FIGS. 23A–23C provide overviews of the simpler three-module embodiment.

As seen in these three figures, there are three modules 115A, 115B and 115C, having mounting plates 116A, 116B and 116C respectively. FIG. 23A shows the rollers of each module in a straight-line configuration and the rollers of the three modules in a continuous straight-line configuration. FIG. 23B shows the center rollers 130A, 130B and 130C of each module in its fixed straight orientation on its respective mounting plate, and the adjacent side rollers of each module are inclined to produce one comprehensive convex curvature. Typically, the side or outboard rollers 131 and 132 in module 115 in FIG. 23A are inclined relative to the center roller 130A. FIG. 23C merely shows the modules and their rollers respectively reversed to produce a concave curvature.

As indicated generally in FIG. 23A, pivoting of the typical side roller 131 is possible because of its suspension between inner end coupling 118 at the end of arm 117 and outer end coupling 119 connected to further link 120, pivot 121, piston/cylinder 122 and upper pivot 123.

The typical cylinder of gas spring 122 is a gas spring which is set to position the link 120 such that the outer roller 131 is nominally oriented in a straight-line with center roller 131. At this nominal position the piston 122A exerts a predetermined force through link 120 so that the roller applies a predetermined pressure on the tape as it is laid. This predetermined pressure is to be maintained regardless of whether roller 131 is inclined upward, downward or stays straight. The robot arm carries the PFE such that the center roller will be at a predetermined offset distance from the robot mounting plate, and the various gas spring cylinders are arranged to apply final predetermined forces to all the modules, so that all the rollers apply the same force to the tape being laid on a mold.

When any roller reaches a point on the path for which the program dictates a change in elevation and/or orientation, the control means directs the contact roller module to automatically follow the designated course, and appropriate gas springs of the whole suspension system adjust in length while maintaining appropriate force so that the reoriented roller continues to exert its predetermined force.

Figure 20:
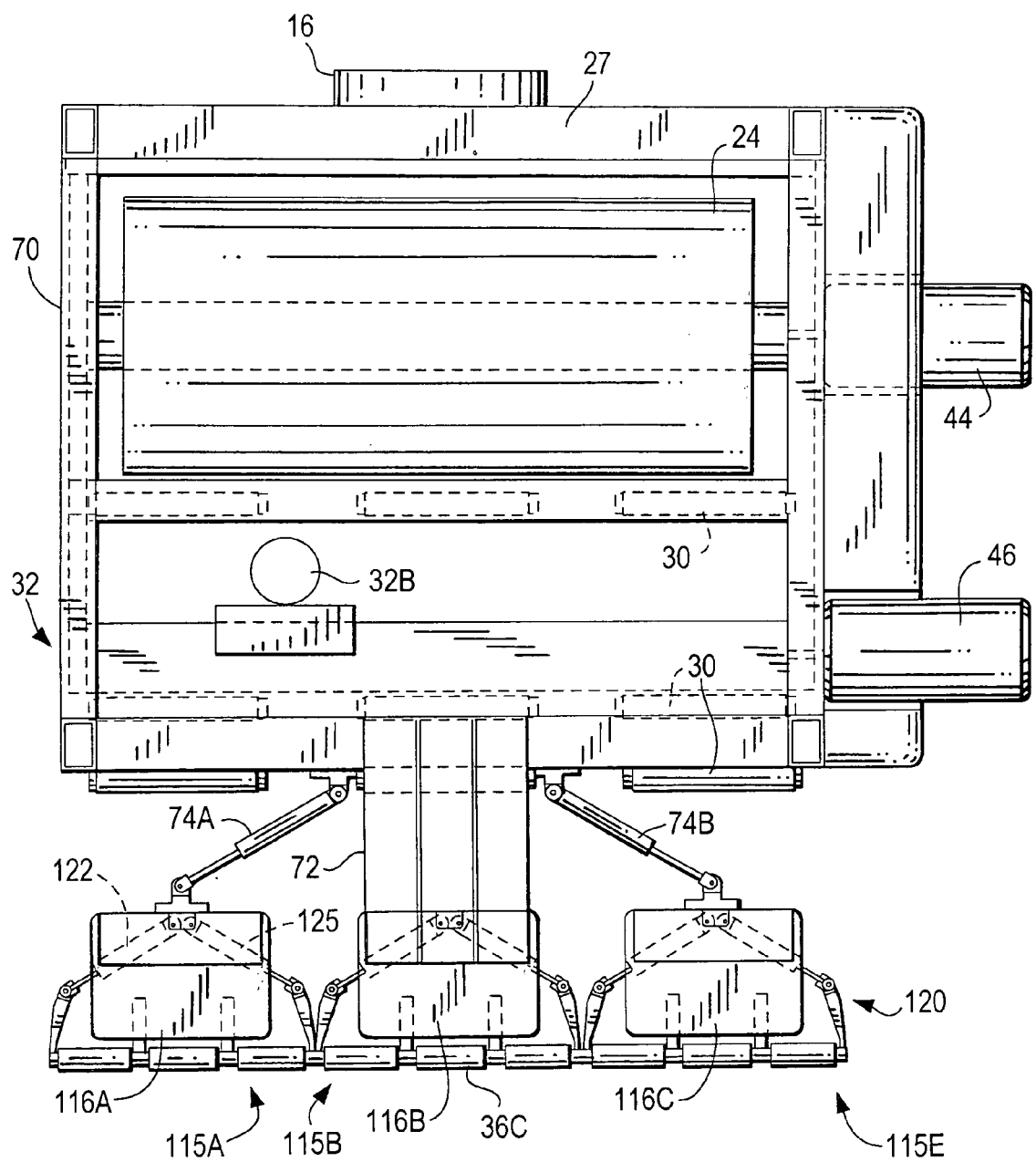
FIG. 20 is a front elevation view of the PFE of FIG. 19.
Figure 21:
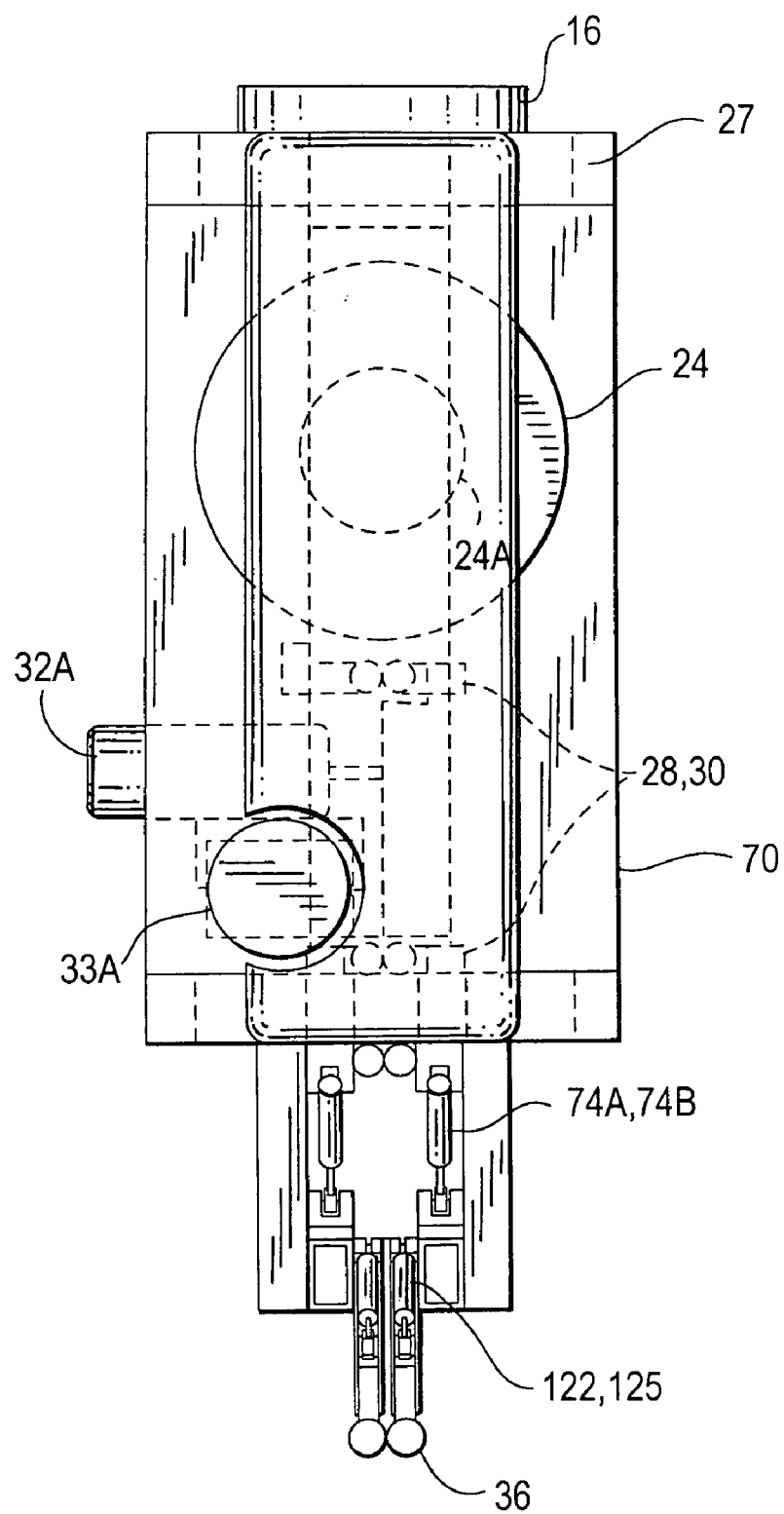
FIG. 21 is a right side elevation view of the PFE of FIG. 19.
Figure 22:
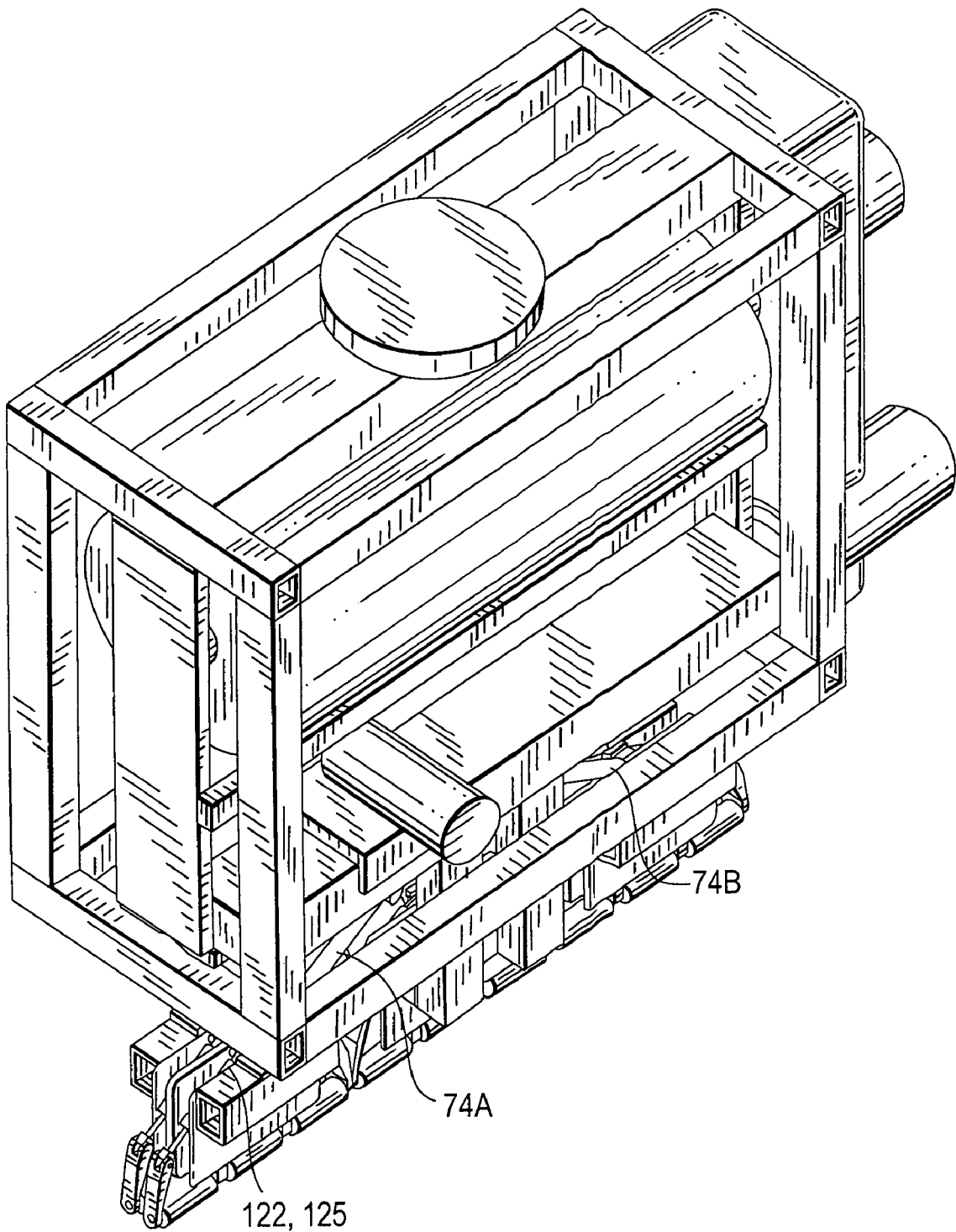
FIG. 22 is a top and front perspective view of the PFE of FIGS. 19–21, FIGS. 23A, 23B and 23C are fragmentary front elevation views of the lay-up roller configurations of the PFE of FIGS. 19–22.

As seen in FIGS. 20–22, for example, each PFE has a main chassis 40, a lower or first tier of basic modules and a second tier mid-chassis 42 supporting the center module and connected side modules. Between the first and second tier chassis are additional gas spring cylinders 74A and 74B, and between the mid-chassis 72 and the main chassis 70 are vertical gas springs as required. All are calibrated so that the lower tier rollers all exert the same force regardless of their elevational positions or angular orientations. Typically a second tier spring exerts a force slightly greater than double that of a first tier spring since there is one second tier spring associated with each two first tier springs. For special situations force exerted by specific rollers could be varied from others. FIGS. 21 and 22 illustrate in a three-module system the first tier gas springs 122, 125 and the second tier gas springs 74A, 74B.

Figure 11A:
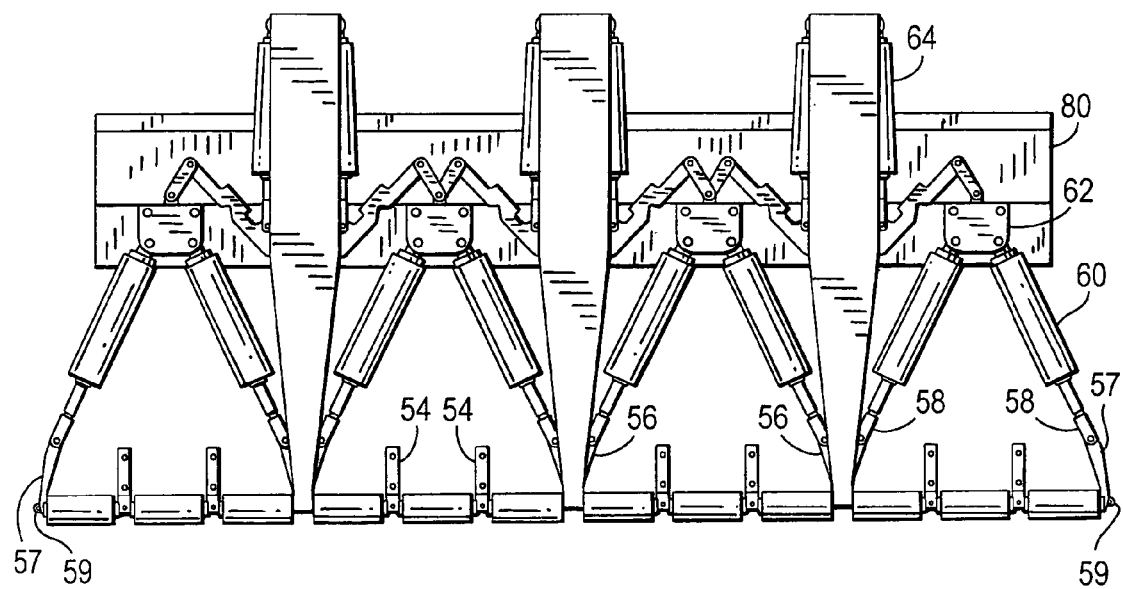
FIG. 11A is a front elevation view of FIG. 11 with separation panels removed and deflection panels showing.
Figure 13:
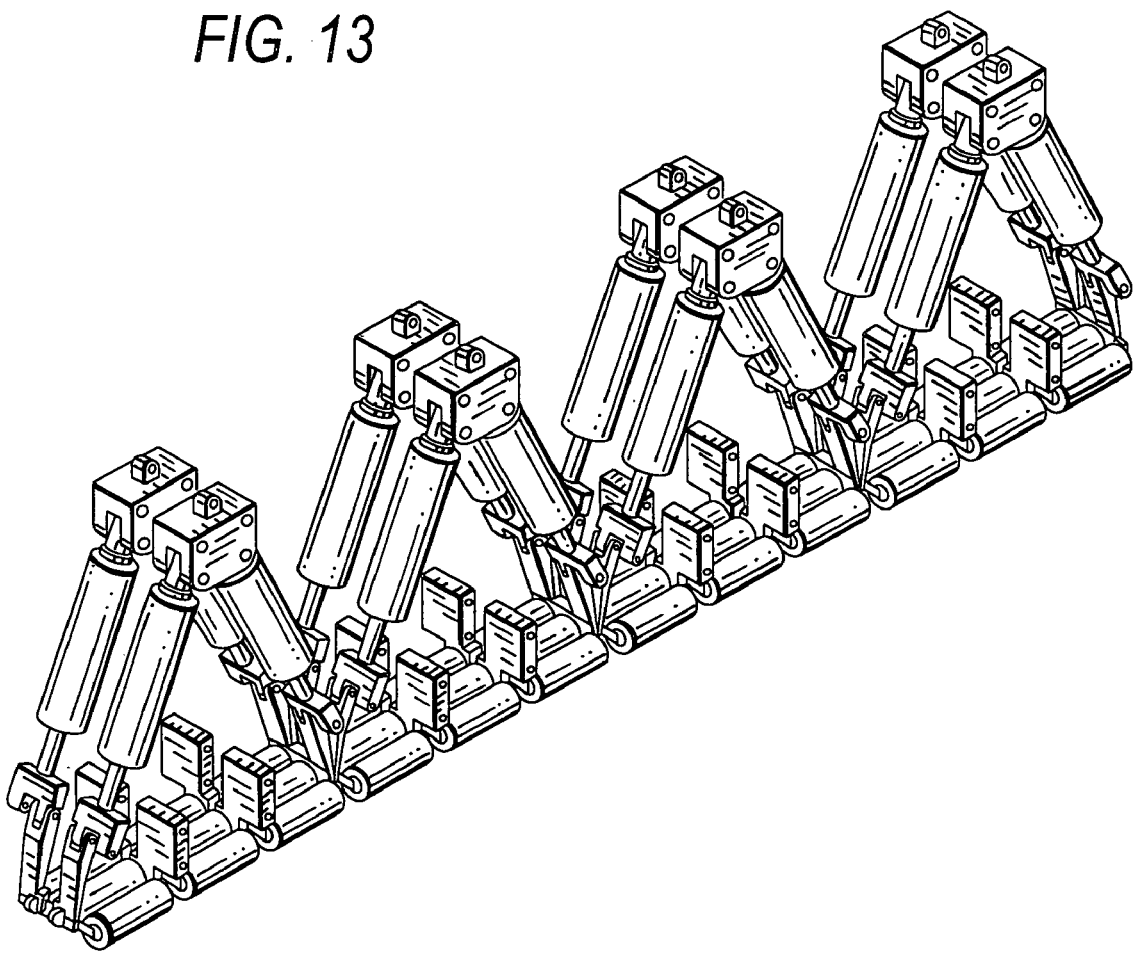
FIG. 13 is a top and front perspective view of the lower placement suspension system as seen in FIG. 11
Figure 14:
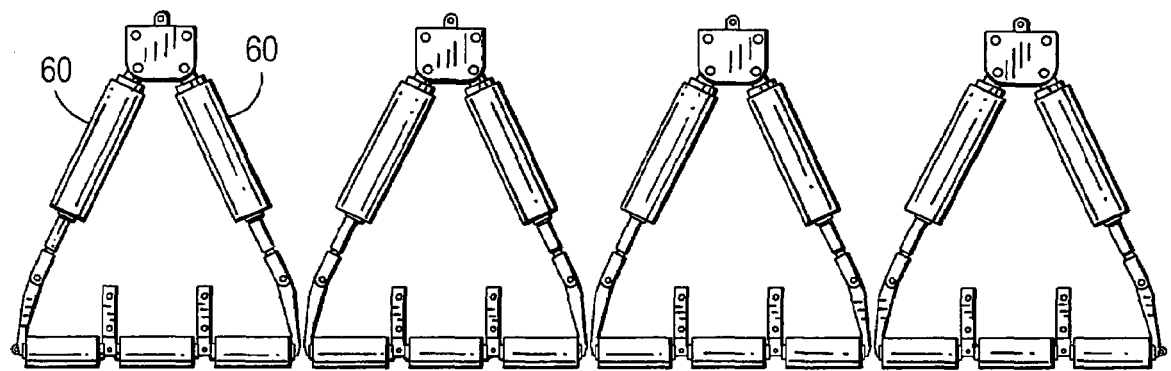
FIG. 14 is a front elevation view of FIG. 13.
Figure 15:
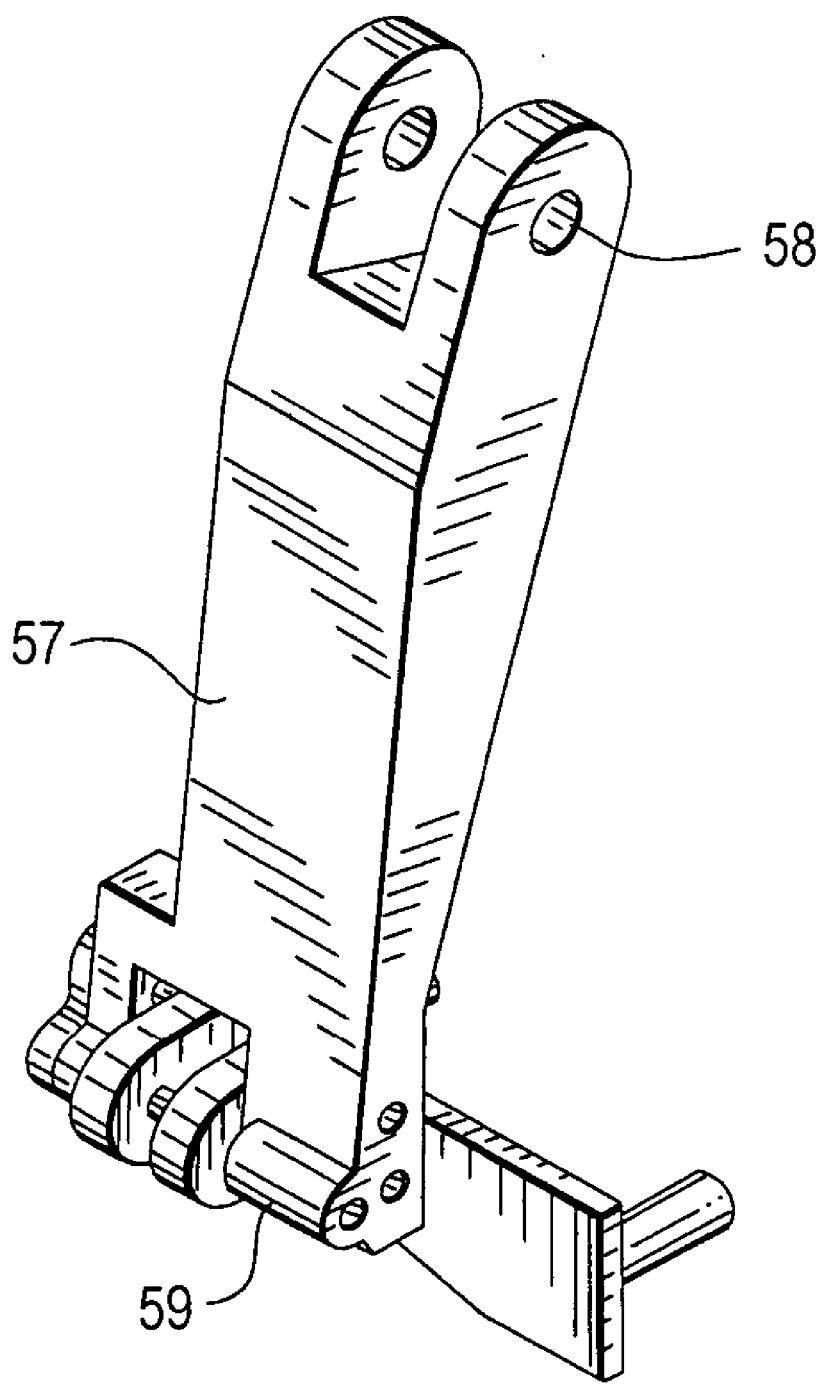
FIG. 15 is a top and front perspective view of a left link subassembly of the lower placement suspension system as seen in FIGS. 13 and 14.
Figure 16:
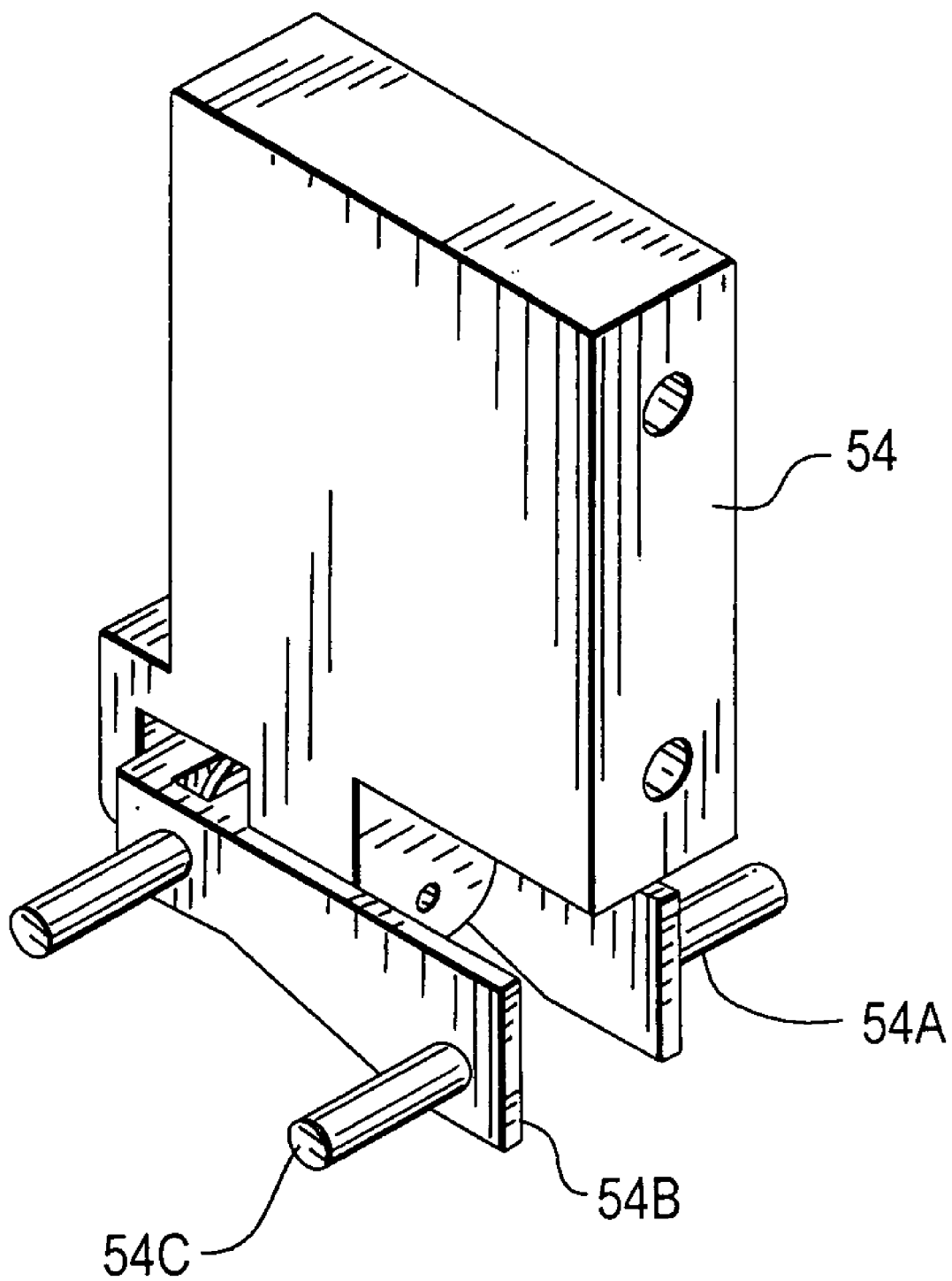
FIG. 16 is a top and front perspective view of the center link subassembly of the lower placement suspension system as seen in FIGS. 13 and 14.
Figure 17:
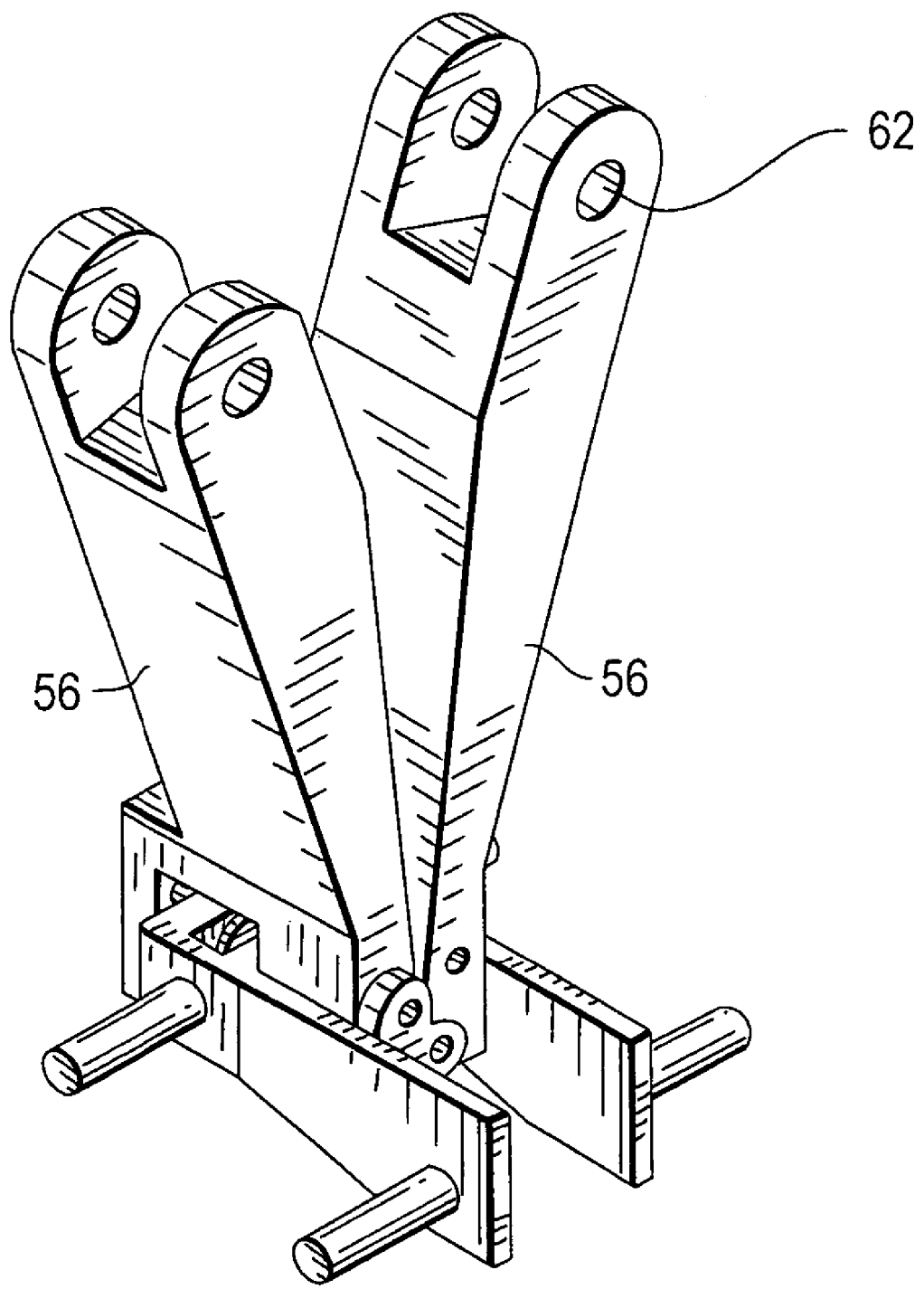
FIG. 17 is a top and front perspective view of the module link subassembly left/right links of the lower placement suspension system as seen in FIGS. 13 and 14.

FIGS. 9, 12, 12A, 13 and 14 show the gas spring suspension system in a four-module system. FIG. 14 shows the bare and simplified system of gas springs 60. FIG. 13 shows the system of FIG. 13 with two adjacent sets of first tier rollers, with omission of the mounting plates for each module. FIGS. 12 and 12A show this suspension system with posts 52A, 52B and 52C added links 66 and 67 and pivot connection 68. FIGS. 11 and 11A add deflection panel 80.

Figure 8A:
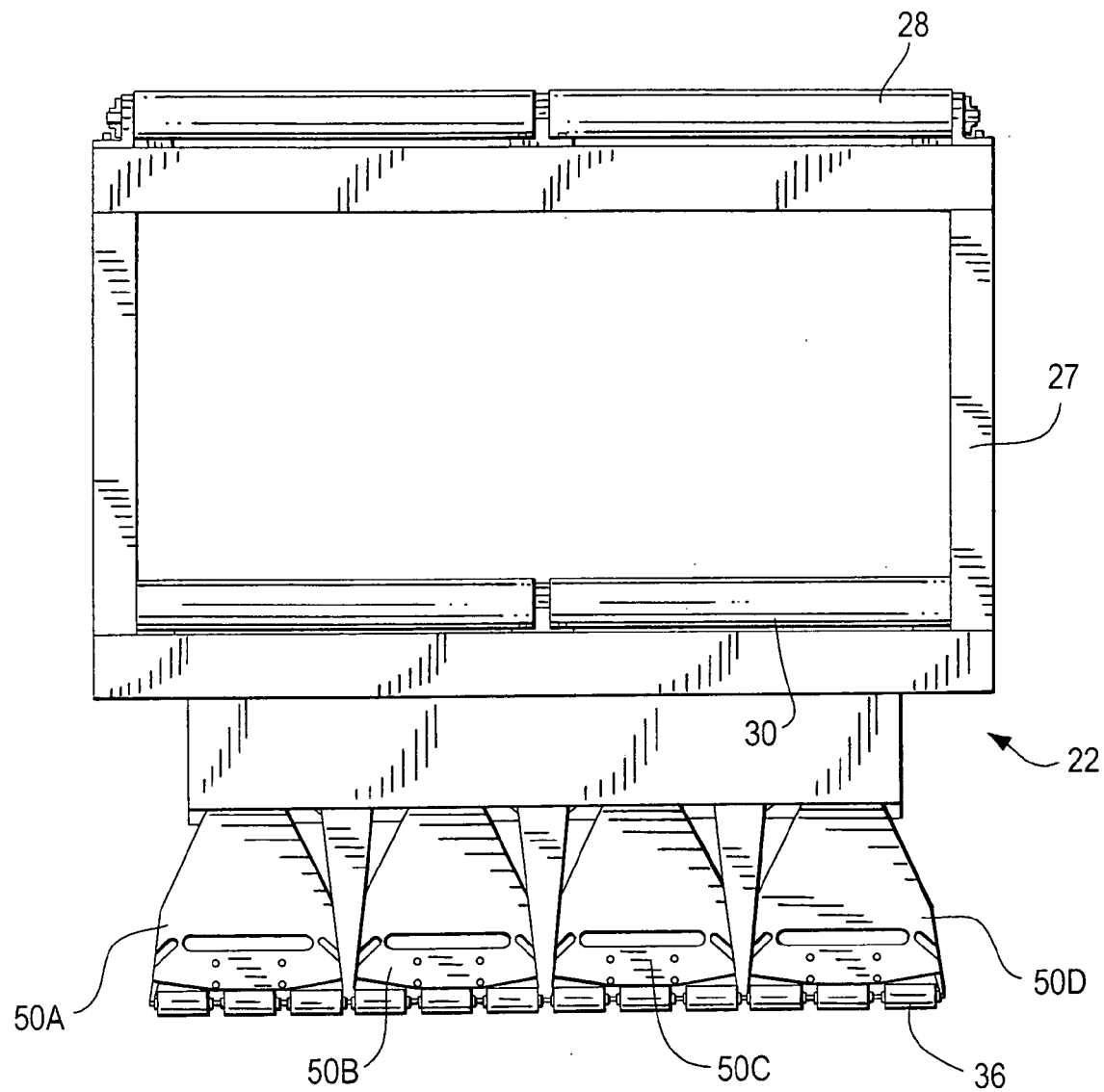
FIG. 8A is the same as FIG. 8 without the cutting plane and hot air ducts.

FIG. 9 adds module mounting plates 50A, 50B, 50C and 50D and chassis beam FIGS. 8 and 8A add chassis 27 and upper and lower feed rollers 28, 30. FIGS. 7B–7D show more clearly the PFE chassis and FIGS. 7 and 7A add the supply and take-up rolls 24, 26, and the tape edge profiling unit 32 and heating ducts 42.

FIGS. 32–38 illustrate by photographs the components of the PFE modular system having four linked modules. These photos show the PFE suspension system in various degrees of assembly. These photos show the mounting plates with support arms on each for the center lay-up roller and lower drive cylinders, two on each mounting plate to maintain the proper force in each of the side rollers regardless of articulation. At the top of each mounting plate is a system of further linkages for moving each module relative to the adjacent module for creating the total articulation of the system.

Figure 39:
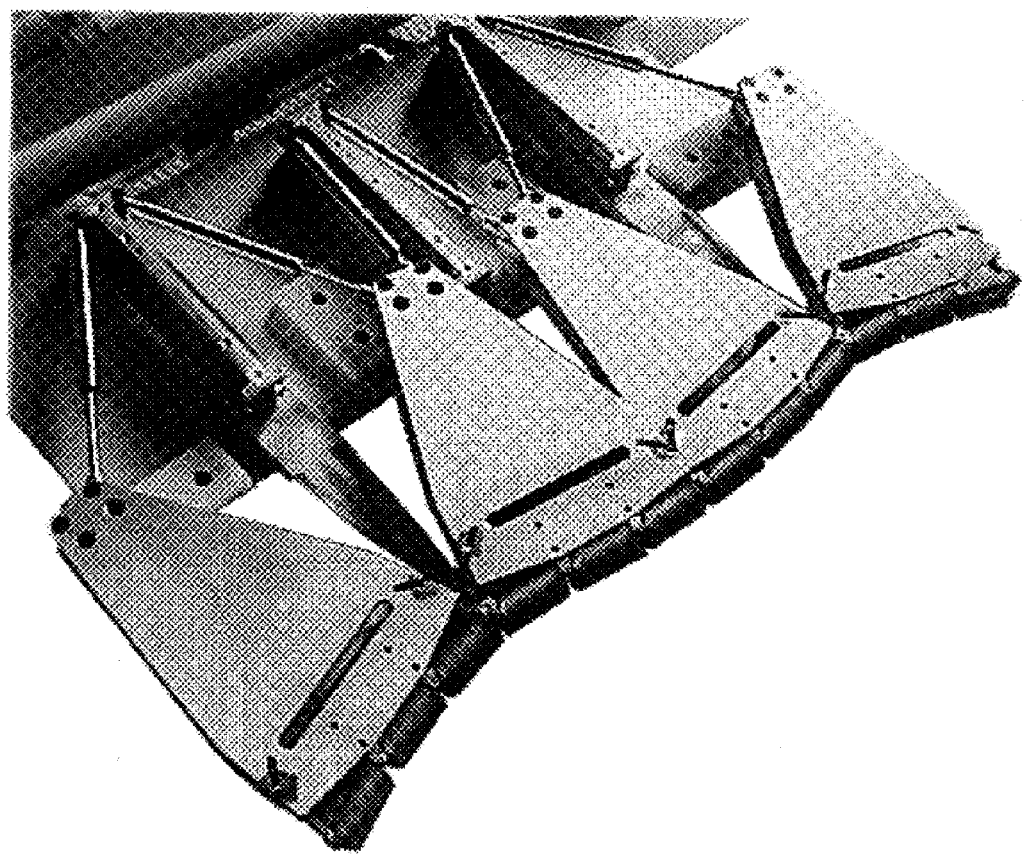
FIG. 39 is a fragmentary and front perspective view of four basic modules linked together and showing a first embodiment of spring cylinders, with lines drawn to indicate an alternate placement of these cylinders coupled to a bottom part of the stanchions and a lower part of the module plates.

FIG. 39 shows the earlier embodiment of a four-module tape-laying head where each module's generally triangular mounting plate is connected at its top end to gas springs. The top end of each of these gas springs is coupled to a vertical stanchion which is coupled to a second tier gas spring (not shown). This photo also shows a variation in structure whereby the first tier gas springs are relocated. Now the first tier gas springs are each coupled between the lower end of a stanchion and a lower part of a module mounting plate, as compared to the prior arrangement of coupling between upper parts of the stanchions and upper ends of the mounting plates. This new arrangement reduces space requirements and also positions each first tier gas spring in a more vertical orientation which results in mechanically preferable force application by the gas spring pistons. Each mounting plate is vertically slidable between a rear guide plate seen behind the mounting plate and a front guide plate that has been removed in this photograph.

As stated earlier, the lay-up rollers are mounted in sets of three on each module, namely a center roller between two side rollers all in end-to-end relationship. Each set of rollers is mounted on a first tier chassis which also has a first tier pneumatic system for articulating the two side rollers so that three rollers (on their respective central axis) can define either a straight-line, or a concave or convex curved line or other curvature. Thus, each side roller has an inner end pivotably coupled to one end of the center roller and an outer end. Each outer end is coupled to a gas spring secured between said outer end and said first tier chassis.

Next, the four modules are coupled together such that their combined twelve lay-up rollers can be articulated to define a straight-line, or convex, concave or other curvature. For each module the center roller has a fixed relationship to its first tier chassis while the adjacent modules are movable by a similar extendible-link (pneumatic or other). Here the center of said first tier comprises two center modules and two outer modules. The second tier comprises one center and two outer posts of said second tier chassis. In this embodiment the stanchion or center post 52B as seen in FIG. 12A, for example, joins two adjacent rollers which establish the elevational reference point for the nominal position of the whole suspension system. Angulations by these rollers, as caused by their contact with curvature of the mold surface initiates feedback from their respective first tier gas springs. A change in elevation of these rollers while they remain coaxial, for example, initiates feedback from their respective second tier gas springs at the upper part of support 52B.

Figure 18:
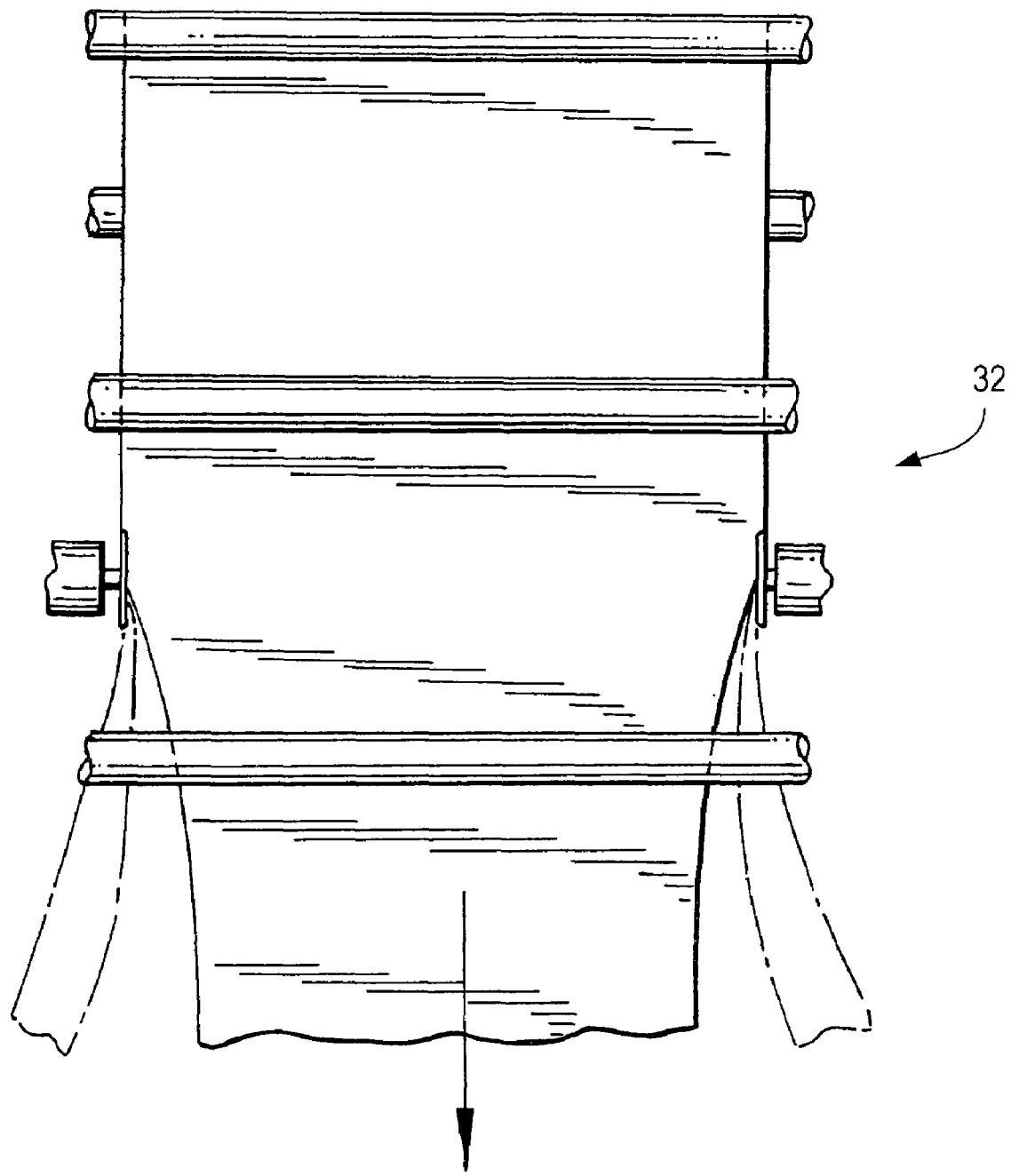
FIG. 18 is a fragmentary front elevation view showing one example of a profiled tape in the tape cutting unit.
Figure 19:
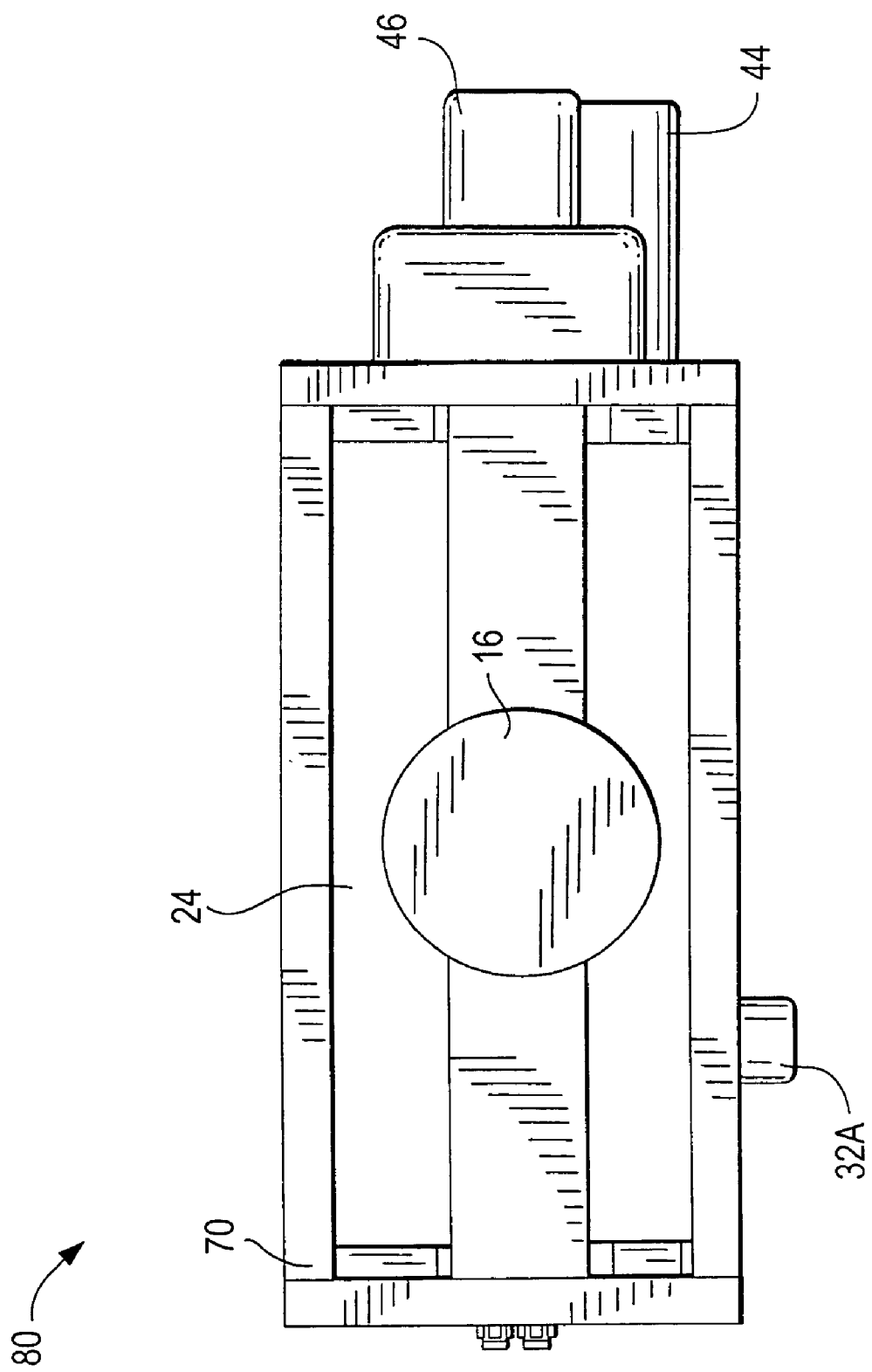
FIG. 19 is a top plan view of a second embodiment of a PFE.

The tape edge profiling unit is seen in FIGS. 6, 6A, 7 and 7A and also in FIGS. 4 and 4A. As described earlier, the tape passes between upper and lower feed rolls 28 and 33 which maintain the tape taut during the cutting phase. FIG. 4 shows a separate supply tape roll servomotor 24A. FIG. 6 tape cutter slides 33A and 33B which are directed by the controller to cut the two side edges of the tape on-the-fly to produce the predetermined edge profiles for each pass of the tape-dispensing head. Appropriate programming with knowledge of the distance offset of the cutter from the tape laying rollers, and the PFE speed of travel and the desired profile will result in the correct cut. FIG. 18 shows a segment of tape with a simple profiling on both side edges. Positioning of the cutters is controlled by cutting unit servomotors drive system including components 44, 45, 46 and 47. As described earlier, cutting systems may use slitting, flying knife, water-jet or other devices. Cutter slides 33A, 33B carry the selected type of cutting device and are positioned within the PFE chassis 27.

A still further feature of the PFE tape-laying head is the follower roller or other pressing element 38 seen in FIGS. 3, 4, 7, 11 and in FIGS. 24–29. As stated earlier, the preferred embodiment of the PFE has a single set of rollers at the bottom of the tape dispensing head. Due to the roller mounting arrangement which allows each side roller adjacent a center roller to angulate in addition to roll freely, a space exists between the adjacent ends of each two adjacent rollers. Thus, as the tape is dispensed and pressed by two adjacent rollers, a path of unpressed area will result on the laid tape in the space between the adjacent ends of each two adjacent rollers. To press this path a follower roller or presser blade is positioned in that space behind each two adjacent rollers and at the same elevation as their outer contact surface. The follower roller thus has length substantially the same as the width of said unpressed area or gap between adjacent ends of each two adjacent rollers. This can be seen as roller 90 in FIGS. 25–27 and blade 91 in FIGS. 28 and 29, and roller 38 in FIGS. 3, 4, 7 and 11. Blade 91 is a very smooth low friction element and suitably flexible to properly complement the pressure applied by the principal rollers. In one embodiment the blade is made of plastic such as polypropylene having flexibility of 60–70 Durometer rubber. The follower element in FIG. 25, for example, is supported by the bracket that supports the basic dispensing rollers and thus applies the same force from pneumatic pressure regulated force feedback system.

FIGS. 31A–30C show schematically how the rollers of FIG. 23A can conform, for example, to flat, sinusoidal and/or undulating surfaces on a mold.

Figure 40:
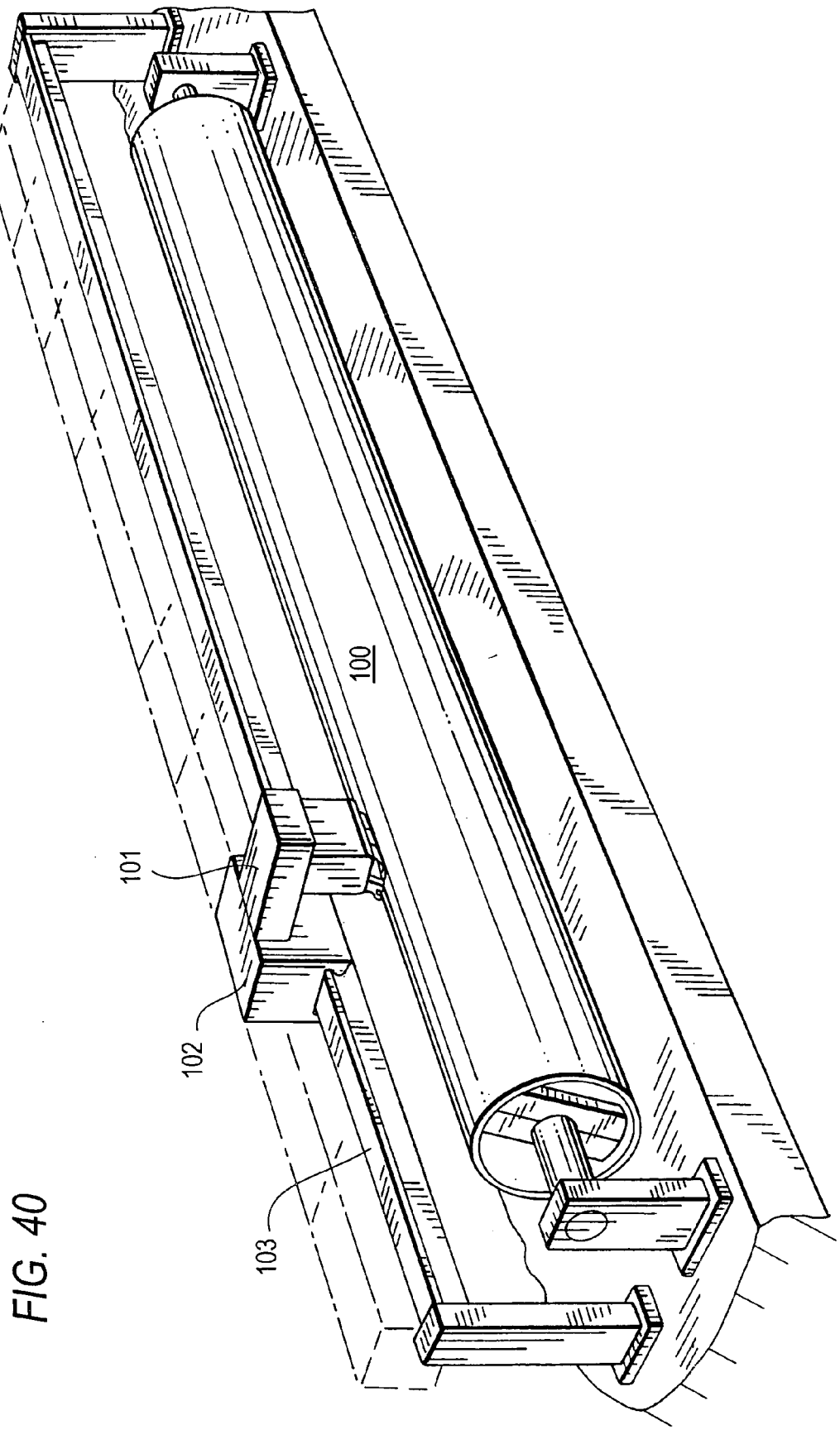
FIG. 40 is a fragmentary schematic view showing the new PFE on a gantry and carried on a mobile robot.

The invention as shown in FIGS. 1 and 2, for example, include a robot which is floor mounted and whose arm that supports the PFE is moved according to the programmed articulation. FIG. 40 illustrates schematically how this invention can be utilized with a very long mold to produce a pipe, boat or submarine hull, airplane fuselage or satellite structure, or propellor, turbine blade or windmill blade or a multitude of other structures. Here, the mold 100 represented for ease of illustration as a simple pipe, is mounted to be rotatable. A series of PFEs 101 are attached to robots 102 along a gantry 103. During a single revolution of the mold the multiple PFEs can lay-up a sheet of fabric on the entire length of the mold. In a very short time, multiple layers can be laid up. In a generally similar manner one can achieve lay-up of the interior surfaces of a rotated mold. With PFE systems like this new composite fabric structures can be made that were never before possible. As discussed earlier, substantially all types of composite fabric may be utilized, both dry and pre-preg and those requiring refrigeration and/or heating.

It should be understood that the foregoing description of the invention is intended merely to be illustrative thereof and that other modifications and embodiments may be apparent to those skilled in the while still being within the spirit and scope of the appended claims.

I claim:

1. A fabric and tape laying machine operable with: (a) a mold, plug or mandrel of predetermined surface shape relative to x, y and z coordinates, (b) a supply roll containing a continuous strip of composite tape or fabric, and (c) a robot including programmable control means comprising:
   a. a chassis mountable to said robot and movable by said robot for laying said tape or fabric onto said mold along a programmed path that is straight with respect to said x and y coordinates and follows contours of said predetermined surface shape with respect to said z coordinate,
   b. means on said chassis for supporting said supply roll,
   c. a contact roller module mounted on said chassis and spaced apart and downstream from said supply roll and adapted to receive said tape from said supply roll, said contact roller module being carried by said chassis as said chassis is moved along said programmed path,
   d. a tape cutting unit carried by said chassis and situated between said supply roll and said contact roller module,
   e. a first set of feed rollers downstream of said supply roll and upstream of said tape cutting unit, and a second set of feed rollers downstream of said tape cutting unit and upstream of said contact roller module for driving said tape from said supply roll and maintaining said tape taut while it passes through said tape cutting unit, and driving said tape to said contact roller module, said tape extending from said supply roll to said tape-cutting unit having opposite generally parallel side edges,
   f. said tape-cutting unit comprising at least one cutter to cut a predetermined profile along one of said opposite sides of said tape as said tape is moving through said tape-cutting unit and to cut said tape transversely to have a predetermined length when it covers a predetermined surface area of said mold,
   g. said contact roller module comprising at least one modular frame, a set of three pressure contact rollers carried by said at least one said frame, namely a center roller and two side rollers in end-to-end relationships, said at least one set of pressure contact rollers adapted to have said tape received from said tape-cutting unit pass around said pressure contact rollers and be laid onto said mold, and where each of said side rollers has its central axis angularly displaceable relative to the central axis of said central roller, and h. a suspension system for dynamically energizing said contact roller module to have its rollers apply a predetermined level of force downward on said tape during the lay-up process regardless of any varying contours on said mold surface.

2. A tape-laying machine according to claim 1 wherein said contact roller module moves along said programmed path in a forward direction as said tape is laid behind it, and wherein for each contact roller module said pressure contact rollers in end-to-end relationship define between each two adjacent ends of said rollers a gap, said contact roller module further comprises at least one follower element situated adjacent and generally parallel to and behind said pressure contact rollers for contacting and pressing portions of laid-up tape which are adjacent said gap and are not contacted by said pressure contact rollers.

3. A tape-laying machine according to claim 2 wherein said gap between adjacent ends of said at least one set of pressure contact rollers has a length L, and said at least one follower element has axial length substantially the same as L.

4. A tape-laying machine according to claim 2 wherein said follower element is a roller.

5. A tape-laying machine according to claim 1 wherein said tape on said supply roll includes an adjacent strip of protective film, and said chassis further comprises a take-up roll, said protective film being separated from said tape and fed onto said take-up roll.

6. A tape-laying machine according to claim 1 wherein said center roller is mounted at a fixed orientation and location on said frame of said contact roller module.

7. A tape-laying machine according to claim 1 wherein said tape defines a plane as it extends from said cutting unit to said contact roller module, and wherein said pressure contact rollers of said contact roller module lie in a plane generally perpendicular to said plane of said tape, said center roller positioned with its central axis of rotation a fixed perpendicular distance from said frame and perpendicular to the direction of said tape movement, said side rollers having their respective central axis pivotable relative to said central axis of said center roller, said contact roller module further comprising at least one follower element situated adjacent and generally parallel to and behind said contact pressure rollers with respect to said path traversed by said contact roller module, said at least one follower element pressing said laid tape against said mold.

8. A tape-laying machine according to claim 1 wherein each of said modular frames comprises a base, and wherein said center roller has opposite ends and each of said side rollers has an inner end adjacent one of said opposite ends of said center roller and has an outer end, and wherein said modular frame further comprises (a) a pair of spaced-apart fixed arms which extend from said base and rotatably support said opposite ends of said center roller and pivotably and rotatably support said inner ends of said side rollers, and (b) a pair of length-extendable arms, each having one end pivotably connected to said outer end of each of said side rollers and an opposite end pivotably connected to said base, said side rollers being angularly displaceable relative to said center roller when said length extendible arms are varied in length.

9. A tape-laying machine according to claim 8 wherein said tape-dispensing head comprises a base and a plurality of said modular frames fixed to said base and situated such that the central axis of the two outer and center rollers of each modular frame lie in a plane, and said planes of said plurality of modular frames are co-planar, and each of said modular frames is adjacent to at least one other modular frame with the outer ends of one side roller of each of said adjacent modular frames being adjacent and pivotally coupled together, and with said rollers of said plurality of modular frames being configurable so that their respective central axes define a continuous line that may be concave, convex, wavy, sinusoidal or other shape.

10. A tape-laying machine according to claim 1 comprising a plurality of said contact roller modules, each having a frame with said three contact pressure rollers in end-to-end configuration with the adjacent frame, and with the outer end of one side roller pivotally coupled to the outer end of the adjacent side roller of the adjacent modular frame, with said end-to-end aligned modular frames forming a first tier of the tape-dispensing head structure.

11. A tape-laying machine according to claim 10 wherein each of said frames with its three rollers is a modular sub-assembly with respect to an adjacent frame, with the adjacent side rollers of each two adjacent frames remaining pivotally coupled together such that all the rollers of all the frames always define a continuous line in a single plane.

12. A tape-laying machine according to claim 11 wherein each of said length-extendable arms comprises a telescoping piston and cylinder, the piston being axially energized by said control means to configure the aligned rollers to be compliant with said mold surface.

13. A tape-laying machine according to claim 1 wherein each of said center and side rollers is nominally two inches long.

14. A tape-laying machine according to claim 1 wherein said control means directs the angularly displaceable orientation of the side rollers of each of said modular frames independently of each other and independently of the rollers of the adjacent sub-frames, except that each two adjacent side rollers of adjacent modular frames must remain coupled to each other.

15. A tape-laying machine according to claim 1 wherein said predetermined path is defined by successive points, each being at a specified elevation relative to a reference plane, and said predetermined path further defines at each of said points a surface contour defined by a line perpendicular to said path, whereby at each of said points said chassis frame is controlled to position the center roller on said line and at said specified elevation, and to position said side rollers on both sides adjacent said center roller at an angle and elevational as defined by said path.

16. A tape-laying machine according to claim 1 wherein said chassis frame of said tape dispensing head has top and bottom parts with said tape moving in the direction from top to bottom in a generally flat plane, and said tape-cutting unit further comprises a beam having a cutter support surface generally parallel to said plane of said tape and generally perpendicular to said top-to-bottom direction, and a pair of said cutters, each of said pair of cutters being movable on said support surface transversely of said tape movement direction.

17. A tape-laying machine according to claim 16 wherein said pair of cutters of said tape-cutting unit comprises a pair of knives, water, air or laser cutters, each movable transversely on said beam independently of the other.

18. A tape-laying machine according to claim 1 wherein said mold surface defines at least a portion of an airplane wing, fuselage, nacelle or propeller blade, or of a boat hull, automotive body, satellite component, windmill blade or building component.

19. A tape-laying machine according to claim 1 wherein said supply roll can be replaced or supplemented between passes of the tape-dispensing head so that the tape laying can be continuous regardless of the length or the breadth of the mold onto which it is laid.

20. A tape-laying machine according to claim 1 further comprising a heater for heating said tape after is passes said tape-cutting unit and before it reaches said contact roller module.

21. A tape-laying machine according to claim 1 further comprising a cooler for maintaining cool said tape on said supply roll and said fabric tape extending from said supply roll to said cutting unit.

22. A method of performing composite fabric or tape lay-up onto a mold surface with a tape laying machine that uses a supply roll of composite tape and includes a tape cutting unit and a contact roller module having a set of end-to-end relationship and around which said tape from said supply roll is directed to be laid-up onto said mold, comprising the steps:
   a. defining the topography of said mold surface,
   b. directing a contact roller module to traverse a plurality of successive passes, each pass generally parallel to and laterally displaced from the prior pass, where each pass follows a path which defines a portion of said topography, and
   c. providing a dynamic suspension system which urges pressure contact rollers of said contact roller module to push against said mold surface with substantially the same force at all times regardless of the changes in topography of the mold as the contact roller module passes are made.

23. A method according to claim 22 comprising the further step of each strip dispenses with each pass of said tape dispensing head,
   a. determining the profiles of opposite side edges profile and the length of each strip should have before said contact roller modules makes the pass,
   b. directing said tape cutting unit to cut said edge profiles as said tape is moving toward said mold, and to make a transverse cut across said tape to establish the predetermined strip length.

24. A tape dispensing head operable with: (a) a mold of predetermined surface shape defined by x, y and z coordinates corresponding to length width and elevation respectively, (b) a supply roll containing a continuous strip of tape having opposite side edges, and (c) a robot including programmable control means for directing said robot to follow a path corresponding to said predetermine surface shape at a predetermined off-set distance therefrom to lay-up said tape onto said mold, comprising:
   a. a chassis mountable to said robot and movable by said robot for placement of said tape onto said mold along said programmed path that is straight with respect to said x and y coordinates, while remaining generally perpendicular along said z coordinate to said mold surface at every point along said path,
   b. means on said chassis for supporting said supply roll,
   c. at least one contact roller module mounted on said chassis and spaced apart and downstream from said supply roll and adapted to receive said tape from said supply roll, said contact roller module being carried by said chassis as said chassis is moved along said programmed path,
   d. a tape cutting unit carried by said chassis and situated between said supply roll and said contact roller module,
   e. a first set of feed rollers downstream of said supply roll and upstream of said tape cutting unit, and
   f. a second set of feed rollers downstream of said tape cutting unit and upstream of said contact roller module for pulling said tape from said supply roll and maintaining said tape taut while it passes through said tape cutting unit, and driving said tape to said contact roller module,
   said tape cutting unit comprising at least one cutter to cut a predetermined profile along at least one of said opposite side edges of said tape as said tape is moving through said tape cutting unit,
   said at least one contact roller module comprising: (i) a frame, and (ii) a set of three pressure contact rollers carried by said frame, namely a center roller and two outboard rollers in end-to-end relationship, each of said rollers having a central axis of rotation, said set of pressure contact rollers adapted to have said tape received from said tape cutting unit pass around said pressure contact rollers and be laid-up onto said mold, and where each of said outboard rollers has its central axis angularly displaceable relative to the central axis of said central roller,
   said tape dispenser head further comprising a suspension system for dynamically energizing said contact roller module to have its contact rollers apply a predetermined level of force onto said tape during said lay-up process, regardless of any contours on said mold surface varying in the z-axis from said programmed path.

25. Apparatus according to claim 24 wherein said predetermined level of force is a predetermined range of force.

26. Apparatus according to claim 24 wherein said suspension system operates in cooperation with said control means and is adapted:
   a. to position said tape dispensing head such that each of said pressure contact rollers is nominally in contact with and is applying a force within a predetermined range of force against said tape being placed on said predetermined surface shape, and
   b. to maintain said force within said predetermined range of said pressure contact roller against said predetermined surface of said mold in said z-direction perpendicular to said surface regardless of any changing orientation of said predetermined surface shape as said tape dispensing head is moved along said predetermined path and maintained generally perpendicular thereto.

27. Apparatus according to claim 25, wherein said spring means is selected from the group consisting of mechanical, hydraulic and electrical spring means.

28. Apparatus according to claim 24, wherein said programmable control means controls said robot to position said tape dispensing head so that said central pressure contact roller is at a predetermined offset distance in the z-direction from said robot, and by said suspension system said pressure contact roller and said outboard rollers apply a force within said predetermined range of force against said tape laid-up onto said mold.

29. Apparatus according to claim 24, wherein said at least one contact roller module is movable by said robot in the x,y plane in a direction designated upstream along said predetermined path, with said tape being laid and extending behind and downstream of said contact roller module, said contact roller module further comprising an idler roller mounted on said contact roller module and positioned upstream of said contact pressure rollers of said contact roller module, whereby said tape fed from said tape cutting unit is directed to go forward of and around said idler roller, thus making a generally 90 degree turn, and thence to go beneath said pressure contact rollers as it is laid onto said mold.

30. Apparatus according to claim 29, wherein said second set of feed rollers upstream of said contact roller module directs said tape without being in tension to go around said idler roller and to contact said predetermined surface.

31. Apparatus according to claim 24, wherein said tape dispensing head comprises at least one additional contact roller module coupled to said at least one contact roller module, with said contact pressure rollers of all said contact roller modules being coupled in end-to-end relationship along a single axis, each roller being angularly displaceable relative to the adjacent roller, so that said single axis may become curved when any of said contact pressure rollers become angulated relative to the others.

32. Apparatus according to claim 24, wherein said tape cutting unit is adapted to cut said tape transversely to produce a segment of tape having a predetermined length as it is directed to said contact roller module.

33. Apparatus according to claim 24, wherein for each contact roller module said pressure contact rollers in end-to-end relationship define between each two adjacent ends of said rollers a gap, each of said contact roller modules further comprising at least one follower element carried by said frame and situated adjacent and generally parallel to and behind said pressure contact rollers for contacting and pressing portions of tape which are adjacent said gap and are not contacted by said pressure contact rollers.

34. Apparatus according to claim 33 wherein each of said follower elements comprises a roller rotably mounted on said frame.

35. Apparatus according to claim 24, wherein each of said modular frames comprises a base, and wherein said center roller has opposite ends and each of said side rollers has an inner end adjacent one of said opposite ends of said center roller and has an outer end, and wherein said modular frame further comprises (a) a pair of spaced- apart fixed arms which extend from said base and rotatably support said opposite ends of said center roller and pivotably and rotatably support said inner ends of said side rollers, and (b) a pair of length-extendable arms, each having one end pivotably connected to said outer end of each of said side rollers and an opposite end pivotably connected to said base, said side rollers being angularly displaceable relative to said center roller when said length extendible arms are varied in length.

36. Apparatus according to claim 24, comprising a plurality of said contact roller modules, each having a frame with said three contact pressure rollers in end-to-end configuration with the adjacent frame, and with the outer end of one side roller pivotally coupled to the outer end of the adjacent side roller of the adjacent modular frame, with said end-to-end aligned modular frames forming a first tier of the tape-dispensing head structure.

37. Apparatus according to claim 24, wherein said tape-dispensing head comprises a base and a plurality of said modular frames fixed to said base and situated such that the central axis of the two outer and center rollers of each modular frame lie in a plane, and said planes of said plurality of modular frames are co-planar, and each of said modular frames is adjacent to at least one, other modular frame with the outer ends of one side roller of each of said adjacent modular frames being adjacent and pivotally coupled together, and with said rollers of said plurality of modular frames being configurable so that their respective central axes define a continuous line that may be concave, convex or wavy sinusoidal shape.

38. Apparatus according to claim 24, wherein said chassis frame of said tape dispensing head has top and bottom parts with said tape moving in the direction from top to bottom in a generally flat plane, and said tape-cutting unit further comprises a beam having a cutter support surface generally parallel to said plane of said tape and generally perpendicular to said top-to-bottom direction, and a pair of said cutters, each of said pair of cutters being movable on said support surface transversely of said tape movement direction.

39. Apparatus according to claim 24, (a) further comprising a heater for heating said tape after is passes said tape-cutting unit and before it reaches said contact roller module, and (b) further comprising a cooler for maintaining cool said tape on said supply roll and said fabric tape extending from said supply roll to said cutting unit.

40. A method for performing lay-up of composite tape onto a mold having a predetermined surface topography defined by x, y and z coordinates which correspond to width, length and elevation dimension respectively of said mold,
   said method operable with a robot having programmable control means
   said tape being laid-up along a programmed path established by said robot where the coordinates at every point along said programmed path correspond to points on said surface of said mold,
   said robot adapted to carry a tape dispensing head which includes a supply roll containing a continuous strip of said tape and further includes at least one contact roller module having pressure contact rollers around which said tape from said supply roll is extended and urged by said rollers onto said mold surface,
   said method comprising the steps:
   a. positioning said contact roller module such that the surfaces of said contact rollers engage and apply said tape from said supply roll onto said mold surface,
   b. directing said contact roller module to traverse a plurality of successive passes each pass being straight and generally parallel to and laterally displaced from the prior pass, where each pass is a portion of said programmed path, and
   c. providing a spring pressure force feed back suspension system which positions said pressure contact rollers of said contact roller module to contact and press said tape against said mold with a predetermined level of force at all times as said rollers move along said path.

41. A method according to claim 40, wherein said level of force of said suspension system comprises a range of force.

42. A method according to claim 41 wherein said suspension system positions said contact roller module to apply said force by said rollers onto said tape in a direction perpendicular to said mold at all times that said rollers move along said path.

43. A method according to claim 40, where each of said passes of said contact roller modules is axially in the y-direction, with each of said contact pressure rollers (i) extending along the x-axis transverse of said y-axis, and (ii) movable by said dynamic suspension system in said z-direction while in the x,z plane, and said suspension system allows any number of said contact pressure rollers of said contact roller modules to move in said z-direction while in said x,z plane while said module moves in said y direction during any of said passes.

44. A method according to claim 40, wherein said suspension system utilizes springs selected from the group consisting of mechanical, hydraulic and electronic springs.

45. A method according to claim 40, wherein said suspension system senses each change in distance of each of said rollers from the robot due to a variation in the mold topography and maintains substantially the same force along the z-axis of the roller onto the tape.

46. A method according to claim 40, wherein each contact roller module comprises a central roller and an outboard roller at each end of said central roller, said outboard rollers arranged coaxially with said central roller and angularly displaceable therefrom and said system comprises a separate spring element associated with each roller for maintaining the force on each roller in its various positions independently of every other roller.

47. A method according to claim 40 comprising the further steps:
   a. providing a tape cutting unit between said tape supply roll and said contact roller module,
   b. directing said tape from said tape supply roll to said cutting unit and thence to said contact roller module, and
   c. with said cutting unit, cutting a predetermined profile along each of said side edges of said tape where said predetermined profile corresponds to a predetermined area of said mold topography to be covered when said tape is laid-up onto said mold.

48. A method according to claim 47 wherein said tape moves along its longitudinal y-axis while moving through said cutting unit, and wherein cutting each of said profiles on said side edges of said tape comprises moving a cutting element transversely of said y-axis.

49. A method according to claim 40 comprising the further step of maintaining the temperature of said composite below the melting temperature thereof while said tape is on said supply roll and in said cutting unit.

50. A method according to claim 40 comprising the further step of heating said tape to a temperature above its melting temperature while said tape moves from said cutting unit to said pressure roller module.

* * * * *